(12) United States Patent
Sherwood et al.

(10) Patent No.: US 11,251,622 B1
(45) Date of Patent: Feb. 15, 2022

(54) CONVERTER EMPLOYING DIFFERING SWITCH TYPES IN PARALLEL

(71) Applicant: Apple Inc., Cupertino, CA (US)

(72) Inventors: Mark H. Sherwood, Palo Alto, CA (US); Paul M. White, Sunnyvale, CA (US); Dillon J. Thomasson, Cupertino, CA (US); Zachary M. Rubin, San Jose, CA (US); Stephen M. Spiteri, Livermore, CA (US); Javier Ruiz, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 952 days.

(21) Appl. No.: 15/454,324

(22) Filed: Mar. 9, 2017

Related U.S. Application Data

(60) Provisional application No. 62/310,463, filed on Mar. 18, 2016.

(51) Int. Cl.
*H02J 4/00* (2006.01)
*H02M 3/04* (2006.01)
*H02M 7/04* (2006.01)
*H02M 7/44* (2006.01)

(52) U.S. Cl.
CPC .............. *H02J 4/00* (2013.01); *H02M 3/04* (2013.01); *H02M 7/04* (2013.01); *H02M 7/44* (2013.01)

(58) Field of Classification Search
CPC .... H02M 7/00; H02M 1/00; H02J 4/00; H02J 7/00

USPC ....................................................... 307/113
See application file for complete search history.

(56) References Cited

U.S. PATENT DOCUMENTS

| | | | | |
|---|---|---|---|---|
| 2004/0262057 A1* | 12/2004 | Kumar | .................. | H02M 7/493 180/65.225 |
| 2009/0284990 A1* | 11/2009 | Pollak | .................. | H02M 3/156 363/21.02 |
| 2013/0039100 A1* | 2/2013 | Kazama | ............... | H03K 17/164 363/41 |
| 2015/0365040 A1* | 12/2015 | Saha | ........................ | B60L 1/00 318/400.25 |

FOREIGN PATENT DOCUMENTS

JP           2002165439 A  *  6/2002

* cited by examiner

*Primary Examiner* — Hal Kaplan
*Assistant Examiner* — Joseph N Inge
(74) *Attorney, Agent, or Firm* — BakerHostetler

(57) ABSTRACT

Aspects of the present disclosure involve an inverter employing switches of different types in parallel. In one example, an apparatus includes a voltage-source converter that may have a plurality of switch positions collectively coupled to convert an input to an output. At least one switch position may include a first switch of a first switch type and a second switch of a second switch type different from the first switch type. Also, the first and second switches may be coupled in parallel. The converter may also include a switch control circuit to generate, for each of the at least one of the switch positions, a first control signal to operate the first switch of the switch position, and a second control signal to operate the second switch of the switch position.

20 Claims, 63 Drawing Sheets

VEHICLE OPERATING STATE TABLE 1300

| STATE | DESCRIPTION |
|---|---|
| DRIVE_ECO "M"<br>1202 | MAXIMIZES VEHICLE EFFICIENCY AND MINIMIZES VEHICLE ENERGY CONSUMPTION |
| DRIVE_NORMAL "N"<br>1204 | BALANCES VEHICLE EFFICIENCY AND VEHICLE PERFORMANCE |
| DRIVE_MAX_PERFORMANCE "P"<br>1206 | MAXIMIZES VEHICLE ACCELERATION AND POWER PERFORMANCE |
| DRIVE_TOW "Q"<br>1208 | MAXIMIZES VEHICLE ACCELERATION AND VEHICLE TOWING CAPACITY (E.G., CONTINUOUS LOW-SPEED TORQUE) |
| DRIVE_LIMP_HOME "R"<br>1210 | MAINTAINS PARTIAL-TO-FULL OUTPUT CURRENT AND POWER DURING A FAULT CONDITION WITHIN THE INVERTER OR AT THE INVERTER OUTPUT PHASES |
| POWER_DOWN "S"<br>1212 | COMPLETES THE POWER DOWN SEQUENCE OF THE VEHICLE PROPULSION SYSTEM COMPONENTS |

FIG. 13

COOLING STATE TABLE 1500

| STATE | DESCRIPTION |
|---|---|
| PARALLEL_FLOW "V" 902 | DUCTS FLUID COOLANT TO SWITCH GROUPS IN PARALLEL |
| SERIES_FLOW_GROUP_1_PREF "W" 904 | DUCTS FLUID COOLANT ENTIRELY TO SWITCH GROUP 1 AND THEN TO SWITCH GROUP 2 SERIALLY |
| SERIES_FLOW_GROUP_2_PREF "X" 906 | DUCTS FLUID COOLANT ENTIRELY TO SWITCH GROUP 2 AND THEN TO SWITCH GROUP 1 SERIALLY |
| GROUP_1_FLOW_ONLY "Y" 908 | DUCTS FLUID COOLANT ENTIRELY TO SWITCH GROUP 1 AND DOES NOT DUCT FLUID TO SWITCH GROUP 2 |
| GROUP_2_FLOW_ONLY "Z" 910 | DUCTS FLUID COOLANT ENTIRELY TO SWITCH GROUP 2 AND DOES NOT DUCT FLUID TO SWITCH GROUP 1 |
| NO_FLOW "U" 912 | DOES NOT DUCT FLUID COOLANT TO EITHER SWITCH GROUP 1 OR SWITCH GROUP 2 |

FIG. 15

INVERTER STATE TABLE 1700

| STATE | SUB-STATE | DESCRIPTION | NEXT STATE TRIGGER | NEXT STATE |
|---|---|---|---|---|
| DRIVE "A", "B", "C" 1602 | DRIVE "A1" 1702 (LIGHT LOAD DRIVE) | DRIVE GROUP 2 DEVICES ONLY. ADAPTIVE SWITCHING FREQUENCY DEPENDING ON OUTPUT LOAD (E.G., TRACTION MOTOR) FUNDAMENTAL FREQUENCY. GROUP 2 GATE DRIVE HAS REDUCED DEADTIME BETWEEN COMMUTATION STATES.

COUPLE WITH ONE OR MORE COOLING STATES THAT ENABLE EFFECTIVE OPERATION OF GROUP 2 DEVICES (E.G., PREFERENTIAL COOLING OF GROUP 2 DEVICES VIA COOLING STATES X OR Z). | SENSED NEW VEHICLE OPERATING STATE VIA SPEED OR TORQUE OF OUTPUT | B, C, D, E, J |
| | | | RECEIVED COMMAND FOR NEW VEHICLE OPERATING STATE | B, C, D, E, J |
| | | | SENSED OPEN CIRCUIT FAULT | F0 |
| | | | SENSED SHORT CIRCUIT FAULT | G0 |
| | | | SENSED (OUTPUT) PHASES ARE SHORTED FAULT | H |
| | | | SENSED TEMPERATURE OF ONE OR MORE DEVICES IN ONE OR MORE SWITCH GROUPS CROSSING A THRESHOLD | B, C, D, E, J |

FIG. 17A

INVERTER STATE TABLE 1700

| STATE | SUB-STATE | DESCRIPTION | NEXT STATE TRIGGER | NEXT STATE |
|---|---|---|---|---|
| DRIVE "A", "B", "C" 1602 | DRIVE "B1" 1704 (MID-LOAD DRIVE (ECO)) | GROUP 2 THEN GROUP 1 SWITCHING METHOD. (GROUP 1 ZVS). CURRENT IS SHARED BETWEEN GROUP 1 AND GROUP 2. GROUP 1 TURNS OFF FIRST, THEN GROUP 2 TURNS OFF. REDUCED DEADTIME MAY INCREASE VOLTAGE AT TERMINALS FOR MORE SPEED. COUPLE WITH ONE OR MORE COOLING STATES THAT ENABLE EFFECTIVE OPERATION OF ALL SWITCH GROUPS (E.G., PARALLEL PATH VIA COOLING STATE V OR SERIES FLOW WITH GROUP 2 FIRST VIA COOLING STATE X). | SENSED NEW VEHICLE OPERATING STATE VIA SPEED OR TORQUE OF OUTPUT | A, C, D, E, J |
| | | | RECEIVED COMMAND FOR NEW VEHICLE OPERATING STATE | A, C, D, E, J |
| | | | SENSED OPEN CIRCUIT FAULT | F0 |
| | | | SENSED SHORT CIRCUIT FAULT | G0 |
| | | | SENSED (OUTPUT) PHASES ARE SHORTED FAULT | H |
| | | | SENSED TEMPERATURE OF ONE OR MORE DEVICES IN ONE OR MORE SWITCH GROUPS CROSSING A THRESHOLD | A, C, D, E, J |

FIG. 17B

INVERTER STATE TABLE 1700

| STATE | SUB-STATE | DESCRIPTION | NEXT STATE TRIGGER | NEXT STATE |
|---|---|---|---|---|
| DRIVE "A", "B", "C" 1602 | DRIVE "B2" 1705 (MID-LOAD DRIVE (NORMAL)) | GROUP 2 HANDLES TURN ON/OFF, GROUP 1 ZVS. GROUP 2 OFF FOR BULK OF SWITCH CYCLE. REDUCED DEADTIME AS COMPARED TO STATES C1, C2 TO INCREASE VOLTAGE ON THE BUS.<br><br>COUPLE WITH ONE OR MORE COOLING STATES THAT ENABLE EFFECTIVE OPERATION OF ALL SWITCH GROUPS (E.G., PARALLEL PATH VIA COOLING STATE V OR SERIES FLOW WITH GROUP 2 FIRST VIA COOLING STATE X). | SENSED NEW VEHICLE OPERATING STATE VIA SPEED OR TORQUE OF OUTPUT | A, C, D, E, J |
| | | | RECEIVED COMMAND FOR NEW VEHICLE OPERATING STATE | A, C, D, E, J |
| | | | SENSED OPEN CIRCUIT FAULT | F0 |
| | | | SENSED SHORT CIRCUIT FAULT | G0 |
| | | | SENSED (OUTPUT) PHASES ARE SHORTED FAULT | H |
| | | | SENSED TEMPERATURE OF ONE OR MORE DEVICES IN ONE OR MORE SWITCH GROUPS CROSSING A THRESHOLD | A, C, D, E, J |

FIG. 17C

INVERTER STATE TABLE 1700

| STATE | SUB-STATE | DESCRIPTION | NEXT STATE TRIGGER | NEXT STATE |
|---|---|---|---|---|
| DRIVE "A", "B", "C" 1602 | DRIVE "C1" 1706 (FULL LOAD DRIVE (FLYBACK DIODES)) | BOTH GROUP 1 AND GROUP 2 SWITCH NEAR-SYNCHRONOUSLY TO MAXIMIZE CURRENT. OFF-STATE CURRENT IS CONDUCTED THROUGH EXTERNAL FLYBACK DIODE(S) THAT ARE PACKAGED IN ONE OR MORE SWITCH GROUPS.

COUPLE WITH ONE OR MORE COOLING STATES THAT ENABLE MAXIMUM OUTPUT OPERATION OF ALL SWITCH GROUPS (E.G., PARALLEL PATH VIA COOLING STATE V OR SERIES FLOW WITH GROUP 1 FIRST VIA COOLING STATE W). | SENSED NEW VEHICLE OPERATING STATE VIA SPEED OR TORQUE OF OUTPUT | A, B, D, E, J |
| | | | RECEIVED COMMAND FOR NEW VEHICLE OPERATING STATE | A, B, D, E, J |
| | | | SENSED OPEN CIRCUIT FAULT | F0 |
| | | | SENSED SHORT CIRCUIT FAULT | G0 |
| | | | SENSED (OUTPUT) PHASES ARE SHORTED FAULT | H |
| | | | SENSED TEMPERATURE OF ONE OR MORE DEVICES IN ONE OR MORE SWITCH GROUPS CROSSING A THRESHOLD | A, B, D, E, J |

FIG. 17D

INVERTER STATE TABLE 1700

| STATE | SUB-STATE | DESCRIPTION | NEXT STATE TRIGGER | NEXT STATE |
|---|---|---|---|---|
| DRIVE "A", "B", "C" 1602 | DRIVE "C2" 1707 (FULL LOAD DRIVE (BODY DIODES)) | BOTH GROUP 1 AND GROUP 2 SWITCH NEAR-SYNCHRONOUSLY TO MAXIMIZE CURRENT. OFF-STATE CURRENT IS CONDUCTED THROUGH BODY DIODE(S) THAT ARE PART OF ONE OR MORE SWITCH GROUPS. COUPLE WITH ONE OR MORE COOLING STATES THAT ENABLE MAXIMUM OUTPUT OPERATION OF ALL SWITCH GROUPS (E.G., PARALLEL PATH VIA COOLING STATE V OR SERIES FLOW WITH GROUP 1 FIRST VIA COOLING STATE W). | SENSED NEW VEHICLE OPERATING STATE VIA SPEED OR TORQUE OF OUTPUT | A, B, D, E, J |
| | | | RECEIVED COMMAND FOR NEW VEHICLE OPERATING STATE | A, B, D, E, J |
| | | | SENSED OPEN CIRCUIT FAULT | F0 |
| | | | SENSED SHORT CIRCUIT FAULT | G0 |
| | | | SENSED (OUTPUT) PHASES ARE SHORTED FAULT | H |
| | | | SENSED TEMPERATURE OF ONE OR MORE DEVICES IN ONE OR MORE SWITCH GROUPS CROSSING A THRESHOLD | A, B, D, E, J |

FIG. 17E

INVERTER STATE TABLE 1700

| STATE | SUB-STATE | DESCRIPTION | NEXT STATE TRIGGER | NEXT STATE |
|---|---|---|---|---|
| SAFETY CHECK "D" 1604 | N/A | GROUP 1 TURNS ON FIRST TO BEST SENSE AND WITHSTAND A POSSIBLE SHORT CIRCUIT OR STALL CONDITION ON THE OUTPUT PHASE(S). OPERATION IS MOST ROBUST IN SCENARIOS OF HIGH AVALANCHE CURRENT AND REQUIRED DESATURATION CURRENT DETECTION. COUPLED WITH ONE OR MORE COOLING STATES THAT ENABLE MAX AVALANCHE CURRENT BEING WITHSTOOD BY GROUP 1 (E.G., GROUP 1 ONLY COOLING VIA COOLING STATE Y OR SERIES FLOW WITH GROUP 1 FIRST VIA COOLING STATE W). | SENSED NEW VEHICLE OPERATING STATE VIA SPEED OR TORQUE OF OUTPUT | A, B, C, E, J |
| | | | RECEIVED COMMAND FOR NEW VEHICLE OPERATING STATE | A, B, C, E, J |
| | | | SENSED OPEN CIRCUIT FAULT | F0 |
| | | | SENSED SHORT CIRCUIT FAULT | G0 |
| | | | SENSED (OUTPUT) PHASES ARE SHORTED FAULT | H |
| | | | SENSED TEMPERATURE OF ONE OR MORE DEVICES IN ONE OR MORE SWITCH GROUPS CROSSING A THRESHOLD | A, B, C, E, J |

FIG. 17F

INVERTER STATE TABLE 1700

| STATE | SUB-STATE | DESCRIPTION | NEXT STATE TRIGGER | NEXT STATE |
|---|---|---|---|---|
| THERMAL BOOTSTRAP "E" 1606 | N/A | USE SWITCH GROUPS THAT HAVE TIGHT THERMAL COUPLING TO ALLOW ONE OR MORE SWITCH GROUPS THAT ARE OPERATING TO CONDUCT, CONVECT, AND/OR RADIATE THERMAL ENERGY TO ANOTHER ONE OR MORE SWITCH GROUPS, THEREBY ENABLING THE OTHER SWITCH GROUPS TO BEGIN SWITCHING ONLY AFTER REACHING A THERMAL (TEMPERATURE RISE) SET POINT. | SENSED NEW VEHICLE OPERATING STATE VIA SPEED OR TORQUE OF OUTPUT | A, B, C, E, J |
| | | | RECEIVED COMMAND FOR NEW VEHICLE OPERATING STATE | A, B, C, E, J |
| | | | SENSED OPEN CIRCUIT FAULT | F0 |
| | | | SENSED SHORT CIRCUIT FAULT | G0 |
| | | COUPLED WITH ONE OR MORE COOLING STATES THAT ENABLE SUCH CONTROLLED HEAT TRANSFER BETWEEN SWITCH GROUPS (E.G., SERIES FLOW COOLING STATES W OR X). | SENSED (OUTPUT) PHASES ARE SHORTED FAULT | H |
| | | | SENSED TEMPERATURE OF ONE OR MORE DEVICES IN ONE OR MORE SWITCH GROUPS CROSSING A THRESHOLD | A, B, C, E, J |

FIG. 17G

INVERTER STATE TABLE 1700

| STATE | SUB-STATE | DESCRIPTION | NEXT STATE TRIGGER | NEXT STATE |
|---|---|---|---|---|
| SWITCH(ES) FAILED OPEN "F" 1608 | OPEN CIRCUIT FAILURE DETECTION "F0" 1708 | DIAGNOSE THE SWITCH GROUP(S) THAT HAVE FAILED OPEN-CIRCUIT. COUPLED WITH ONE OR MORE COOLING STATES TO PROVIDE COOLING TO THE SWITCH GROUPS THAT REMAIN ACTIVE AND REDUCE OR ELIMINATE COOLING FROM THOSE SWITCH GROUPS THAT ARE NO LONGER ACTIVE (E.G., SERIES FLOW COOLING STATES W OR X OR GROUP 1 OR 2 ONLY COOLING STATES Y OR Z). | SENSED GROUP 1 SWITCH(ES) FAILED OPEN | F1 |
| | | | SENSED GROUP 2 SWITCH(ES) FAILED OPEN | F2 |
| | | | RECEIVED COMMAND FOR NEW VEHICLE OPERATING STATE (E.G., BASED ON FAULT) | F3, J |
| | | | SENSED SWITCH(ES) OF AT LEAST ONE GROUP FAILED SHORT | G0 |
| | | | SENSED TEMPERATURE OF ONE OR MORE DEVICES IN ONE OR MORE SWITCH GROUPS CROSSING A THRESHOLD | F3, J |

FIG. 17H

INVERTER STATE TABLE 1700

| STATE | SUB-STATE | DESCRIPTION | NEXT STATE TRIGGER | NEXT STATE |
|---|---|---|---|---|
| SWITCH(ES) FAILED OPEN "F" 1608 | GROUP 1 SWITCH(ES) FAILED OPEN "F1" 1710 | OPERATE WITH SWITCH GROUP 2. COUPLED WITH ONE OR MORE COOLING STATES TO PROVIDE COOLING TO THE SWITCH GROUPS THAT REMAIN ACTIVE AND REDUCE OR ELIMINATE COOLING FROM THOSE SWITCH GROUPS THAT ARE NO LONGER ACTIVE (E.G., SERIES FLOW COOLING STATES W OR X OR GROUP 1 OR 2 ONLY COOLING STATES Y OR Z). | SENSED GROUP 2 SWITCH(ES) FAILED OPEN | F2, J |
| | | | RECEIVED COMMAND FOR NEW VEHICLE OPERATING STATE (E.G., BASED ON FAULT) | F3, J |
| | | | SENSED SWITCH(ES) OF AT LEAST ONE GROUP FAILED SHORT | G0 |
| | | | SENSED TEMPERATURE OF ONE OR MORE DEVICES IN ONE OR MORE SWITCH GROUPS CROSSING A THRESHOLD | F3, J |

FIG. 17I

INVERTER STATE TABLE 1700

| STATE | SUB-STATE | DESCRIPTION | NEXT STATE TRIGGER | NEXT STATE |
|---|---|---|---|---|
| SWITCH(ES) FAILED OPEN "F" 1608 | GROUP 2 SWITCH(ES) FAILED OPEN "F2" 1712 | OPERATE WITH SWITCH GROUP 1. COUPLED WITH ONE OR MORE COOLING STATES TO PROVIDE COOLING TO THE SWITCH GROUPS THAT REMAIN ACTIVE AND REDUCE OR ELIMINATE COOLING FROM THOSE SWITCH GROUPS THAT ARE NO LONGER ACTIVE (E.G., SERIES FLOW COOLING STATES W OR X OR GROUP 1 OR 2 ONLY COOLING STATES Y OR Z). | SENSED GROUP 1 SWITCH(ES) FAILED OPEN | F1, J |
| | | | RECEIVED COMMAND FOR NEW VEHICLE OPERATING STATE (E.G., BASED ON FAULT) | F3, J |
| | | | SENSED SWITCH(ES) OF AT LEAST ONE GROUP FAILED SHORT | G0 |
| | | | SENSED TEMPERATURE OF ONE OR MORE DEVICES IN ONE OR MORE SWITCH GROUPS CROSSING A THRESHOLD | F3, J |

FIG. 17J

INVERTER STATE TABLE 1700

| STATE | SUB-STATE | DESCRIPTION | NEXT STATE TRIGGER | NEXT STATE |
|---|---|---|---|---|
| SWITCH(ES) FAILED OPEN "F" 1608 | ALL-PHASE FREEWHEEL WITH OPEN-CIRCUIT FAILURE "F3" 1714 | TURNS ON THE LOWER OR UPPER (BUT NOT BOTH) HALF-BRIDGES OF ALL PHASES OF ONE OR MORE SWITCH GROUPS TO CREATE A SHORT CIRCUIT THROUGH THE OUTPUT PHASES (E.G., THROUGH THE MOTOR PHASES) TO REDUCE ANY DC BUS VOLTAGE OVERSHOOT SEEN BY THE DC INPUT DEVICE WHEN HIGH INDUCTANCE ENERGY IS PRESENT ON THE OUTPUT PHASES (E.G., HIGH BACK EMF FROM HIGH-SPEED OPERATION OF A TRACTION OR GENERATOR MOTOR). | SENSED OTHER SWITCH GROUP SWITCH(ES) FAILED OPEN | F0, J |
| | | | RECEIVED COMMAND FOR NEW VEHICLE OPERATING STATE (E.G., BASED ON FAULT) | F1, F2, J |
| | | | SENSED SWITCH(ES) OF AT LEAST ONE GROUP FAILED SHORT | G0 |
| | | COUPLED WITH ONE OR MORE COOLING STATES TO PROVIDE COOLING TO THE SWITCH GROUPS THAT RECEIVE THE HIGHEST THERMAL BURDEN (E.G., SERIES FLOW COOLING STATES W OR X OR GROUP 1 OR 2 ONLY COOLING STATES Y OR Z). | SENSED TEMPERATURE OF ONE OR MORE DEVICES IN ONE OR MORE SWITCH GROUPS CROSSING A THRESHOLD | J |

FIG. 17K

INVERTER STATE TABLE 1700

| STATE | SUB-STATE | DESCRIPTION | NEXT STATE TRIGGER | NEXT STATE |
|---|---|---|---|---|
| SWITCH(ES) FAILED SHORTED "G" 1610 | SHORT CIRCUIT FAILURE DETECTION "G0" 1716 | DIAGNOSE THE SWITCH GROUP(S) THAT HAVE FAILED SHORT-CIRCUITED. COUPLED WITH ONE OR MORE COOLING STATES TO PROVIDE COOLING TO THE SWITCH GROUPS THAT HAVE HIGH THERMAL LOAD FROM THE SHORT CIRCUIT EVENT(S) (E.G., SERIES FLOW COOLING STATES W OR X OR GROUP 1 OR 2 ONLY COOLING STATES Y OR Z). | SHORT CIRCUIT IS VERIFIED AND INVERTER IS PROGRAMMED TO ATTEMPT AUTOFUSE OF SHORTED GROUP(S) | G1 |
| | | | SHORT CIRCUIT IS VERIFIED AND INVERTER IS PROGRAMMED TO ENTER ALL-PHASE FREEWHEEL (E.G., WITH OUTPUT PHASES THAT HAVE PASSIVE REGEN TORQUE SUCH AS A PMAC MOTOR). | G2 |
| | | | RECEIVED COMMAND FOR NEW VEHICLE OPERATING STATE (E.G., BASED ON FAULT) | F0, G2, J |
| | | | SENSED TEMP. OF ONE OR MORE DEVICES IN ONE OR MORE SWITCH GROUPS CROSSING A THRESHOLD | J |

FIG. 17L

INVERTER STATE TABLE 1700

| STATE | SUB-STATE | DESCRIPTION | NEXT STATE TRIGGER | NEXT STATE |
|---|---|---|---|---|
| SWITCH(ES) FAILED SHORTED "G" 1610 | AUTOFUSE FAILED SWITCH(ES) "G1" 1718 | ATTEMPT TO CONVERT ONE OR MORE SHORT-CIRCUITED DEVICES INTO ONE OR MORE OPEN-CIRCUITED DEVICES. | ATTEMPT IS SUCCESSFUL AT GENERATING AN OPEN CIRCUIT | F0 |
| | | COUPLED WITH ONE OR MORE COOLING STATES TO PROVIDE COOLING TO THE SWITCH GROUPS THAT HAVE HIGH THERMAL BURDEN BUT ALSO TO REDUCE OR ELIMINATE COOLING TO THE SWITCH(ES) THAT HAVE FAILED SHORTED IN AN ATTEMPT TO OVERHEAT THOSE SWITCH(ES) FURTHER TO CAUSE AN OPEN CIRCUIT FAILURE OR OTHER "TRIPPED FUSE" TYPE OUTCOME (E.G., SERIES FLOW COOLING STATES W OR X OR GROUP 1 OR 2 ONLY COOLING STATES Y OR Z). | ATTEMPT IS UNSUCCESSFUL AT GENERATING AN OPEN CIRCUIT AND INVERTER IS PROGRAMMED TO ENTER ALL-PHASE FREEWHEEL | G2 |
| | | | RECEIVED COMMAND FOR NEW VEHICLE OPERATING STATE (E.G., BASED ON FAULT) | F0, J |
| | | | ATTEMPT IS UNSUCCESSFUL, BUT INVERTER IS PROGRAMMED TO ENTER A TIMED WAIT STATE BEFORE TRYING AGAIN | G3 |

FIG. 17M

INVERTER STATE TABLE 1700

| STATE | SUB-STATE | DESCRIPTION | NEXT STATE TRIGGER | NEXT STATE |
|---|---|---|---|---|
| SWITCH(ES) FAILED SHORTED "G" 1610 | ALL-PHASE FREEWHEEL "G2" 1720 | TURNS ON THE LOWER OR UPPER (BUT NOT BOTH) HALF-BRIDGES OF ALL PHASES OF ONE OR MORE SWITCH GROUPS TO CREATE A SHORT CIRCUIT THROUGH THE OUTPUT PHASES (E.G., THROUGH THE MOTOR PHASES) TO REDUCE ANY DC BUS VOLTAGE OVERSHOOT SEEN BY THE DC INPUT DEVICE WHEN HIGH INDUCTANCE ENERGY IS PRESENT ON THE OUTPUT PHASES (E.G., HIGH BACK EMF FROM HIGH-SPEED OPERATION OF A TRACTION OR GENERATOR MOTOR). | SENSED OTHER SWITCH GROUP SWITCH(ES) FAILED SHORT | G0, J |
| | | | RECEIVED COMMAND FOR NEW VEHICLE OPERATING STATE (E.G., BASED ON FAULT) | G1, G3, J |
| | | | SENSED SHORTED SWITCH GROUP SWITCH(ES) BECOME OPEN CIRCUIT | F0 |
| | | COUPLED WITH ONE OR MORE COOLING STATES TO PROVIDE COOLING TO THE SWITCH GROUPS THAT RECEIVE THE HIGHEST THERMAL BURDEN (E.G., SERIES FLOW COOLING STATES W OR X OR GROUP 1 OR 2 ONLY COOLING STATES Y OR Z). | SENSED TEMPERATURE OF ONE OR MORE DEVICES IN ONE OR MORE SWITCH GROUPS CROSSING A THRESHOLD | J |

FIG. 17N

INVERTER STATE TABLE 1700

| STATE | SUB-STATE | DESCRIPTION | NEXT STATE TRIGGER | NEXT STATE |
|---|---|---|---|---|
| SWITCH(ES) FAILED SHORTED "G" 1610 | TIMEOUT "G3" 1722 | ALLOWS FOR A PAUSE OF SWITCH ACTIVATION BEFORE RE-ENTERING ANOTHER OPERATING STATE BASED ON A COMMAND FROM THE VEHICLE CONTROLLER, A COUNTER, A TIMER, OR OTHER COMMAND.<br><br>COUPLED WITH ONE OR MORE COOLING STATES TO PROVIDE COOLING TO THE SWITCH GROUPS THAT RECEIVE THE HIGHEST THERMAL BURDEN AS PART OF THE PREVIOUS SERIES (E.G., SERIES FLOW COOLING STATES W OR X OR GROUP 1 OR 2 ONLY COOLING STATES Y OR Z). | TIMER OR COUNT THRESHOLD OR TRIGGER IS REACHED | G1, G2, J |
| | | | RECEIVED COMMAND FOR NEW VEHICLE OPERATING STATE (E.G., BASED ON FAULT) | G1, G2, J |
| | | | SENSED SHORTED SWITCH GROUP SWITCH(ES) BECOME OPEN CIRCUIT | F0 |

FIG. 17O

INVERTER STATE TABLE 1700

| STATE | SUB-STATE | DESCRIPTION | NEXT STATE TRIGGER | NEXT STATE |
|---|---|---|---|---|
| PHASE(S) SHORTED, PROTECT FAST SWITCHES "H" 1612 | N/A | A DESATURATION OR OTHER INDICATION OF SHORT CIRCUIT ON THE OUTPUT PHASE(S) IS DETECTED WHILE TURNING ON A FAST-TYPE SWITCH THAT HAS FASTER SWITCHING CHARACTERISTICS AND/ OR LESS ROBUSTNESS TO SWITCHING INTO A SHORT CIRCUIT ON THE OUTPUT.  WHEN THE SHORT CIRCUIT IS DETECTED, SWITCH GROUPS THAT DO NOT HAVE FAST-TYPE SWITCH(ES) TURN ON, AND SWITCH GROUPS WITH FAST SWITCH(ES) THAT ARE ON ARE TURNED OFF. THE SLOWER RISE TIME OF THE SLOW-TYPE SWITCH(ES) ALLOWS THE CONTROL BOARDS, GATE DRIVE CIRCUITS, CONTROL LOGIC, AND/OR SENSOR CIRCUITS TO VERIFY THE VALIDITY OF THE FAILURE. THIS MECHANISM ALSO ALLOWS THE DETECTION THRESHOLD FOR THE FAST-TYPE PROTECTION SEQUENCE TO BE SENSITIVE. | A PHASE SHORT CIRCUIT IS VERIFIED AND OUTPUT PHASES HAVE PASSIVE REGEN TORQUE (E.G., PMAC MOTOR) | J |
| | | | A PHASE SHORT CIRCUIT IS VERIFIED AND OUTPUT PHASES HAVE NO TORQUE IN FREEWHEEL (E.G., ACIM MOTOR) | F3 |
| | | | A PHASE SHORT CIRCUIT AT THE OUTPUT IS NOT VERIFIED | G0 |
| | | | SENSED TEMPERATURE OF ONE OR MORE DEVICES IN ONE OR MORE SWITCH GROUPS CROSSING A THRESHOLD | J |

FIG. 17P

INVERTER STATE TABLE 1700

| STATE | SUB-STATE | DESCRIPTION | NEXT STATE TRIGGER | NEXT STATE |
|---|---|---|---|---|
| SAFE POWER DOWN "J" 1614 | N/A | ALLOWS FOR A CONTROLLED SHUTDOWN OF THE INVERTER OUTPUT AND OUTPUT LOAD EXCITATION (E.G., MOTOR PHASE EXCITATION) VIA DE-POWERING OF ALL SWITCH GROUPS AND GATE DRIVE CIRCUITS IN SEQUENCE WITH A DISCONNECTION OF DC INPUT POWER AND VOLTAGE VIA INTERNAL OR EXTERNAL MECHANICAL, ELECTROMECHANICAL, SEMICONDUCTOR, OR OTHER SWITCH DEVICE(S) AND ALSO IN SEQUENCE WITH ANY OTHER SAFETY MECHANISMS SUCH AS COMMUNICATION OF STATE AND A DISCHARGE OF THE HIGH VOLTAGE ENERGY RETAINED IN CAPACITORS, INDUCTORS, OR OTHER DEVICES.

COUPLED WITH ONE OR MORE COOLING STATES TO PROVIDE COOLING TO THE SWITCH GROUPS THAT RECEIVE THE HIGHEST THERMAL BURDEN DURING SHUTDOWN. | SEQUENCE IS COMPLETED | K |
| | | | RECEIVED COMMAND FOR NEW VEHICLE OPERATING STATE | A, B, C, D, E |

FIG. 17Q

INVERTER STATE TABLE 1700

| STATE | SUB-STATE | DESCRIPTION | NEXT STATE TRIGGER | NEXT STATE |
|---|---|---|---|---|
| STANDBY "K" 1616 | N/A | AWAIT ACTION FROM VEHICLE CONTROLLER. ALL GATE DRIVE CIRCUITS ARE DE-POWERED. | RECEIVED COMMAND FOR NEW VEHICLE OPERATING STATE | A, B, C, D, E |

FIG. 17R

CONVERTER EMPLOYING DIFFERING SWITCH TYPES IN PARALLEL

CROSS REFERENCE TO RELATED APPLICATIONS

This application is related to and claims priority under 35 U.S.C. § 119(e) from U.S. Patent Application No. 62/310,463, filed Mar. 18, 2016, titled "CONVERTER EMPLOYING DIFFERING SWITCH TYPES IN PARALLEL," the entire contents of each are incorporated herein by reference for all purposes.

TECHNICAL FIELD

This disclosure relates generally to electrical power conversion systems, and more specifically to voltage-source converters.

BACKGROUND

In many power applications, direct-current-to-alternating-current (DC-to-AC), AC-to-DC, DC-to-DC voltage-source converters, and the like have conflicting requirements imposed thereon. Such requirements may include, but are not limited to, high efficiency, high power density, low cost, long service life, high continuous and peak operating current, high reliability, high functional safety, and robust short-circuit current reliability. To complicate matters, while some inverters are employed in power applications in which their particular operating ranges and environments may be limited, thus allowing the use of components particularly suited to those applications, such as certain types of power transistors, inverters employed in other power applications that require a broader range of operating current, functionality, and the like often do not perform in an exemplary manner across the entirety of those ranges.

BRIEF DESCRIPTION OF THE DRAWINGS

FIG. 13 is an example vehicle operating state table for the vehicle operating states of FIG. 12.

FIG. 15 is an example cooling state table for the cooling states of FIG. 14.

FIGS. 17A through 17R collectively are an example inverter state table for the inverter operating states of FIG. 16.

DETAILED DESCRIPTION

Aspects of the present disclosure involve a voltage-source converter that may include a plurality of switch positions that are collectively coupled to convert an input to an output. In an example, at least one of the switch positions may include a first switch of a first switch type and a second switch of a second switch type different from the first switch type, with the first switch being coupled in parallel to the second switch. The converter may also include a switch control circuit to generate, for each of the plurality of switch positions, a first control signal to operate the first switch of the switch position, and a second control signal to operate the second switch of the switch position, with the second control signal being different from the first control signal.

Accordingly, in some embodiments, the switch control circuit may operate the first and second switches at each switch position in multiple operating modes to adapt to various operating environments, certain internal and/or external events, and other variables affecting inverter operation. Various embodiments of the voltage-source inverter may include, but are not limited to, a DC-to-AC converter (e.g., inverter), an AC-to-DC converter, and a DC-to-DC converter.

Figure 1A:
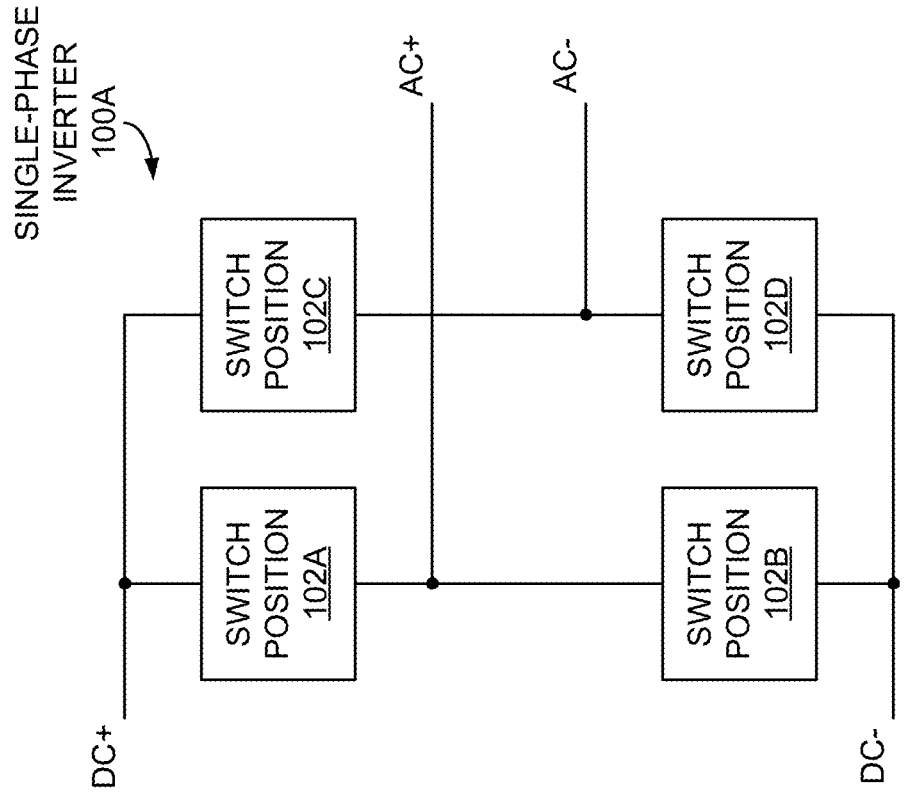
FIG. 1A is a high-level block diagram of an example single-phase inverter including multiple switch positions in a single-phase or H-bridge configuration.
Figure 1B:
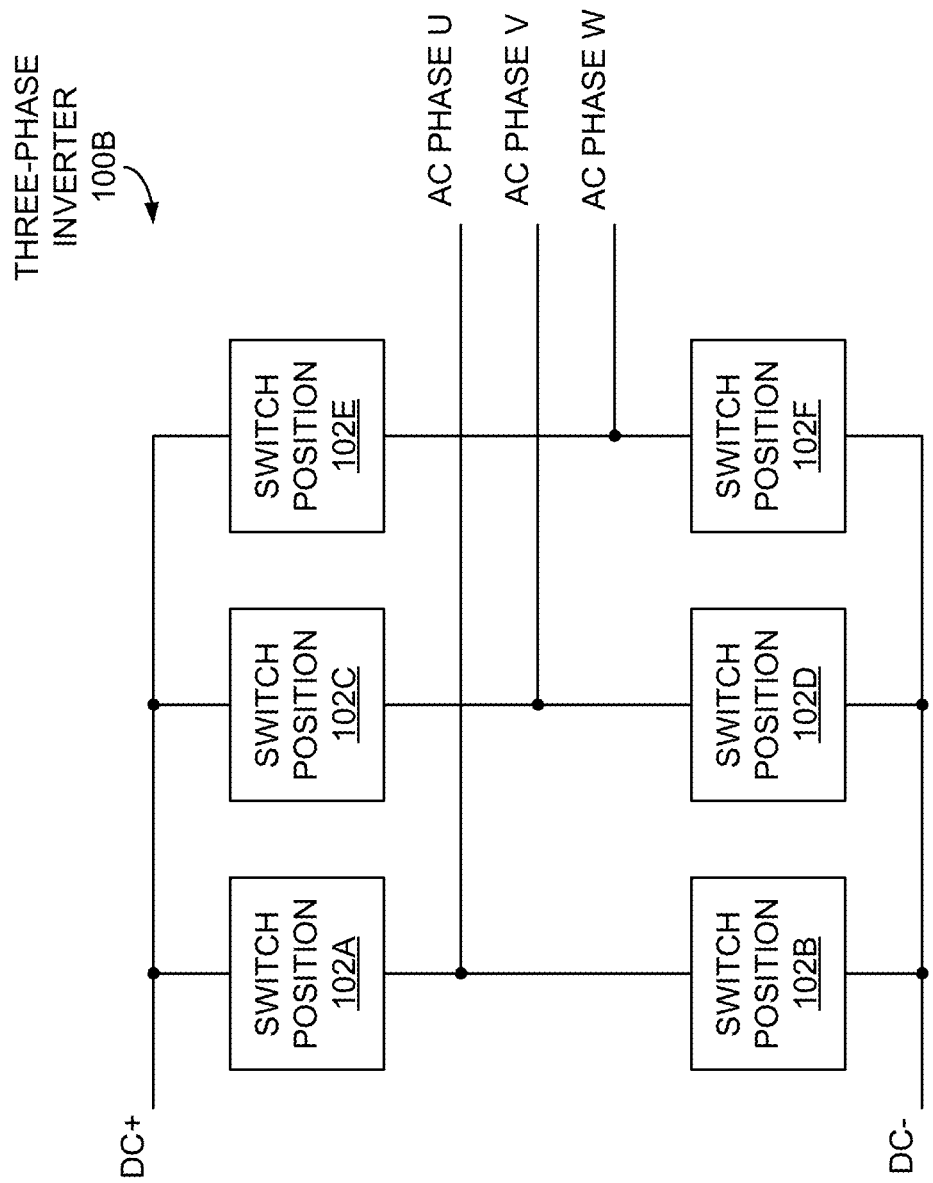
FIG. 1B is a high-level block diagram of an example three-phase inverter including multiple switch positions in a three-phase or "six-pack" configuration.

FIGS. 1A and 1B are block diagrams of just two example inverters 100 that include a number of switch positions 102 for taking DC input voltages as input and producing at least one AC voltage output. However, many other types of inverters with different numbers and configurations of switch positions may employ various aspects of the particular embodiments described hereinafter. For example, a multi-level inverter having more than the two vertical levels of switch positions 102 depicted in FIGS. 1A and 1B may employ the same types of switch positions 102 discussed in greater detail below. Moreover, other types of voltage-source converters other than inverters, as mentioned above, may also employ various numbers and configurations of switch positions.

FIG. 1A is a high-level block diagram of an example single-phase inverter 100A including multiple switch positions 102A, 102B, 102C, and 102D in an "H-bridge" configuration that receives a DC input as a first DC voltage DC+, as well as a second DC voltage DC− that is less than the first DC voltage DC+. In an example, the second DC voltage DC− is a negative DC voltage of substantially the same magnitude as the first (positive) DC voltage DC+, although the single-phase inverter is not limited to such values for the first DC voltage DC+ and the second DC voltage DC−. A switch control circuit (not depicted in FIG. 1A) operates (e.g., opens and closes) the switch positions 102A-102D according to some timing scheme to generate an AC output voltage across a first AC connection AC+ and a second AC connection AC−. For example, at times, switch positions 102A and 102D may be closed while switch positions 102B and 102C are open to impress the first DC voltage DC+ onto the first AC connection AC+ and the second DC voltage DC− onto the second AC connection AC−. At other times, switch positions 102A and 102D may be open while switch positions 102B and 102C are closed to impress the second DC voltage DC− onto the first AC connection AC+ and the first DC voltage DC+ onto the second AC connection AC−. The voltages on the AC connections AC+ and AC− may be further filtered and/or conditioned (e.g., via capacitors, transformers, and so forth) to yield an AC output voltage useful to drive a particular electrical load, such as, for example, a motor, battery charger, and so on.

In another inverter embodiment, FIG. 1B is a high-level block diagram of an example three-phase inverter 100B including multiple switch positions 102A-102F in a three-phase or "six-pack" configuration. As with the inverter 100A of FIG. 1A, the inverter 100B receives a first DC input voltage DC+ and a second DC input voltage DC−. A switch control circuit (not illustrated in FIG. 1B) may operate (e.g., open and close) the switch positions 102A-102F according to a particular timing regime to generate a three-phase AC voltage output, with a first AC connection AC PHASE U carrying a first phase, a second AC connection AC PHASE V carrying a second phase, and a third AC connection AC PHASE W carrying a third phase. As with the single-phase inverter 100A of FIG. 1A, the three-phase inverter 100B may incorporate filtering and/or other conditioning circuitry to form three AC phases that are useful for driving one or more electrical loads.

Figure 2:
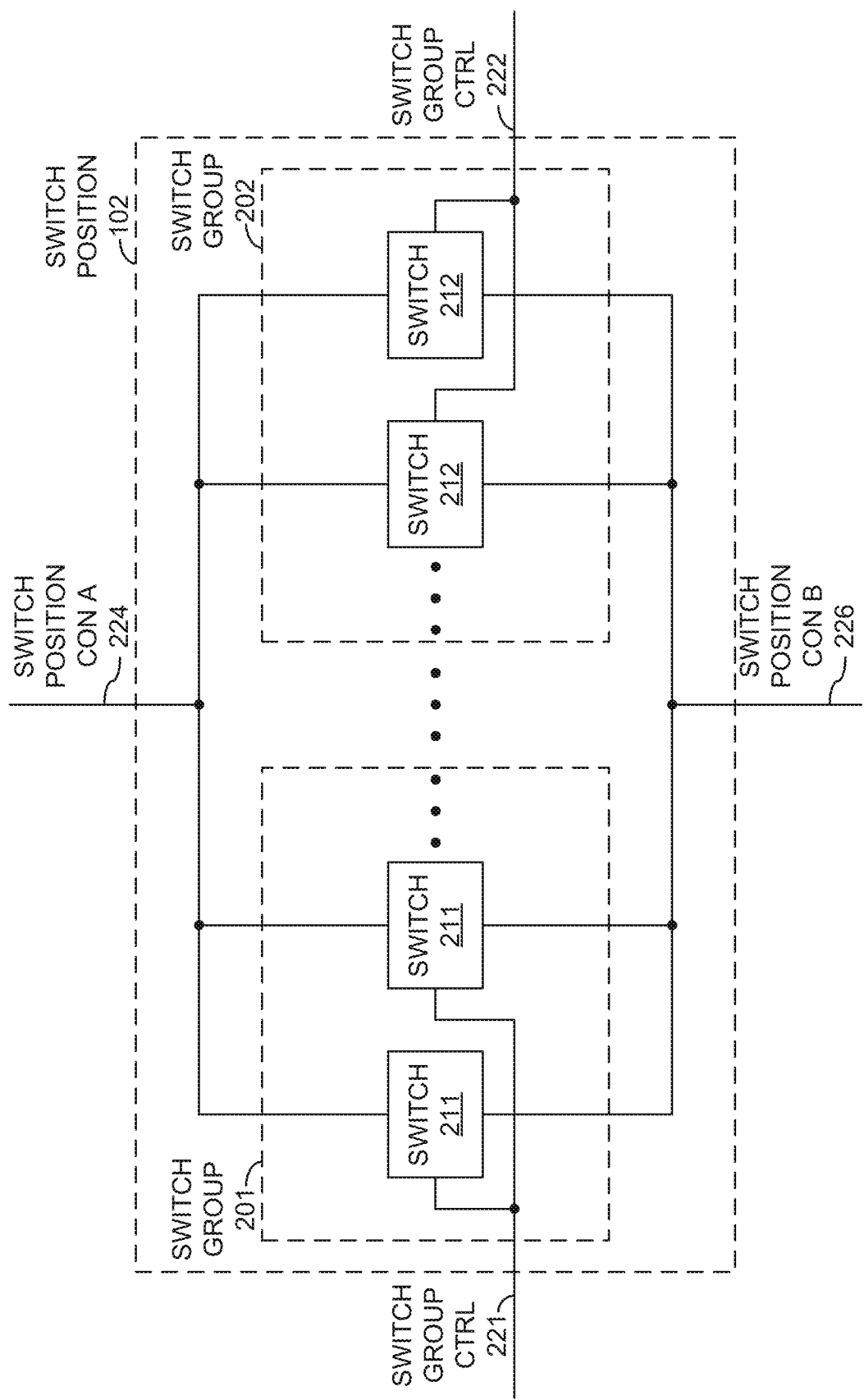
FIG. 2 is a block diagram of an example inverter switch position including multiple switch groups coupled in parallel, with different control signals for each switch group, and with each switch group having one or more individual switches coupled in parallel.

FIG. 2 is a block diagram of an example inverter switch position 102 that may be employed in the inverters 100A and 100B of FIGS. 1A and 1B, respectively, as well as many other inverters differently configured. As depicted in FIG. 2, instead of employing a single switch, the switch position 102 may include multiple switch groups 201, 202 coupled in parallel, with each switch group 201, 202 having an independent control signal 221, 222, and with each switch group 201, 202 including one or more individual switches 211, 212 which may also be coupled in parallel. In the specific example of FIG. 2, the first switch group 201 includes multiple switches 211 in parallel, while the second switch group 202 includes multiple switches 212 in parallel, with each switch 211, 212 within the same switch group 201 or 202 having the same control signal 221 or 222. While the discussion below concentrates primarily on switch positions 102 that include exactly two switch groups 201 and 202, other types of switch positions 102 that include more than two switch groups 201 and 202 are also possible based on the various characteristics of the switch groups 201 discussed more fully below.

Although most of the embodiments presented below involve only one or more switches 211, 212 connected in parallel within each switch group 201, 202, additional switches 211, 212 may be coupled in series with one or more of the switches 211, 212 within a switch group 201, 202 and have the same control signal, in some examples. Additionally, although most embodiments presented below involve only switch groups 201, 202 in parallel, additional switch groups 201, 202 may be coupled in series with the at least two switch groups 201, 202 that are coupled in parallel. In addition, in various embodiments discussed hereinafter, the switches 211, 212 of each switch group 201, 202 are presumed to be transistors, thyristors, or the like. Examples of transistor switches include, for example, silicon-based transistors, wide-bandgap (WBG) transistors (e.g., those transistors employing silicon carbide (SiC), gallium nitride (GaN), and the like), or other transistors suitable for power-switching purposes. Particular types of transistors or thyristors that may be employed as the switches 211, 212 include, but are not limited to, metal-oxide-semiconductor field-effect transistors (MOSFETs), insulated-gate bipolar transistors (IGBTs), junction (gate) field-effect transistors (JFETs), integrated gate-commutated thyristors (IGCTs), high-electron-mobility transistors (HEMTs) (also known as modulation-doped field-effect transistors (MODFETs) or heterostructure field-effect transistors (HFETs)), metal-semiconductor field-effect transistors (MESFETs), bipolar junction transistors (BJTs), ballistic connection transistors (BCTs), gate turn-off thyristors (GTOs), and so forth, either N-type or P-type. Moreover, such transistors or thyristors may be fabricated using, for example, homoepitaxial Si, homoepitaxial SiC, homoepitaxial GaN, homoepitaxial gallium arsenide (GaAs), heteroepitaxial GaN-on-Si, heteroepitaxial GaN-on-SiC, or any other similar crystalline overlayer on a crystalline substrate combination.

Also, such a transistor may or may not include body diodes, or be provided with external "anti-parallel" or "flyback" diodes to provide overcurrent protection to the device. The diodes may, for example, be of a P-N, junction barrier Schottky (JBS), Schottky-barrier diode (SBD), or other construction, and may include one or more materials, such as Si, SiC, GaN, GaN-on-Si, GaAs, or others.

In some examples, the switches 211 of the first switch group 201 are of a different switch type or material, and thus have different operating characteristics or ratings, than the switches 212 of the second switch group 202. In one embodiment, the switches 211 of the first switch group 201 may be relatively high-current capacity transistors due to the use of a relatively large die area. The switches 211 may also be relatively lower cost as well. However, such transistors may also be relatively slow-switching devices and/or may exhibit higher forward conduction losses due to those same physical characteristics. On the other hand, the switches 212 of the second switch group 202 may be high-performance transistors that generally possess relatively fast switching times and/or lower forward conduction losses due to a relatively small die area compared to the switches 211 of the first switch group 201 for the same rated conditions, but may be less thermally robust and/or may have a higher cost. Under these circumstances, an example of a switch 211 of the first switch group 201 may be a silicon-based IGBT with a relative large die area that is thermally robust and may withstand switching into a short circuit at an output phase or output connection of the inverter. Further, an example of a switch 212 of the second switch group 202 may be a high-performance SiC or GaN MOSFET that employs a lower total die area than the switches 211 of the first switch group 201, resulting in a relatively faster switching response while being less thermally robust and less capable of withstanding switching into a short circuit. The switches 212 of the second switch group 202 may also lower forward conduction losses, but a higher cost per unit die and unit area, than the switches 211 of the first switch group 201.

In some embodiments, the inverter may employ the first switch group 201 and the second switch group 202 separately or in tandem to exploit the varying characteristics of the switches 211 and 212 in the switch groups 201 and 202 in one or more switch positions 102 by using a first switch group control signal 221 for the switches 211 of the first switch group 201 and a separate second switch group control signal 222 for the switches 211 of the second switch group 202 to open and close the respective switches. In examples in which the switches 211 and 212 are transistors, the switch group control signals 221 are applied, either directly or indirectly, to the gate or base of the transistors to open or close the switch between the drain and source, or collector and emitter, of the switch 211 and 212. Use of the separate switch group control signals 221 and 222 allows independent control and operation of the switches 211 and 212 of the switch groups 201 and 202, thus facilitating use of the switch groups 201 and 202 to implement different functional modes, or to address various operational needs, emergent events, or other circumstances that occur from time to time during the operation of the inverter 100. Examples of such modes, events, and the like, as well as the corresponding use of the switch groups 201 and 202, are presented in greater detail below. In other examples, more than one switch type may be employed in one or more of the switch groups 201, 202. However, each of the switches (e.g., switches 211) within a particular switch group (e.g., switch group 201) may still receive the same control signal (e.g., switch group control signal 221).

In some examples, some switch positions 102 may have a different number of switch groups 201 and 202 compared to other switch positions 102. For example, in the single-phase inverter 100A of FIG. 1A, the switches of switch positions 102C and 102D may be switched at a relatively low frequency (e.g., 60 Hertz (Hz)), while the switches of switch positions 102A and 102B may be switched at a much higher frequency. Consequently, the switch positions 102C and 102D each may only include a single switch group 201 of relatively slow switches 211, while the switch positions 102A and 102B may include multiple switch groups 201 and 202 of differing switch speeds.

Figure 3:
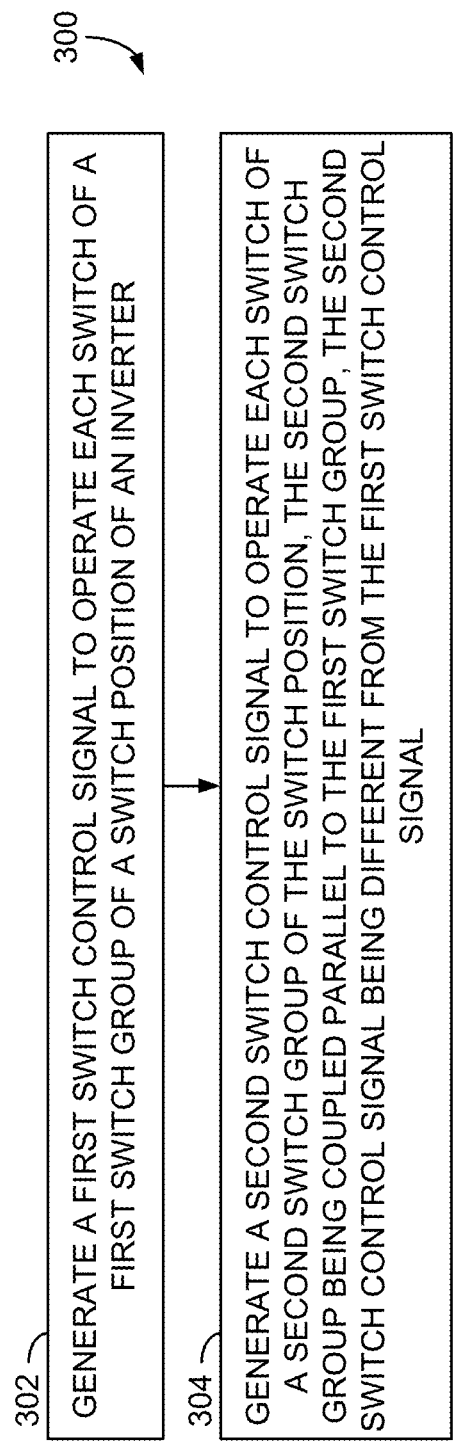
FIG. 3 is a flow diagram of an example method of operating the switch groups of the switch position of FIG. 2.

FIG. 3 is a flow diagram of an example method 300 of operating the switch groups (e.g. switch groups 201 and 202) of a switch position (e.g., switch position 201). While the method 300 is described below in conjunction with the inverter 100 and its various components, as disclosed above, other embodiments of the method 300 may employ different devices or systems not specifically discussed herein.

In the method 300, a first switch control signal (e.g., switch group control signal 221) may be generated to operate each switch (e.g., switch 211) of a first switch group (e.g., switch group 201) of a switch position (e.g., switch position 102) of an inverter (e.g., inverter 100A or inverter 100B) (operation 302). Also, a second switch control signal (e.g., switch group control signal 222) may be generated to operate each switch (e.g., switch 212) of a second switch group (e.g., switch group 202) of the switch position (e.g., switch position 102) of the inverter (operation 304). In at least some examples, and at least during some time periods, the second switch control signal is different from the first switch control signal.

While FIG. 3 depicts the operations 302 and 304 of the method 300 as being performed in a single particular order, the operations 302 and 304 may be performed simultaneously or currently, as well as continuously and/or repetitively over some period of time.

Figure 4A:
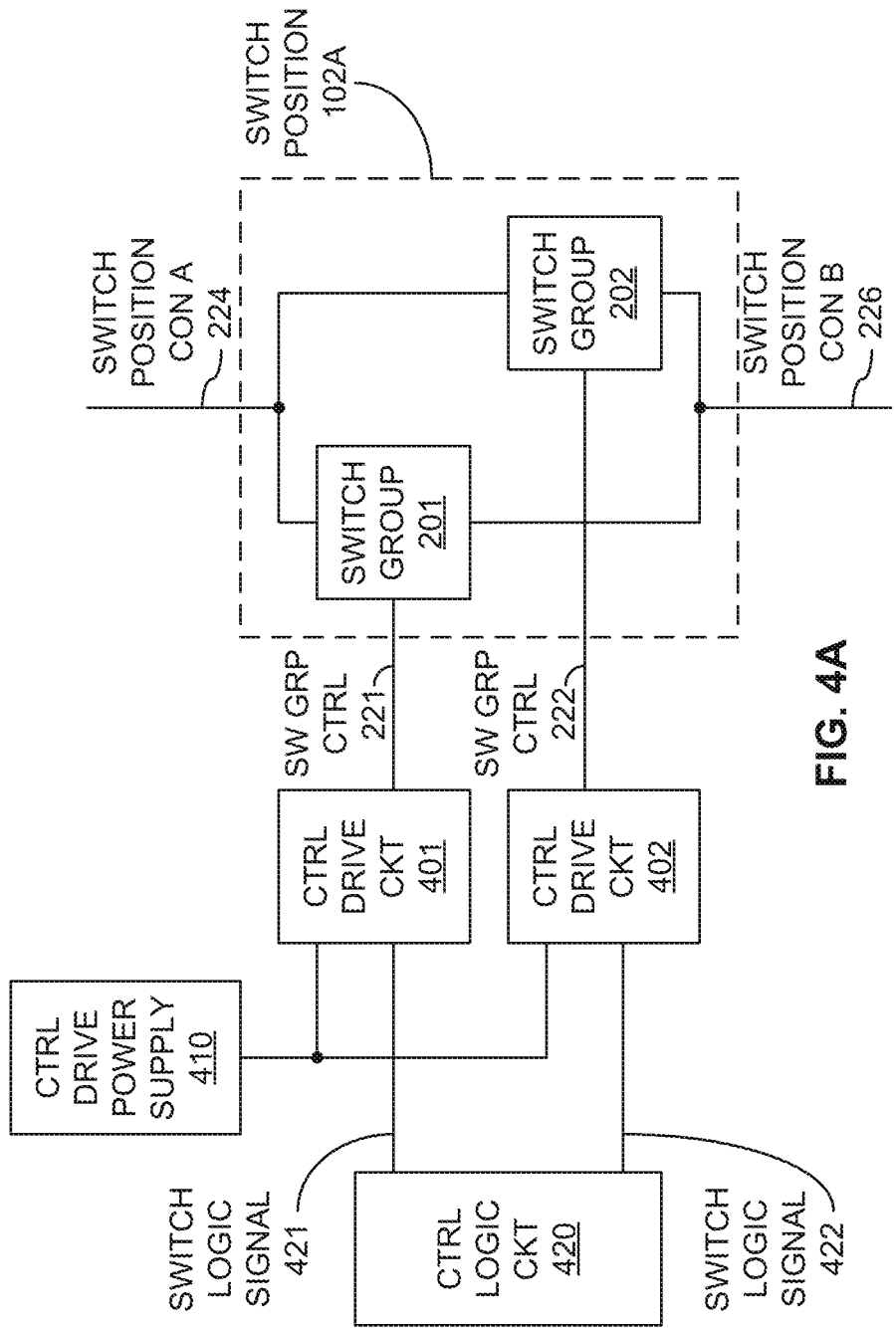
FIG. 4A is a block diagram of an example switch position with a single control drive power supply for both switch groups.

FIG. 4A is a block diagram of an example switch position 102A spanning a switch position connection A 224 and a switch position connection B 226 with a single control drive power supply 410 for both switch groups 201 and 202. More specifically, each switch group 201 and 202 of the switch position 102A is controlled or driven by a corresponding control drive circuit 401 and 402, each of which is supplied a power supply voltage via the same control device power supply 410 and is controlled by the same control logic circuit 420. In an example, each control drive circuit 401 and 402 may include a switch arrangement (not shown in FIG. 4A), such as an H-bridge, driving a transformer or other isolating component, which may in turn supply power to a totem pole output or other switch-driving arrangement (also not depicted in FIG. 4A) that controls the switches of its corresponding switch group 201 and 202. In some embodiments, each control drive circuit 401 and 402 may also include a power supply point-of-load (POL) scaling circuit (not depicted in FIG. 4A) to control the level of the power supply rails provided to the switch-driving arrangement.

In embodiments in which the switch groups 201 and 202 include transistors as switching elements, the switch-driving arrangement may drive a gate (or base) of the transistor to open or close the switch across the drain and source (or emitter and collector) of the transistor.

The control logic circuit 420 may control each control drive circuit 401 and 402 by way of corresponding switch logic signals 421 and 422. In one example, the switch logic signals 421 and 422 may be transmitted using an isolation circuit (not illustrated in FIG. 4A), such as a light-emitting diode (LED)/photodiode pair to control the switch-driving arrangement mentioned above. The control logic circuit 420 may be a hardware logic-based control circuit, such as a field-programmable gate array (FPGA) or application-specific integrated circuit (ASIC), for example. In other embodiments, the control logic circuit 420 may include one or more programmable processors, such as microprocessors, microcontrollers, and/or digital signal processors (DSPs) executing software or firmware instructions stored in a memory accessible by the processors. In another example, some combination of hardware logic circuitry and programmable processor may serve as the control logic circuit 420.

Figure 4B:
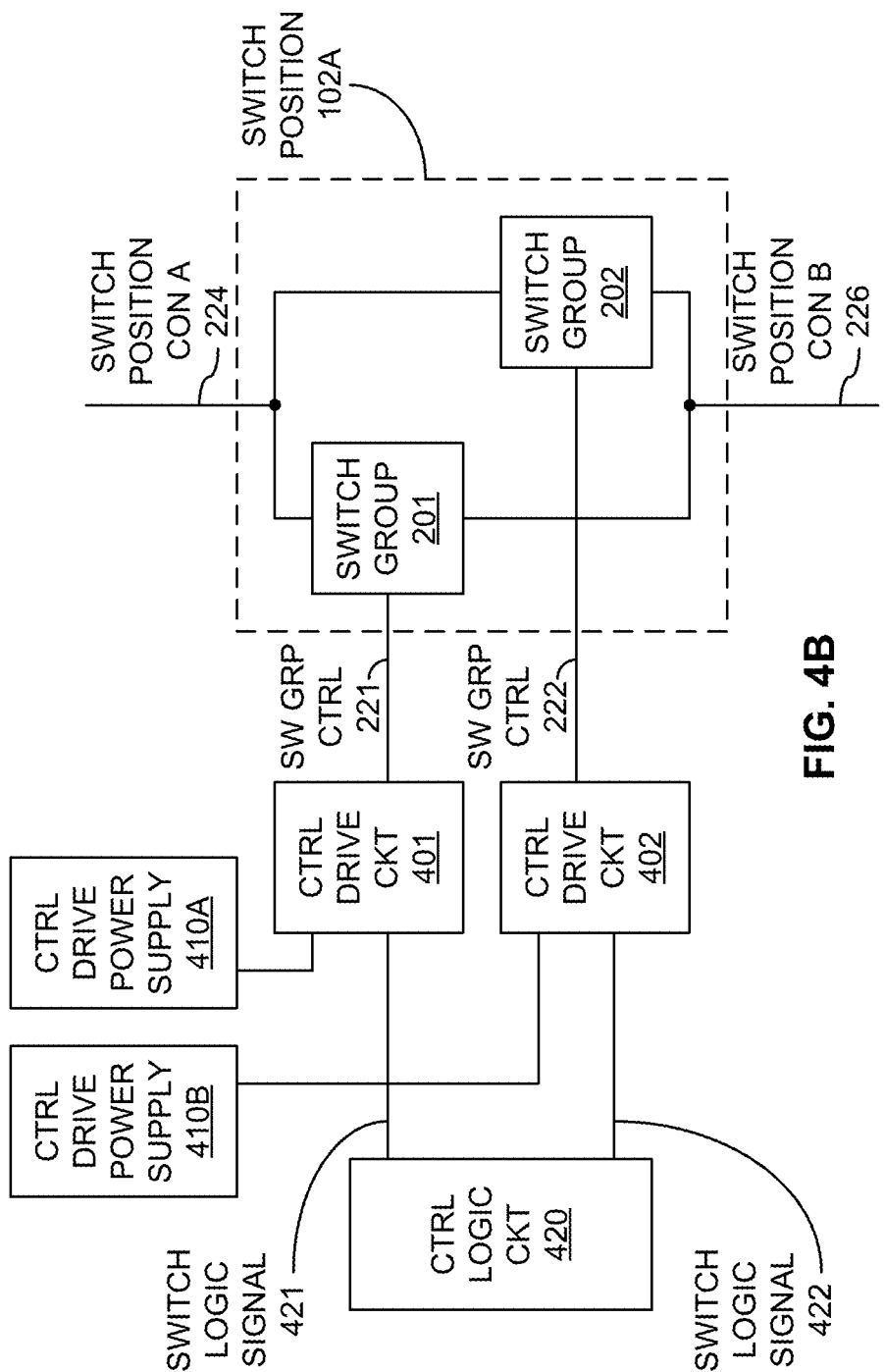
FIG. 4B is a block diagram of an example switch position with a separate control drive power supply for each switch group.

FIG. 4B is a block diagram of an example switch position 102A with a separate control drive power supply 410A and 410B for each corresponding switch group 201 and 202. More specifically, each control drive circuit 401 and 402 is supplied a power supply voltage from its corresponding control drive power supply 410A and 410B, thus facilitating the ability of each control drive circuit 401 and 402 to drive the control inputs (e.g., transistor gates or bases) of the switches of its switch group 201 and 202 to a different voltage level related to its control drive power supply 410A and 410B on the switch group control signals 221 and 222. Such diversity in control signal levels may thus facilitate significantly different switch driving strategies, as well as significantly different switch technologies (e.g., different switch types) between the switch groups 201 and 202. In some examples, other aspects of the control drive circuits 401 and 402, as well as the control logic circuit 420 and associated switch logic signals 421 and 422, may be as discussed above in conjunction with FIG. 4A.

Figure 5A:
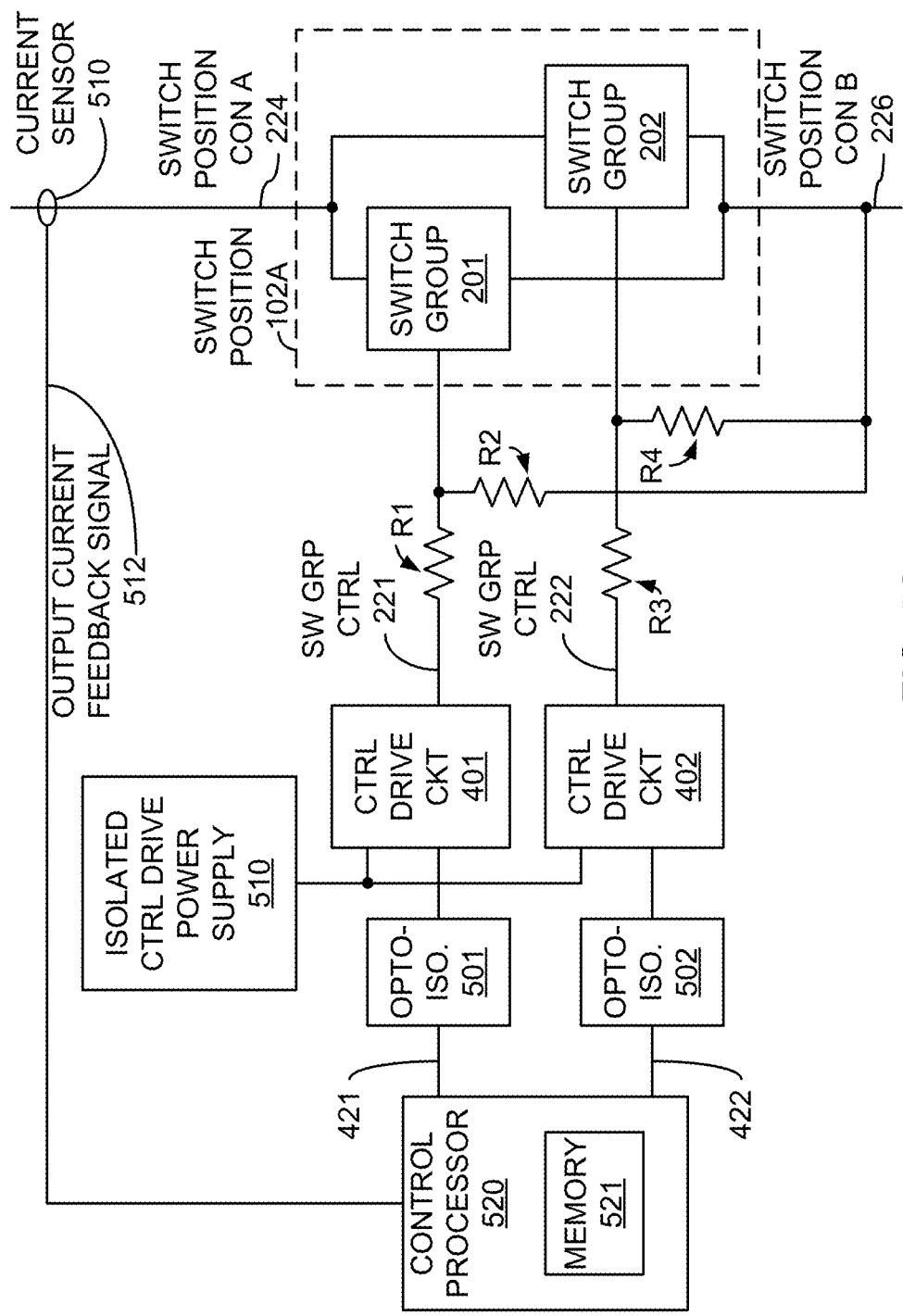
FIG. 5A is a block diagram of an example switch position controlled by way of a software-based or firmware-based control processor.

FIG. 5A is a block diagram of an example switch position 102A controlled by way of a software-based or firmware-based control processor 520 executing instructions stored in a memory 521, in a manner similar to that described above in connection with FIG. 4A. In addition, the arrangement of FIG. 5A includes a current sensor 510 to monitor current passing through the switch position 102A. The current sensor 510 may be, but is not limited to, a current mirror, a current shunt resistor, a current transformer, an anisotropic magneto-resistive (AMR) current sensor, a flux gate current sensor, and an open-loop or closed-loop Hall effect sensor. The control processor 520 may receive an output current feedback signal 512 from the current sensor 510, and based upon the state of that signal 512, may alter the operation of the switch groups 201 and 202. In one example, extraordinarily high levels of current detected via the output current feedback signal 512 may cause the control processor 520 to cease operation of one or both switch groups 201 and 202 for at least some period of time.

Further, each control drive circuit 401 and 402 may be controlled by way of an associated optoisolator circuit 501 and 502 (as mentioned above with respect to FIG. 4A), with power supplied via a single isolated control drive power supply 510 similar to the control drive power supply 510 of FIG. 4A, or via separate isolated control drive power supplies similar to the control drive power supplies 410A and 410B of FIG. 4B. Also in the embodiment of FIG. 5A, the switch group control signal 221 may drive a first resistor R1 that is coupled in series with a second resistor R2 arranged as a voltage divider to control the voltage level of the control input (e.g., the transistor gate or base voltage) to the transistors of the first switch group 201. In a corresponding fashion, the switch group control signal 222 may drive a third resistor R3 coupled in series with a fourth resistor R4 arranged as a voltage divider to control the voltage level of the control input (e.g., the transistor gate or base voltage) to the transistors of the second switch group 202.

Figure 5B:
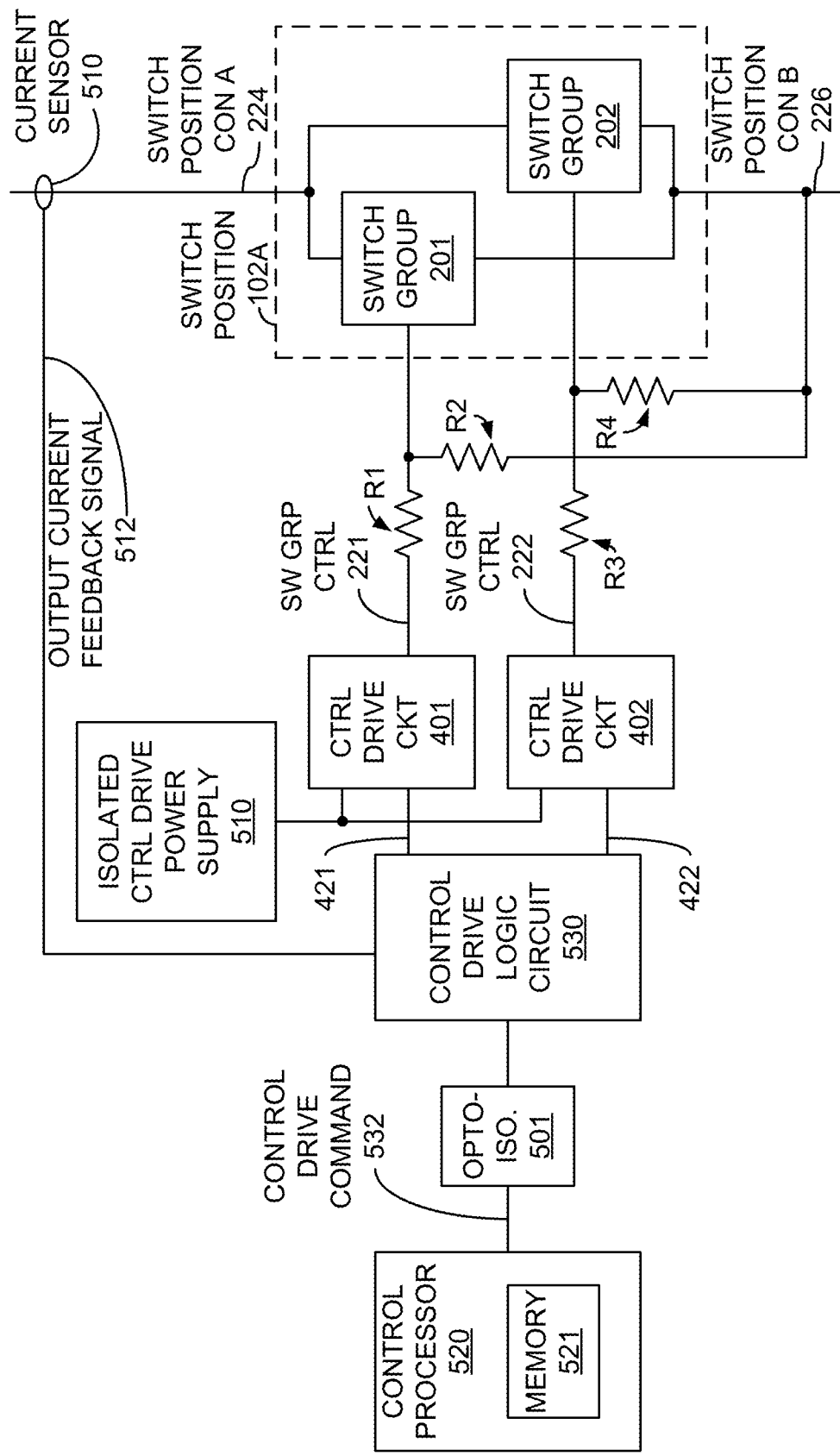
FIG. 5B is a block diagram of an example switch position controlled by way of a hardware logic circuit in conjunction with a software-based or firmware-based control processor.

FIG. 5B is a block diagram of an example switch position 102A controlled by way of a hardware control drive logic circuit 530 in combination with a software-based or firmware-based control processor 520. Generally, the hardware control drive logic circuit 530 may react more quickly to emergent conditions detected within the inverter, such as a condition reflected by the output current feedback signal 512 generated by the current sensor 510, as described above with respect to FIG. 5A. In this example, the output current feedback signal 512 is received at the control drive logic circuit 530 instead of the control processor 520 to facilitate, for example, a change in the switch group control signals 221 and 222 via the control drive circuits 401 and 402.

In the particular example of FIG. 5B, the control drive logic circuit 530 may receive a higher-level control drive command 532 from the control processor 520 via an optoisolator 501 or other isolation circuit. The control drive logic circuit 530 may employ the control drive command 532 to generate the switch logic signals 421 and 422 to control the control drive circuits 401 and 402. Other aspects of the circuit arrangement illustrated in FIG. 5B may be similar to those discussed above in connection with FIG. 5A.

Figure 6:
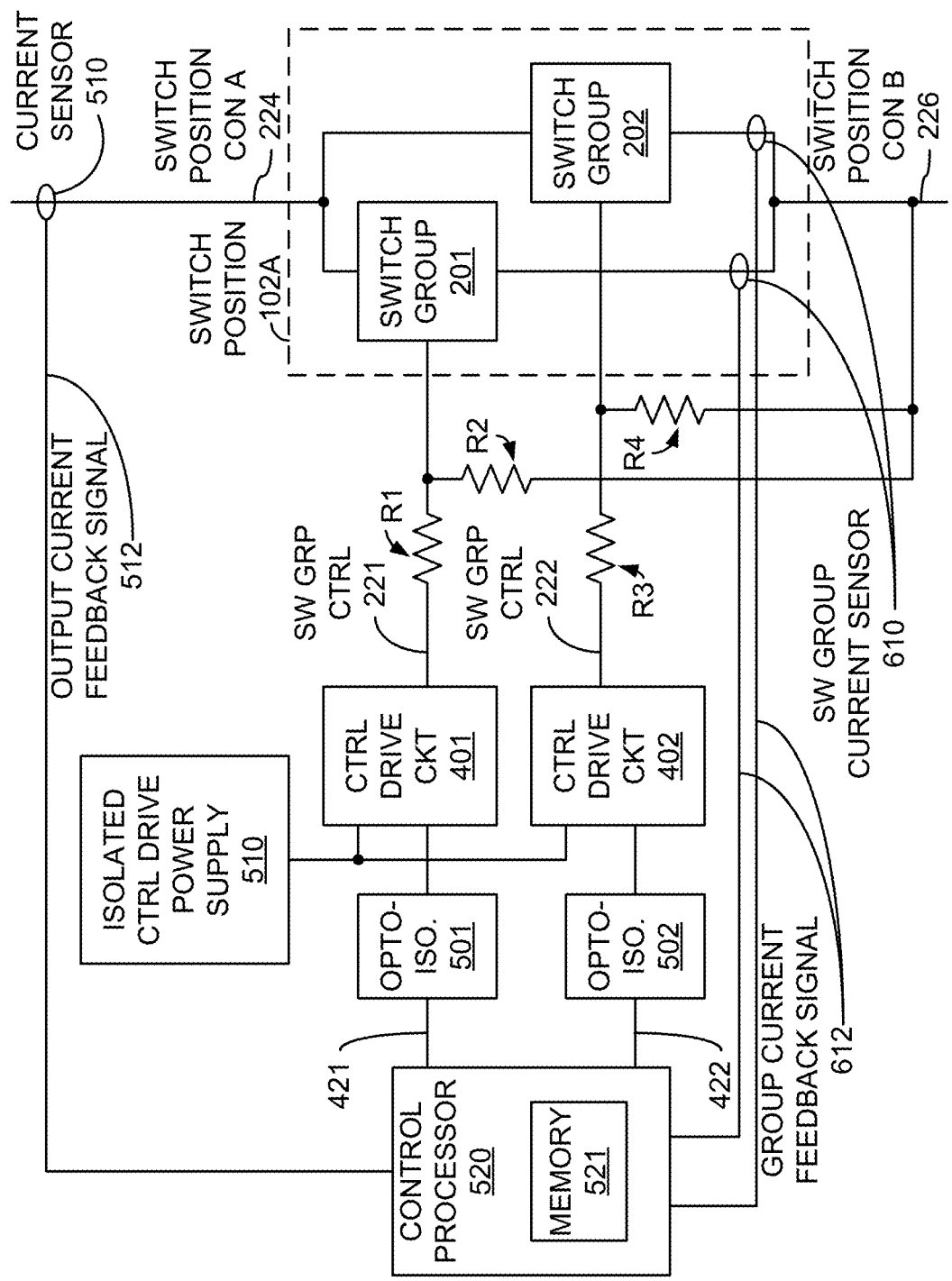
FIG. 6 is a block diagram of an example switch position monitored using an output current sensor and individual switch group current sensors.

In another embodiment, FIG. 6 is a block diagram of an example switch position 102A monitored using the switch position current sensor 510 mentioned above, along with an individual switch group current sensor 610 for each of the switch groups 201 and 202. In this example, the current sensor 510 for the switch position 102A generates the output current feedback signal 512, as discussed above, while the two switch group current sensors 610 each generate a group current feedback signal 612. The control processor 520 may then process the output current feedback signal 512 and the group current feedback signals 612 to alter the operation of the control drive circuits 401 and 402 using the switch logic signals 421 and 422 to adapt to changes or events occurring regarding the switch groups 201 and 202, similar to the use of the output current feedback signal 512 in FIG. 5A. The switch group current sensors 610 may be any current sensor, such as those listed above as examples of the switch position current sensor 510.

In some examples, due to the presence of the individual switch group current sensors 610, the current sensor 510 for the switch position 102A may not be employed. In other examples, any or all of the output current feedback signal 512 and the switch group current sensors 610 may be received by a hardware control drive logic circuit (e.g., the control drive logic circuit 530 of FIG. 5B) instead of the control processor 520.

Figure 7:
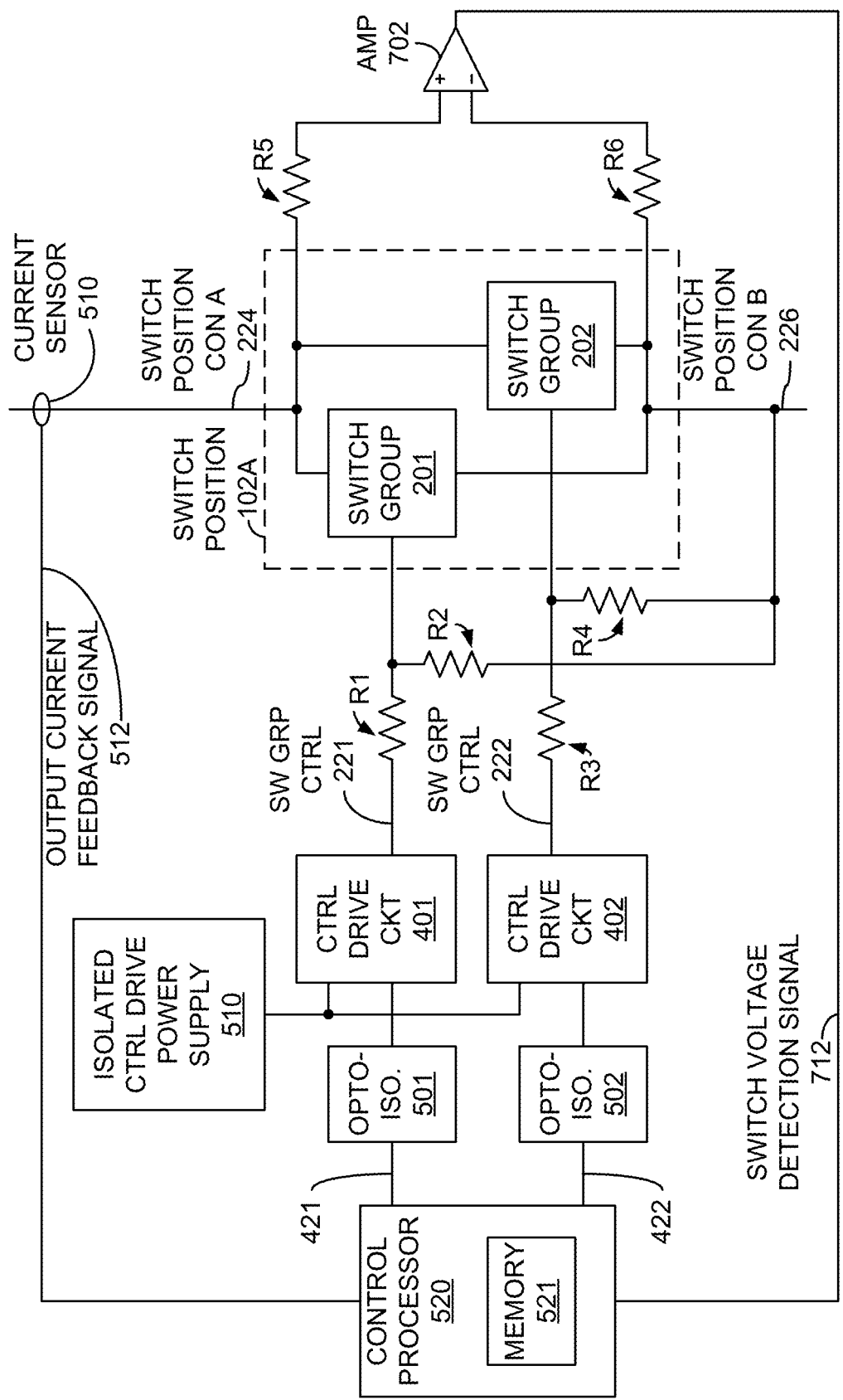
FIG. 7 is a block diagram of an example switch position monitored using an output current sensor and a switch voltage detection circuit.

In yet another example, FIG. 7 provides a switch voltage detection signal 712, possibly in addition to output current feedback signal 512, to the control processor 520. In this embodiment, an amplifier 702 monitors the voltage of switch position connection A 224 and switch position connection B 226 of the switch position 102A, possibly via a fifth resistor R5 and a sixth resistor R6, respectively. The control processor 520 may then direct or alter the operation of the switch groups 201 and 202 accordingly via the switch logic signals 421 and 422 provided via the optoisolators 501 and 502 to the control drive circuits 401 and 402.

Figure 8:
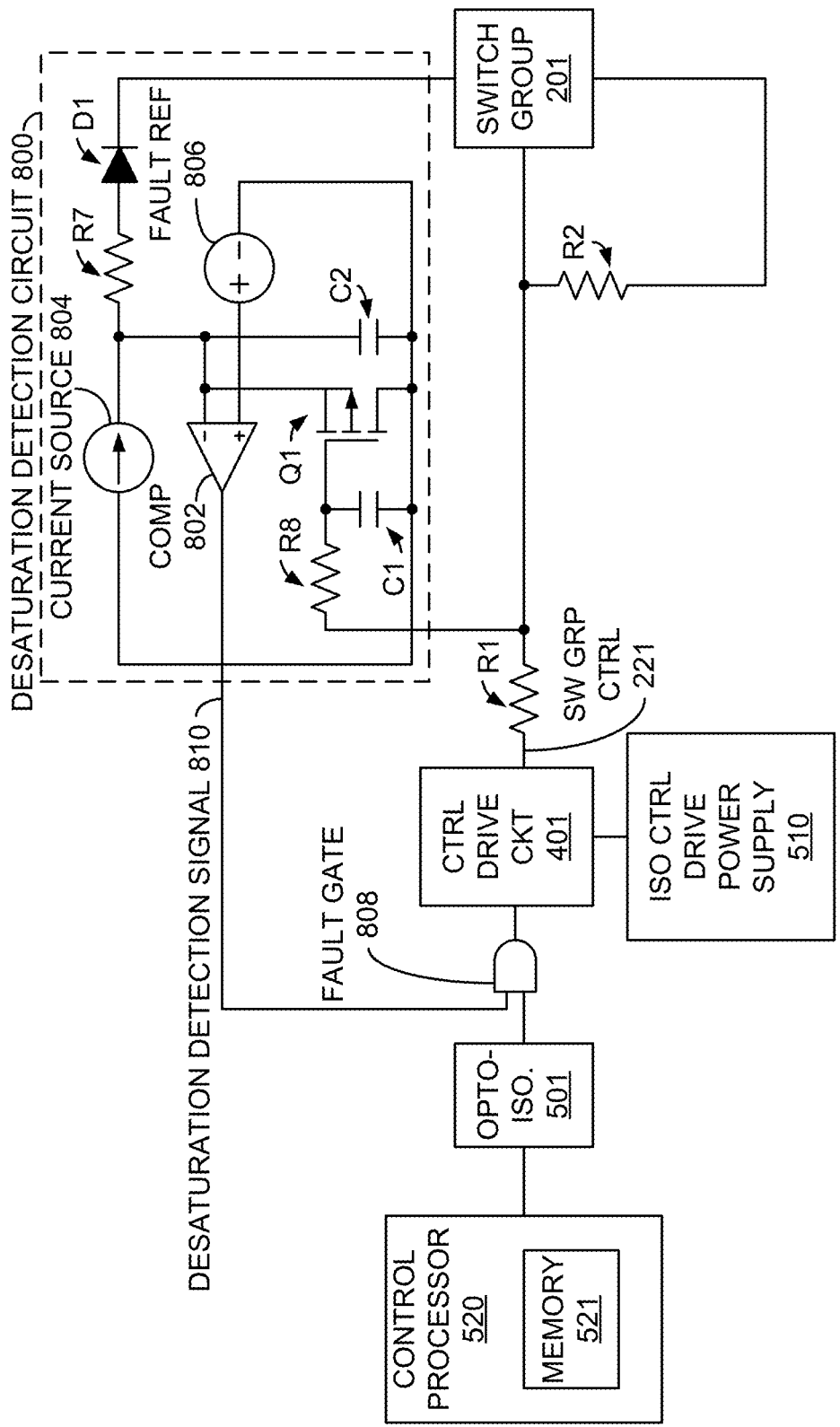
FIG. 8 is a block diagram of an example switch group monitored using a desaturation detection circuit.

FIG. 8 is a block diagram of an example switch group 201 monitored using a desaturation detection circuit 800, a purpose of which is to detect a desaturation of one or more switches of a switch group 201 when the switches of the switch group 201 are activated or on. Desaturation is a symptom of an overcurrent condition through, or a short circuit condition at the output of, the switch that, if persisting for some minimum period of time, may cause failure of the switch. Desaturation may result in a sudden increase in the voltage across the switch, along with an increase in current through the switch.

To detect desaturation, the desaturation detection circuit 800 may include a high-voltage fast-recovery diode D1 in series with a seventh resistor R7 and a current source 804 (or possibly a voltage source). The value of the seventh resistor R7 may determine the output current level of the switch group 201 at which an overcurrent, and thus a desaturation, condition exists. In response to the switches in the switch group 201 being off, substantially no current flows through diode D1 or resistor R7, thus leaving the negative input of the comparator 802 below a reference voltage provided by a fault reference 806 voltage at the positive input of the comparator 802, thus causing the output of the comparator 802 (desaturation detection signal 810) to remain high, thereby allowing a control drive signal from the control processor 520 to pass through a fault gate 808 (e.g., an AND gate) to activate the switch group 201.

When the control processor 520 activates the switch group 201, that signal may be delayed by way of combination of an eighth resistor R8 and a capacitor C1 before activating an input switch Q1 (e.g., a MOSFET), thus keeping the negative input of the comparator 802 low relative to the voltage at the positive input, thus keeping the desaturation detection signal 810 high (indicating no desaturation being detected), and allowing the switches of the switch group 201 to remain on. During the time the switches are activated, if an overcurrent condition occurs, the amount of current through diode D1 may cause the voltage across resistor R7 to rise, causing the negative input of the comparator 802 to rise above the voltage at the positive terminal, thereby forcing the desaturation detection signal 810 to drop, indicating a desaturation condition of at least one switch of the switch group 201. The fault gate 808 may then turn off as a result, causing the switches of the switch group 201 to turn off quickly, thus potentially protecting the switches of the switch group 201 from permanent damage. In some examples, the desaturation detection signal 810 may also be employed by the control processor 520 or another control circuit to dictate subsequent operations of the inverter to prevent further problems regarding a possible short circuit at the output of the switch group 201.

In some examples, each switch group 201 and 202 of a switch position 102A may employ its own desaturation detection circuit 800 to individually address a desaturation condition in the switch groups 201 and 202.

FIGS. 9A through 9F are block diagrams of example cooling pathways 901 and 902 for two switch groups 201 and 202, respectively, of a switch position 102. In embodiments in which more than two switch groups are provided for each switch position 102, a separate cooling path may be provided for each. In an example, each cooling path 901 and 902 is coupled with a fluid pump 906 that may pump fluid coolant, such as a gas (e.g., air) or liquid (e.g., water, a water/ethylene glycol blend, etc.) to extract thermal energy from the switches of the switch groups 201 and 202. The cooling paths 901 and 902 may also be coupled to each other in one or more configurations to provide a "thermal bootstrap" of an operating switch group 201 or 202 to a non-operating switch group 201 or 202 prior to activating the non-operating switch group 201 or 202.

Figure 9A:
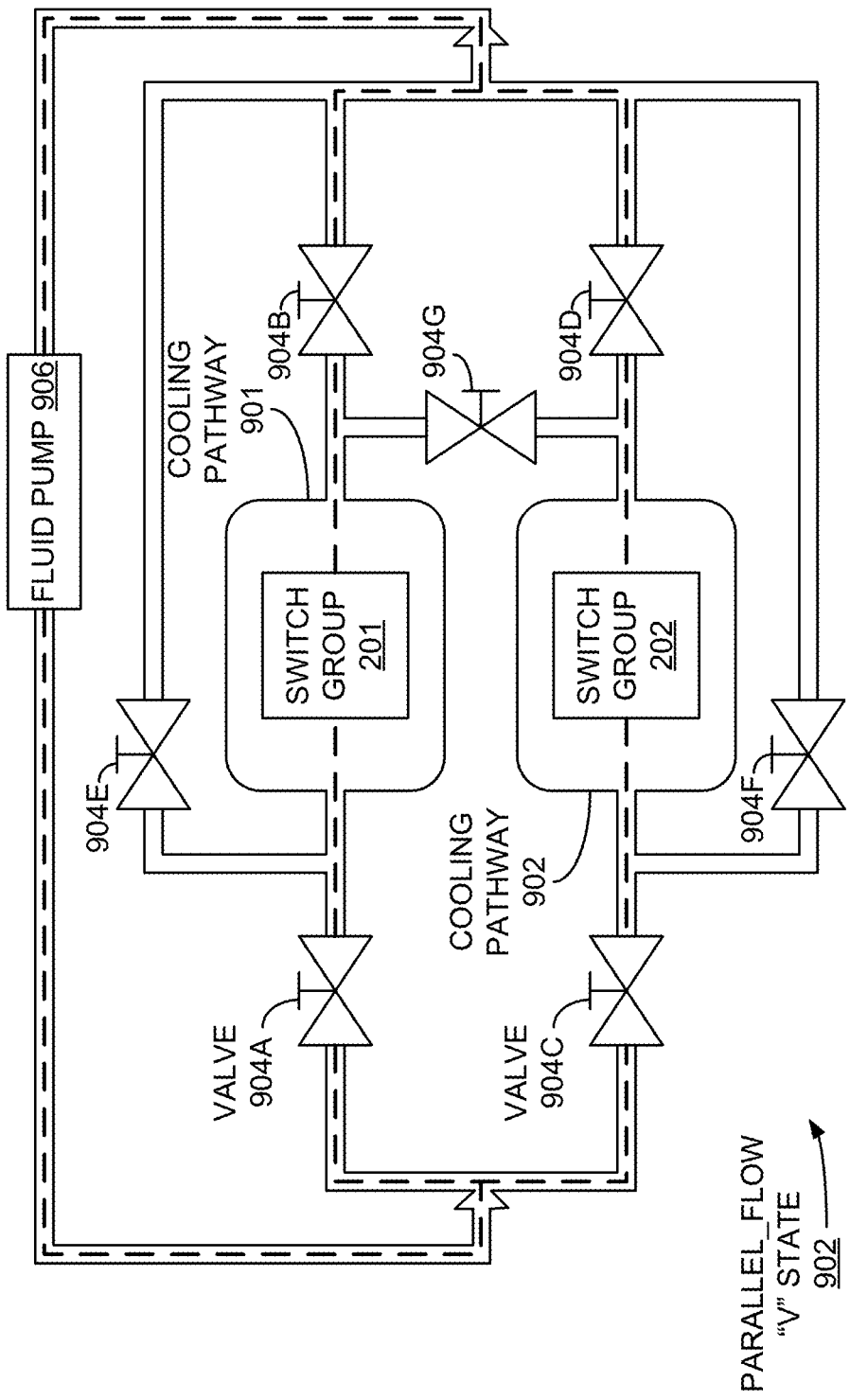
FIGS. 9A through 9F are block diagrams of example cooling pathways for each of two switch groups of a switch position.

In the particular examples of FIGS. 9A through 9F, a control processor (e.g., control processor 520) or another processor or logic circuit may activate and/or deactivate one or more valves 904A through 904G to couple the cooling pathways 901 and 902 to the fluid pump 906 and/or to each other, possibly in combination with various modes of operating the switch groups 201 and 202. Further, each configuration presented in each of FIGS. 9A through 9F is a particular cooling configuration or state. In FIG. 9A, for example, a configuration is provided in which fluid coolant from the fluid pump 906 is routed through both cooling pathways 901 and 902 in parallel as a PARALLEL_FLOW "V" state 902. This state may be entered by opening valves 904A, 904B, 904C, and 904D, and by closing valves 904E, 904F, and 904G.

Figure 9B:
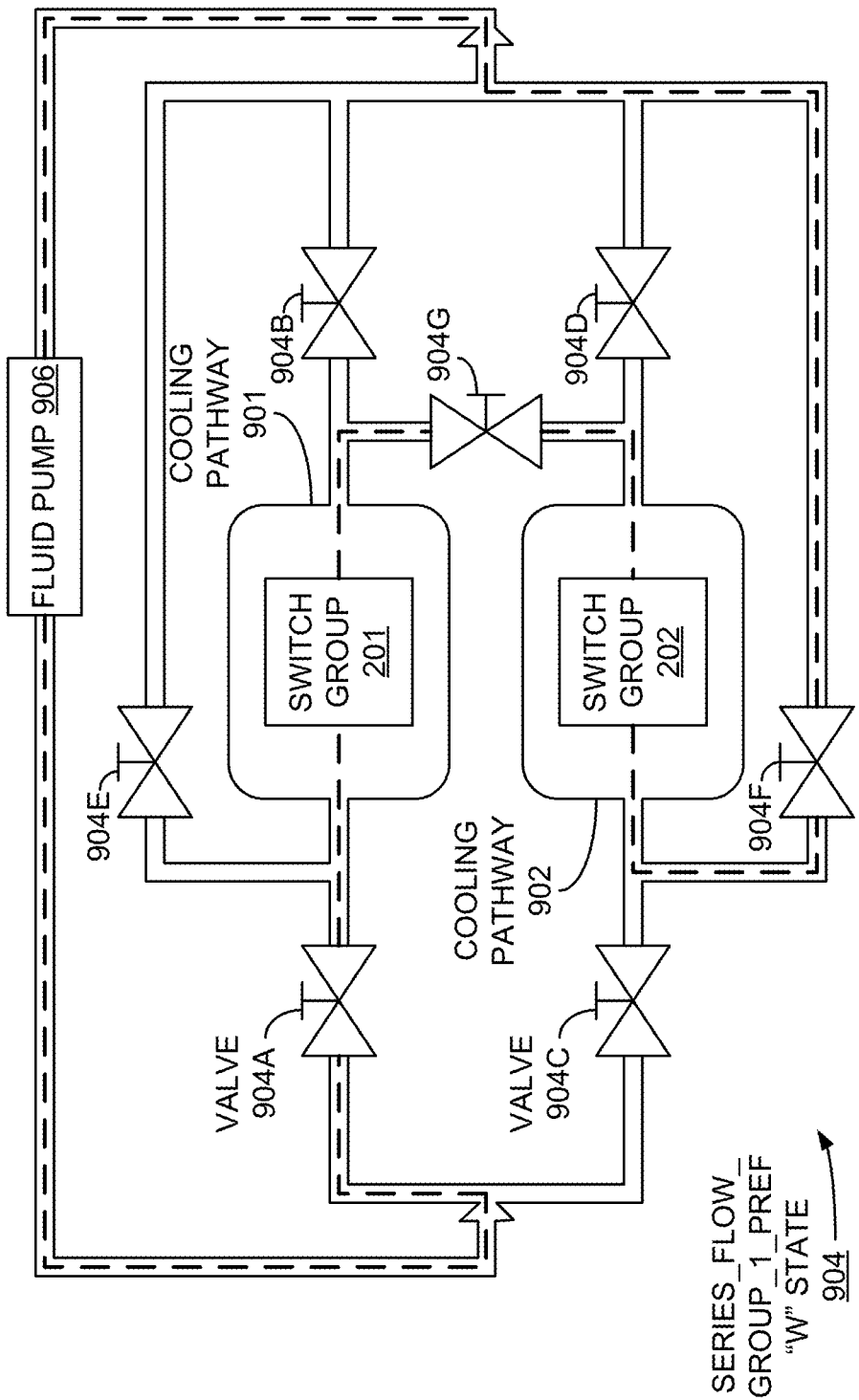
Figure 9C:
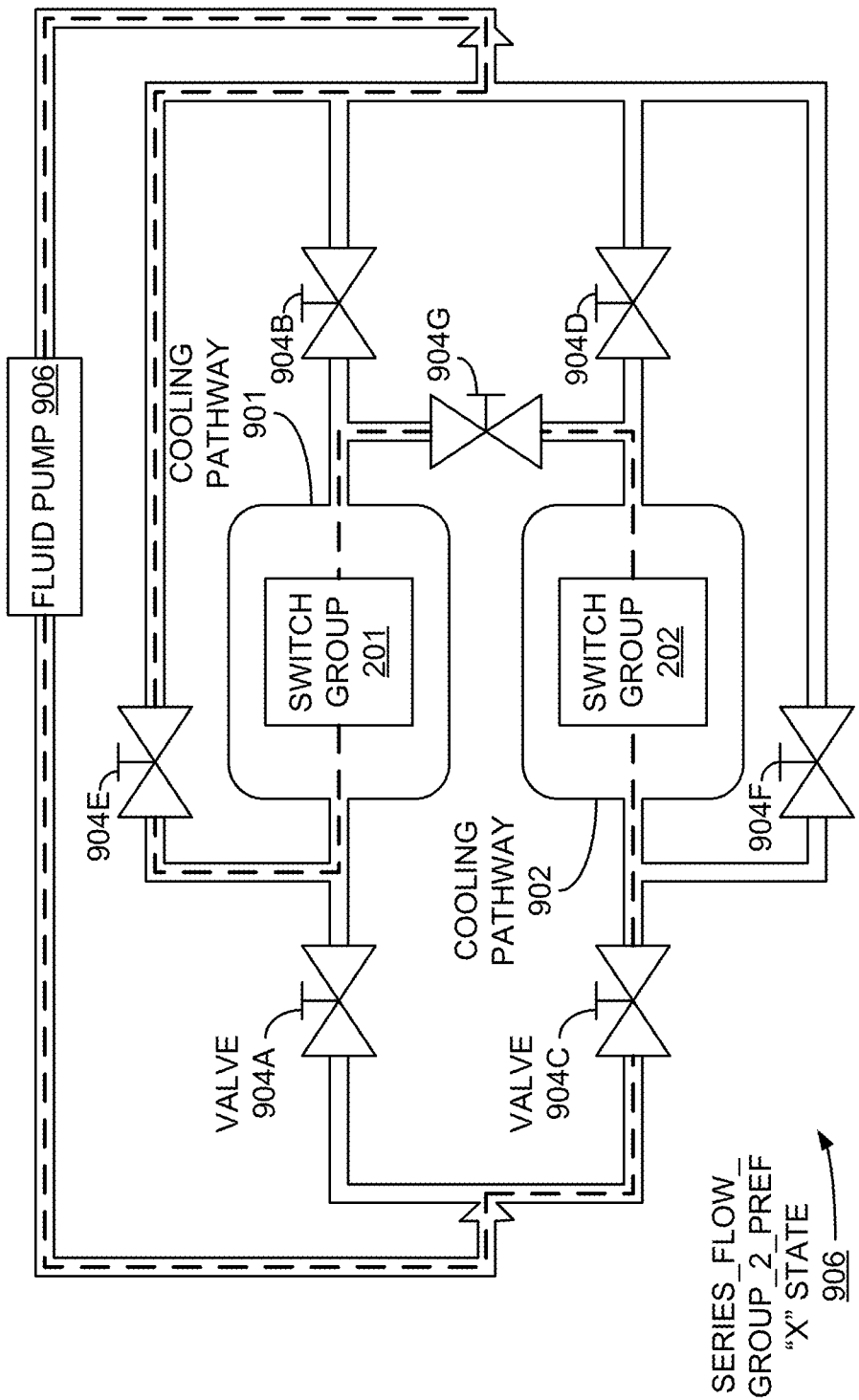

In FIG. 9B, a configuration is provided in which fluid coolant from the fluid pump 906 is routed through switch group 201 and then through switch group 202 in a serial manner as a SERIES_FLOW_GROUP_1_PREF "W" state 904. In one example, thermal energy released by switch group 201 carried by the fluid coolant may then be imparted upon the switch group 202 as part of a thermal bootstrap operation, as mentioned earlier. In an example, this state may be entered by opening valves 904A, 904F, and 904G, and by closing valves, 904B, 904C, 904D, and 904E. Oppositely, in FIG. 9C, a configuration is provided in which fluid coolant from the fluid pump 906 is routed through switch group 202 and then through switch group 201 in a serial manner as a SERIES_FLOW_GROUP_2_PREF "X" state 906. In one embodiment, this state may be entered by opening valves 904C, 904E, and 904G, and by closing valves, 904A, 904B, 904D, and 904F.

Figure 9D:
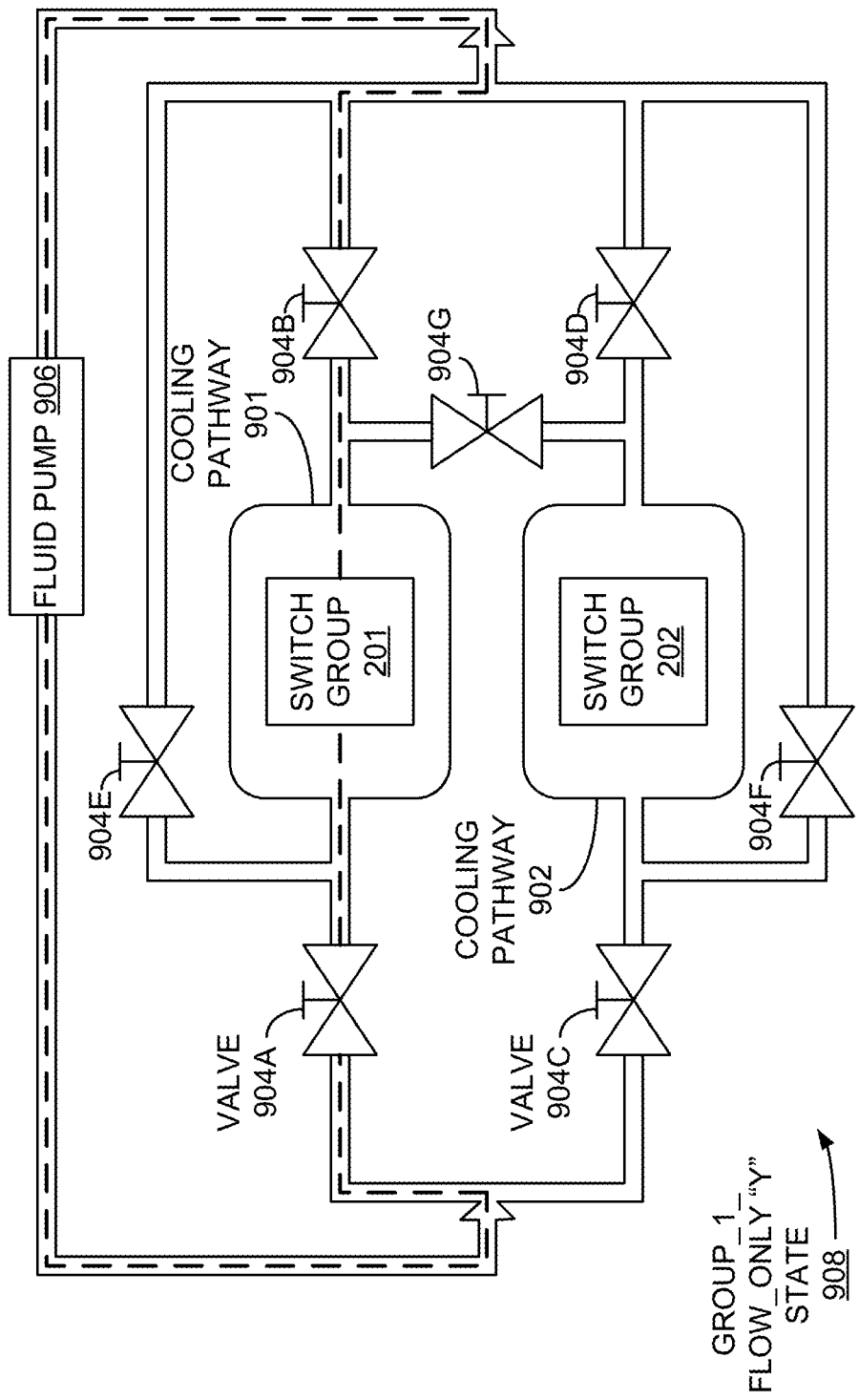
Figure 9E:
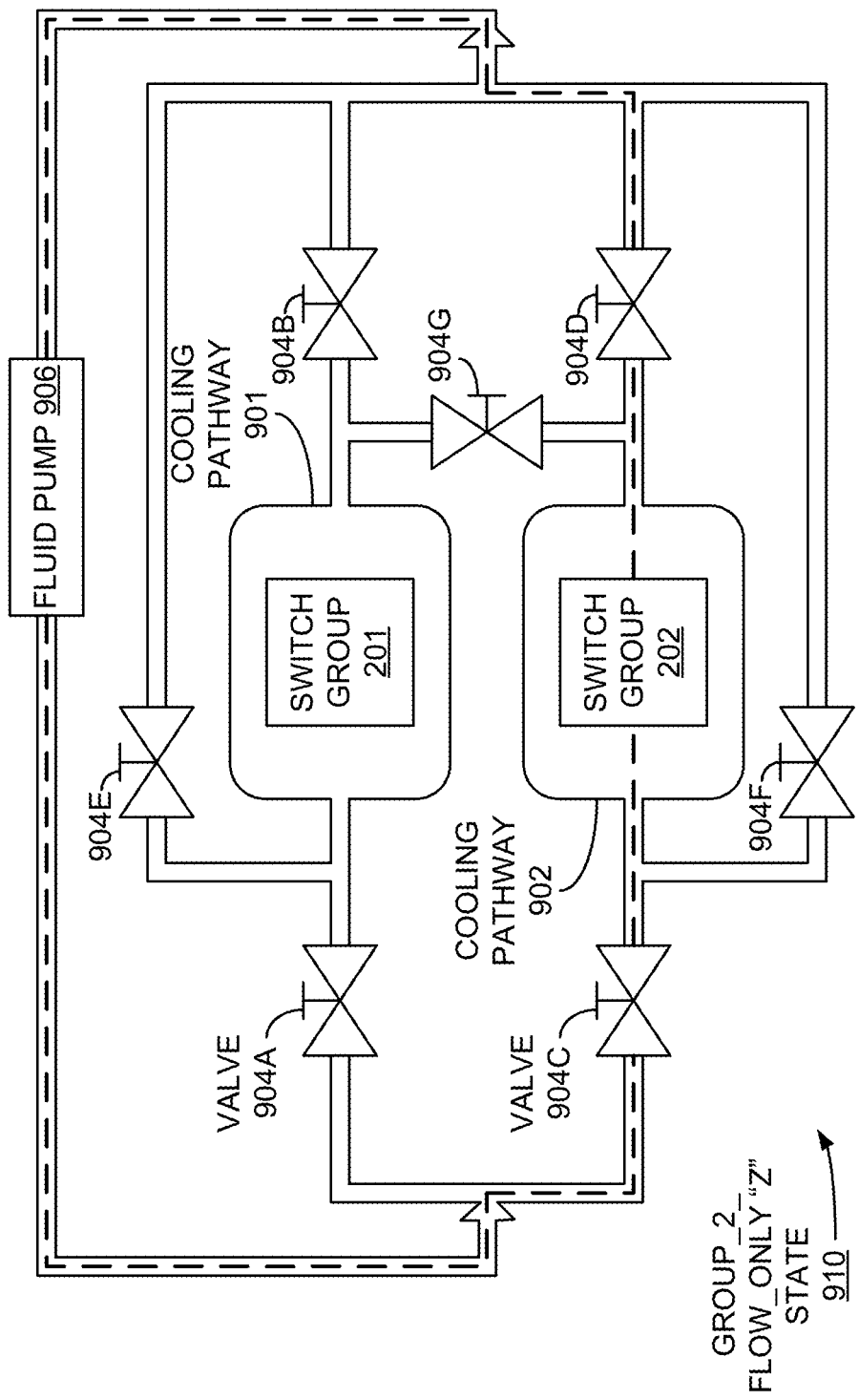

FIG. 9D depicts a GROUP_1_FLOW_ONLY "Y" state 908, in which the fluid pump 906 pumps fluid coolant through the cooling pathway 901 of the switch group 201, and not through the cooling pathway 902 of the switch group 202. For this state, valves 904A and 904B may be open, and valves 904C, 904D, 904E, 904F, and 904G may be closed. Oppositely, FIG. 9E illustrates a GROUP_2_FLOW_ONLY "Z" state 910, in which the fluid pump 906 pumps fluid coolant through the cooling pathway 902 of the switch group 202, bypassing the cooling pathway 901 of the switch group 201. For this state, valves 904C and 904D may be open, and valves 904A, 904B, 904E, 904F, and 904G may be closed. In each case, the fluid coolant may be pumped through only one of the switch groups 201 and 202 if only one of the switch groups 201 and 202 is being operated during that particular time period. In other examples, the fluid coolant may not be pumped through a particular coolant pathway 901 and 902 in circumstances in which the switches of a particular switch group 201 or 202 are to be heated intentionally, such as when a short circuit failure of a switch is to be converted into an open circuit. Such an operation, termed as an "autofuse" operation, may be undertaken if the one or more switches of that switch group 201 or 202 have failed in a short-circuited state.

Figure 9F:
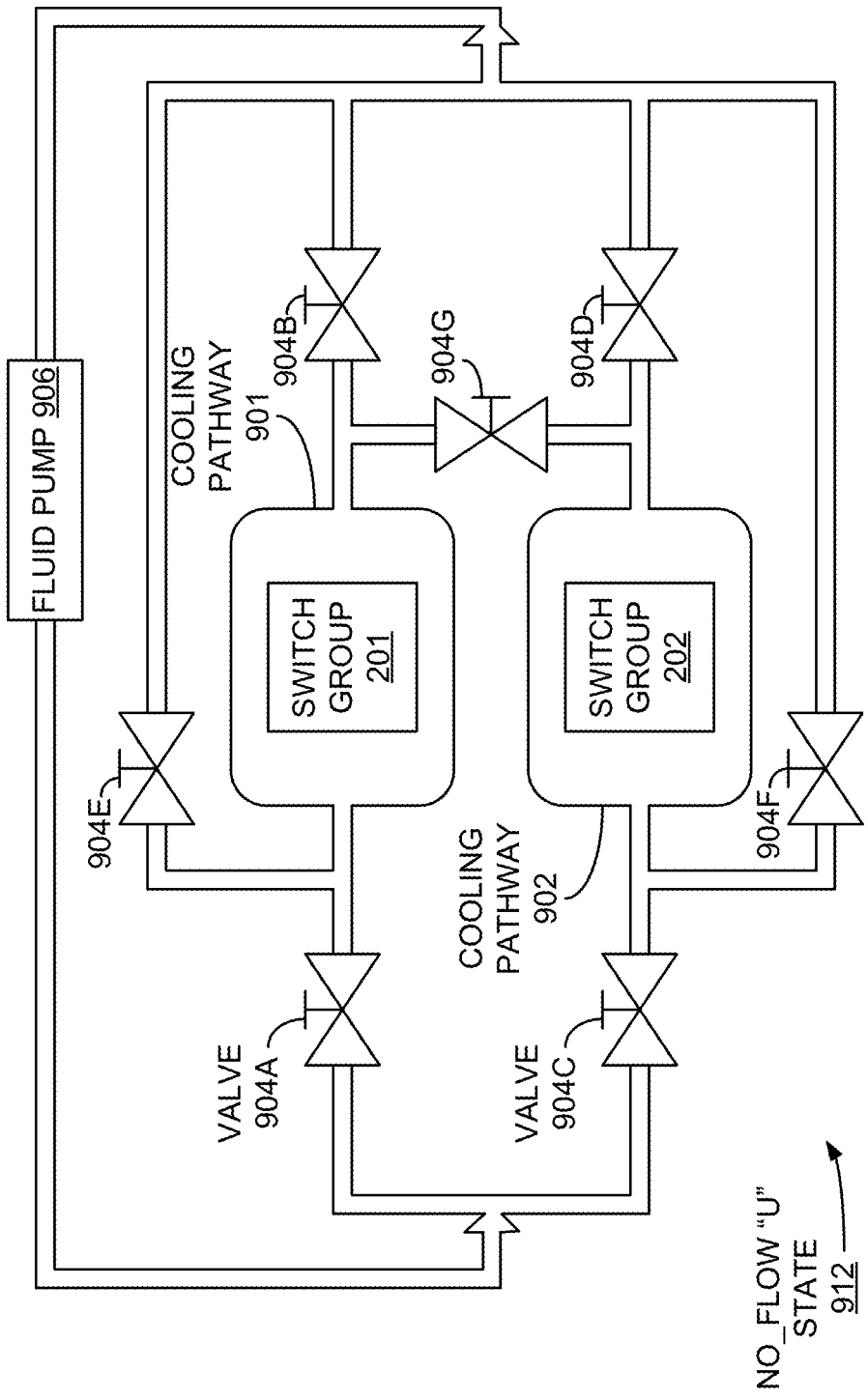

Finally, FIG. 9F depicts a NO_FLOW "U" state 912, in which the fluid pump 906 is not pumping fluid coolant to either of the cooling pathways 901 or 902. In such a state, each valve 904A-904G may or may not be set to any particular open or closed state. Such a state may be employed, for example, when neither of the switch groups 201 or 202 is being operated.

In some examples, one or more of the cooling pathways 901 and 902 may incorporate one or more physical features to enhance or otherwise control the cooling characteristics of the cooling pathways 901 and 902. For example, either or both of the cooling pathways 901 and 902 may incorporate "fins" that extend from a surface that is thermally coupled to the corresponding switch group 201 or 202 into the cooling pathway 901 or 902 to promote transfer of thermal energy from the switch group 201 or 202 to the fluid coolant.

In some embodiments, the cooling pathway 901 for the switch group 201, as well as the fluid coolant employed in that pathway 901, may be different from that employed in the cooling pathway 902 for the switch group 202. For example, one cooling pathway 901 or 902 may have larger or smaller pathways or orifices through which the fluid coolant may flow, larger or smaller fins, or fewer or greater numbers of fins than another cooling pathway 901 or 902. One cooling pathway 901 or 902 may employ fins of a different size, construction, or material than those of another cooling pathway 901 or 902. One cooling pathway 901 or 902 may utilize a higher or lower flow rate than that of another cooling pathway 901 or 902. Further, one or more of the cooling pathways 901 or 902 may employ a different fluid pump 906 and/or different fluid coolant than another of the cooling pathways 901 or 902. In some embodiments, one or more of such differences may determine whether one cooling pathway 901 or 902 is utilizing more or less aggressive cooling compared to another cooling pathway 901 or 902. For example, a cooling pathway 901 or 902 of a switch group 201 or 202 having relatively smaller, faster switches may employ a more aggressive cooling structure than a cooling pathway 901 or 902 for a switch group 201 or 202 that incorporates relatively larger, slower switches. Other differences between the cooling pathways 901 and 902 are also possible.

Figure 10A:
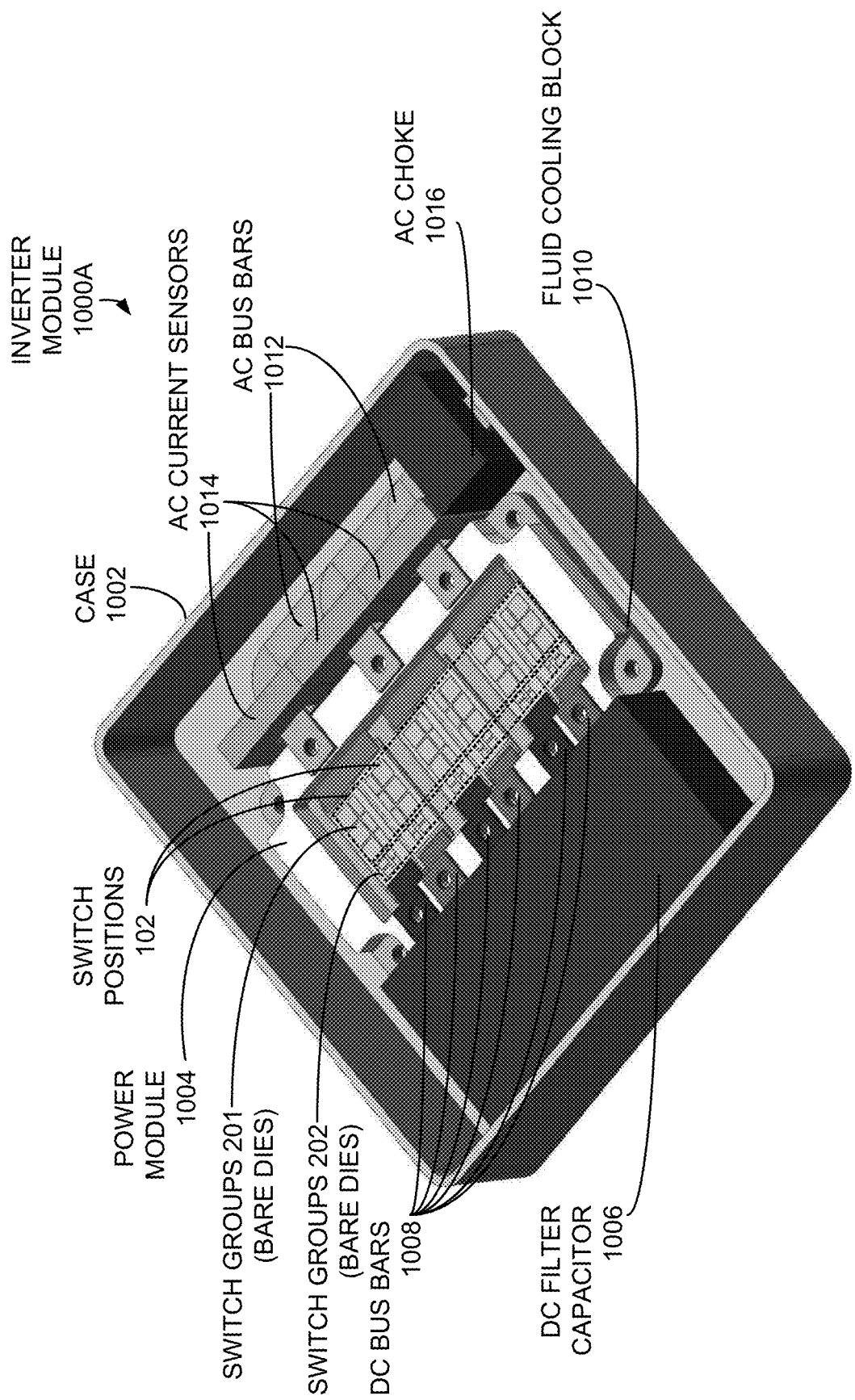
FIG. 10A is a perspective view of an example inverter module employing bare dies for the switches of the switch groups.
Figure 10B:
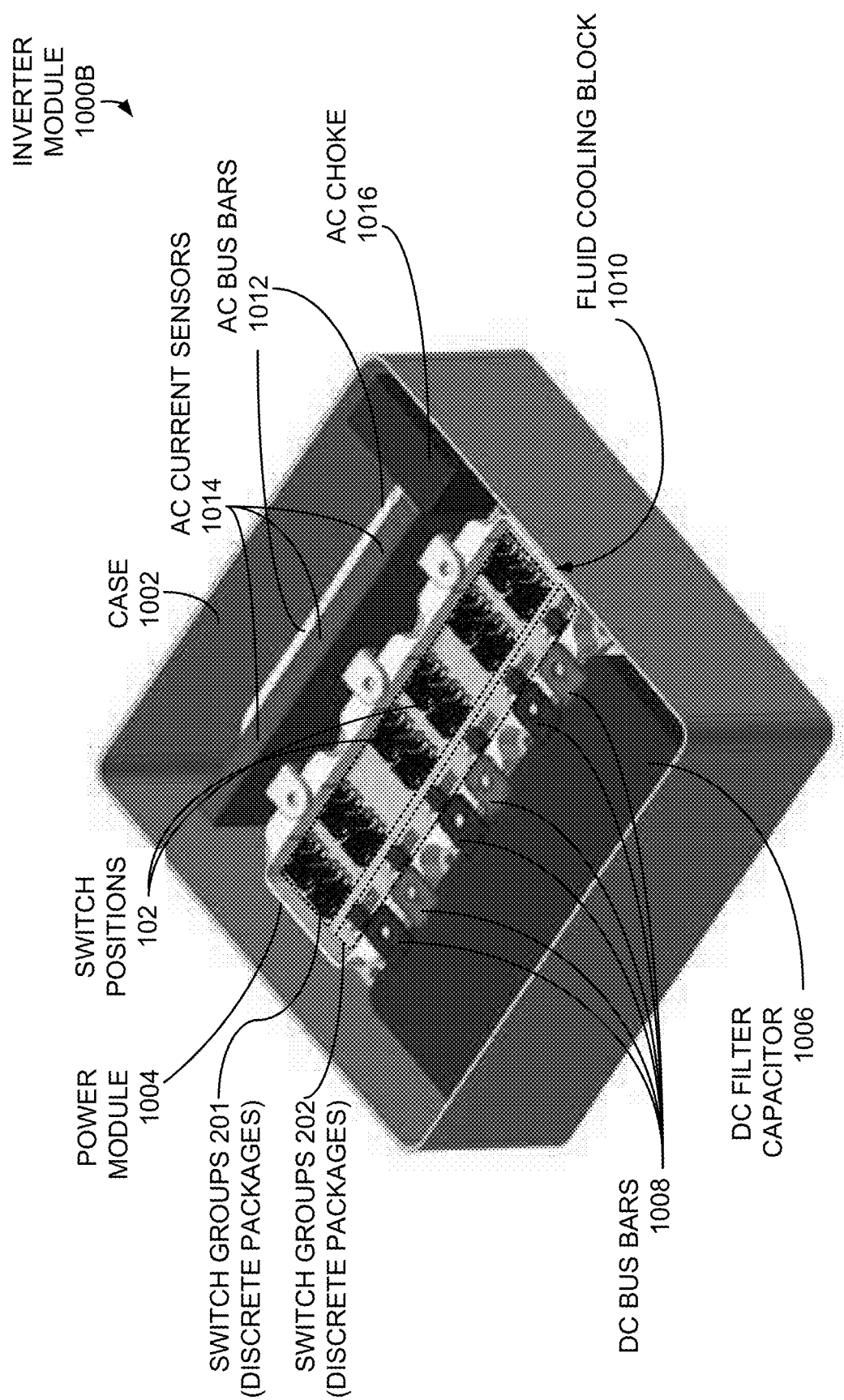
FIG. 10B is a perspective view of an example inverter module employing discrete packages for the switches of the switch groups.

FIGS. 10A and 10B are perspective views of respective inverter module embodiments employing multiple switch positions, with multiple switch groups and corresponding cooling pathways, as described above. For example, FIG. 10A is a perspective view of an example inverter module 1000A including six switch positions 102, such as that depicted in FIG. 1B. Similar examples for greater or fewer numbers of switch positions 102 are also possible, however. Each of the switch positions 102 includes two switch groups 201 and 202. Each of the first switch groups 201 includes three relatively large switches (e.g., IGBTs) with associated diodes, while each of the second switch groups 202 includes two relatively small switches (e.g., MOSFETs) with associated diodes. In this example, each of the switches is fabricated on a separate bare die. The dies of each switch position 102 may then be mounted (e.g., by way of soldering, sintering, and/or so on) to a substrate that may be electrically isolated from the substrates of the remaining switch positions 102 of the inverter module 1000A, and electrically isolated from a fluid cooling block 1010. However, other ways of organizing the dies among different substrates are also possible. The substrates may be, for example, direct bond aluminum (DBA) substrates, direct bond copper (DBC) substrates, or active-metal brazing (AMB) substrates, in some examples. The substrates may be made of aluminum oxide, aluminum oxide doped with zirconium or another material, aluminum nitride, silicon nitride, or another ceramic material. Other types of substrates may be suitable for the embodiments described herein as well.

Each switch group 201 and 202 of each switch position 102 couples a particular DC bus bar 1008 to an AC bus bar 1012. In one particular example, each DC bus bar 1008 may have one of a positive DC voltage (e.g., DC+ of FIG. 1B) or a negative DC voltage (e.g., DC− of FIG. 1B). Similarly, each AC bus bar 1012 may correspond to one of three phases of a three-phase AC output (e.g., AC Phase U, V, or W of FIG. 1B).

Each of the substrates and their associated dies may be coupled to a power module 1004 that may deliver power and signals to, and/or carry power and signals from, each of the switch positions 102 and the control signals for each switch group control signal 221 and 222. More specifically, the power module 1004 may provide electrical connections between the dies, the DC bus bars 1008, the AC bus bars 1012, the control drive circuits 401 and 402, the control drive logic circuit 530, the control processor 520, the desaturation detection circuit 800, and the like.

Additionally, the power module 1004 may measure a temperature of the dies or other parts of the inverter module 1000A via temperature sensing components or circuits mounted directly or indirectly to those dies or other parts. The temperature sensors may include, for example, thermistors, resistive temperature device (RTD) sensors, positive temperature coefficient (PTC) silistor or silicon temperature sensors, or another temperature sensor circuit. Further, the power module 1004 may measure current of one or more of the die power paths via current sensors mounted directly or indirectly to the conducting path. The current sensors may include, for example, a current mirror, a current shunt resistor, an anisotropic magneto-resistive (AMR) sensor, giant magneto-resistive (GMR) sensor, a flux gate sensor, an open-loop Hall effect sensor, a closed-loop Hall effect sensor, or another current sensor. These temperature and current sensor or circuit signals may have electrical connection between the power module 1004 and the control drive circuits 401 and 402, the control drive logic circuit 530, the control processor 520, the desaturation detection circuit 800, and the like.

Additionally, the power module 1004 may provide a mechanical mounting structure for the substrates that dampens vibration and shock to the substrates.

The power module 1004 may also provide thermal conductivity between two or more of the substrates, as well as provide a thermal interface to the fluid cooling block 1010, with the substrates providing thermal conductivity between the bare dies and the thermal interface. The fluid cooling block 1010, shown in FIG. 10A as being located under and thermally coupled to the substrates carrying the dies of the switches of the various switch positions 102, may be positioned above the dies, or both above and below the dies, in other embodiments. In some examples, the fluid cooling block 1010 may include the cooling paths 901 and 902 of FIGS. 9A through 9F that are thermally coupled to the switch groups 201 and 202, respectively. In one example, the first cooling path 901 is thermally coupled to the first switch group 201 of each switch position 102, while the second cooling path 902 is thermally coupled to the second switch group 202 of each switch position 102. In other examples, multiple first cooling paths 901 and multiple second cooling paths 902 may be employed such that each first cooling path 901 may be thermally coupled to one or more of the first switch groups 201, and each second cooling path 902 may be thermally coupled to one or more of the second switch groups 202.

Also as shown in FIG. 10A, at least one DC filter capacitor may be coupled across the DC input (e.g., across DC+ and DC−), and an AC choke 1016 may be coupled across two or more of the AC phases (e.g., AC Phase U, V, or W of FIG. 1B) to filter high-frequency AC signals from the AC phases. Further illustrated in FIG. 10A is an AC current sensor 1014 for each of the AC phases, similar to the switch position current sensor 510 discussed above. The inverter module 1000A may also incorporate other current, voltage, temperature, and/or additional sensors. The inverter module 1000A may further include one or more desaturation detection circuits (e.g., desaturation detection circuit 800 of FIG. 8), as discussed earlier.

Circuitry for controlling the operation of the switch groups 201 and 202 of the various switch positions 102 of the inverter module 1000A, such as the control processor 520 and corresponding memory 521, the control drive logic circuit 530, the control drive circuits 401 and 402, optoisolators 501 and 502, and/or other circuitry, may also be incorporated within the inverter module 1000A, such as on a printed circuit board (PCB) located above the switch positions 102 within a case 1002. Such a case 1002 may be vented or sealed, and may provide at least some measure of protection against environment conditions that may adversely affect the operation of the inverter module 1000A.

FIG. 10B is a perspective view of another example inverter module 1000B that includes six switch positions 102, such as that depicted in FIG. 1B. However, similar examples for greater or fewer numbers of switch positions 102 are also possible. Each of the switch positions 102 includes two switch groups 201 and 202, with each of the first switch groups 201 including three relatively large switches (e.g., IGBTs) with associated diodes, while each of the second switch groups 202 includes two relatively small switches (e.g., MOSFETs) with associated diodes. However, rather than employing bare dies for the transistors, as was illustrated in FIG. 10A, discrete packages for each of the transistors or switches of the switch groups 201 and 202 of each of the switch positions 102 are used in FIG. 10B. Examples of the discrete packages may include TO-247 packages, D2PAK packages, and so on. Other examples for mounting the separate transistor packages to the power module 1004 or PCB are also possible.

Figure 11:
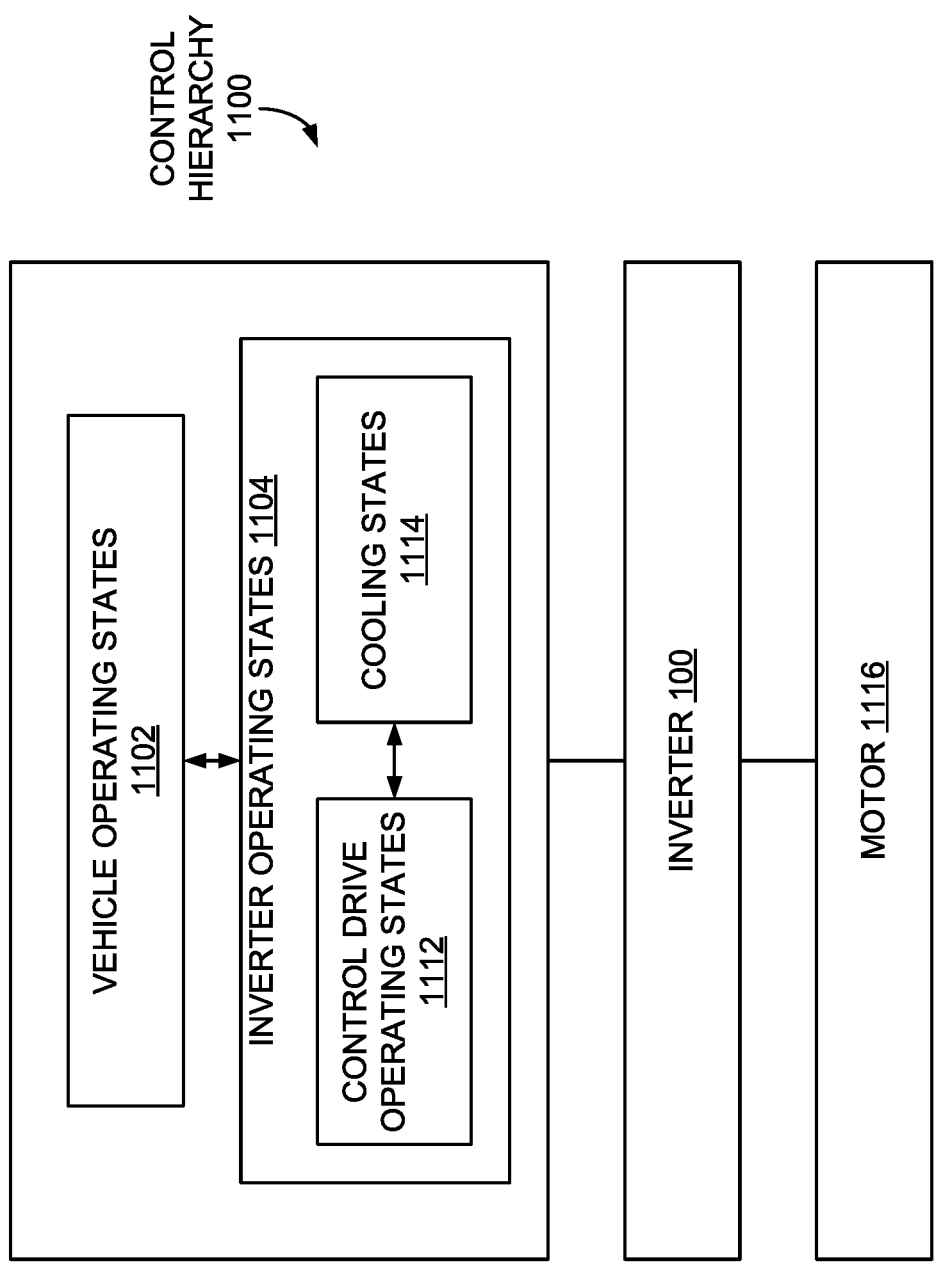
FIG. 11 is a block diagram depicting an example control hierarchy for a vehicle employing an inverter as disclosed herein.
Figure 12:
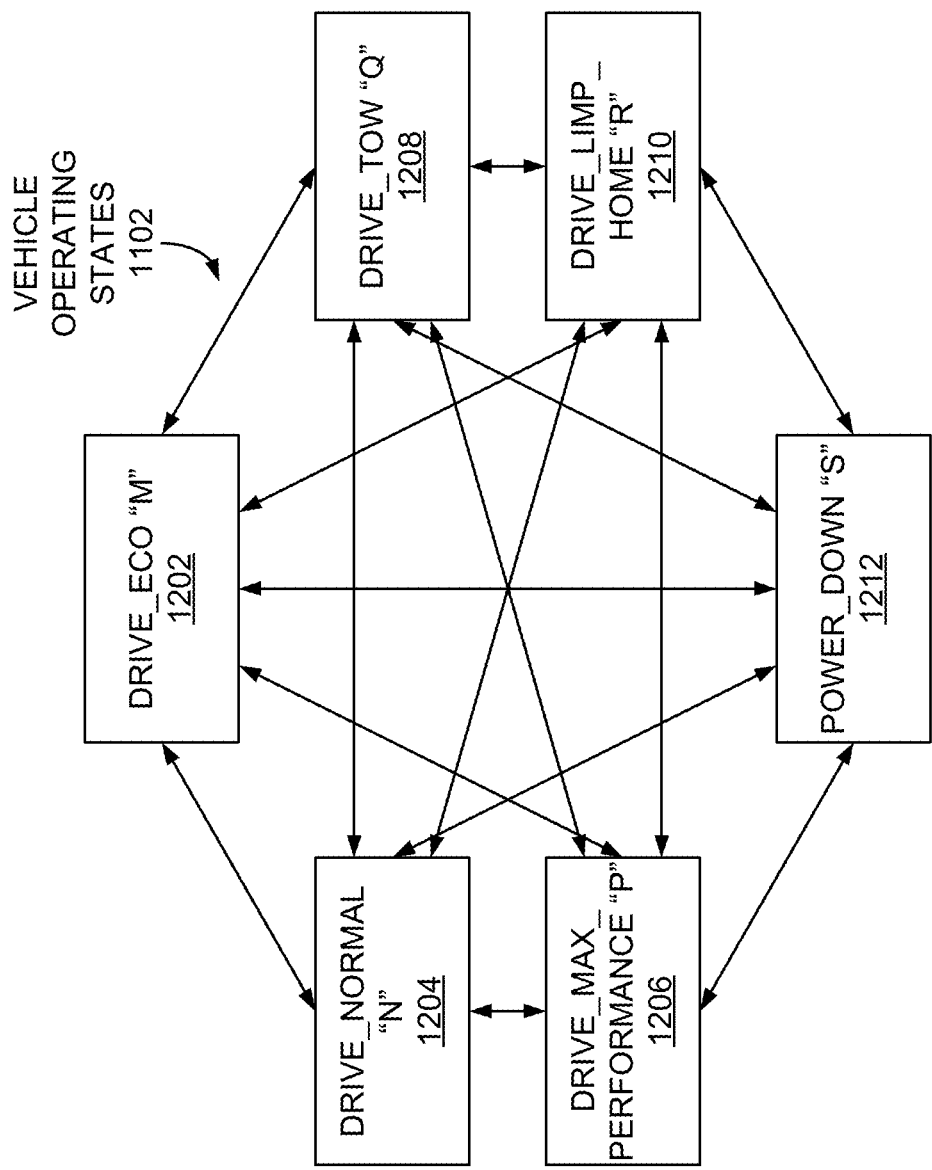
FIG. 12 is a state diagram of example vehicle operating states of the control hierarchy of FIG. 11.

FIG. 11 is a block diagram depicting an example control hierarchy 1100 for a vehicle employing an inverter 100 as disclosed herein. In these embodiments, the inverter 100 is employed to drive a traction motor 1116 or propulsion motor for the vehicle. However, in other implementations, a similar control hierarchy 1100 may be employed for an inverter 100 to drive a motor that controls the steering for the vehicle. In yet other examples, the inverter 100 may drive a generator, pump, or fan motor, charge a battery, or perform another task using a similar control hierarchy 1100. In yet other embodiments, another type of voltage-source converter, such as an AC-to-DC converter or a DC-to-DC converter, may be controlled using a control hierarchy similar to control hierarchy 1100 to convert electrical power between a higher and lower voltage level, or perform any other function that may utilize an inverter or converter with power transistors. At the top of the control hierarchy 1100 is a set of vehicle operating states 1102 related to the use of the traction motor 1116. In other examples in which a vehicle is not explicitly employed, the vehicle operating states 1102 may instead be motor operating states. In at least some examples, the vehicle operating states 1102 may collectively form a state machine, wherein transitions from one state to another may depend on a user input, inverter feedback signals, motor feedback signals, sensor information, vehicle configuration information, fault detection information, and/or other information. FIG. 12 provides an example state machine diagram for the vehicle operating states 1102, while FIG. 13 presents a state table provided more specific information regarding each of the vehicle operating states 1102.

Figure 14:
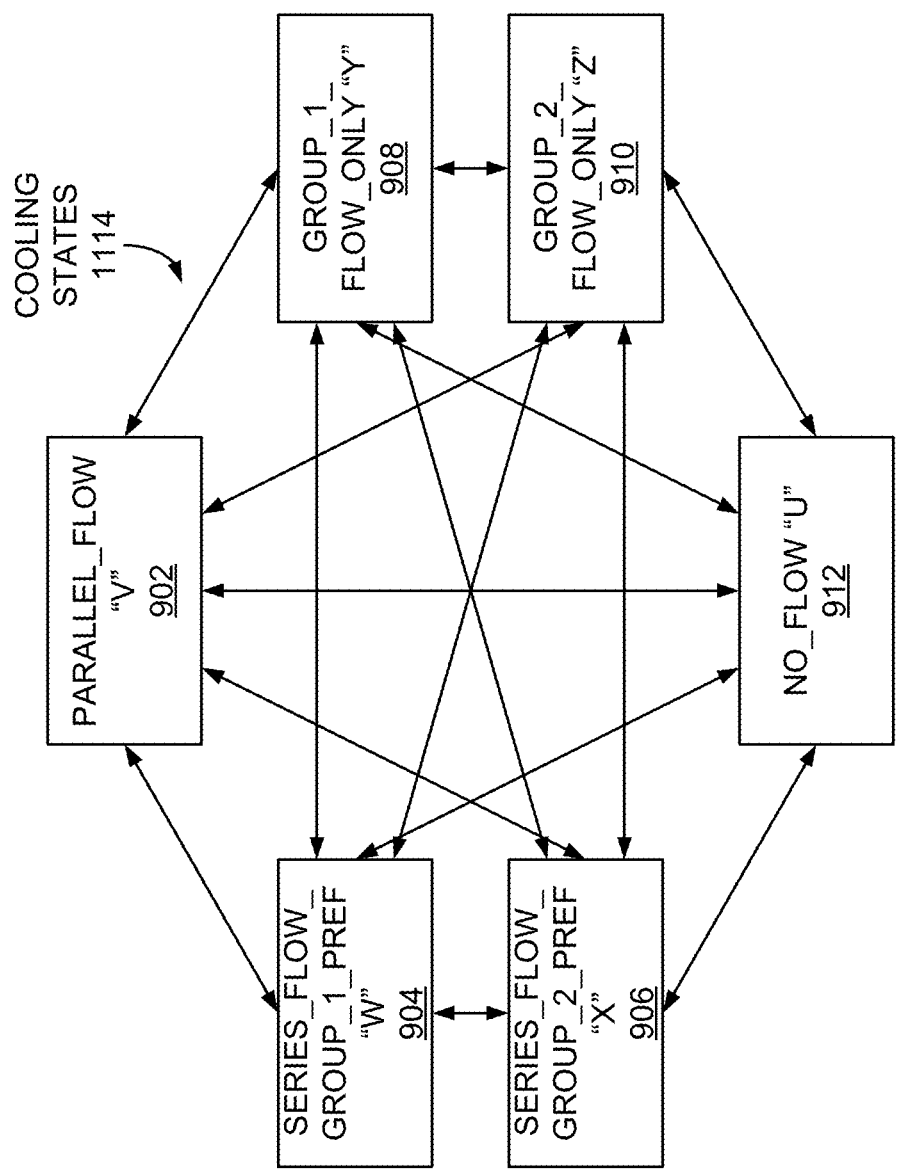
FIG. 14 is a state diagram of example cooling states of the control hierarchy of FIG. 11.
Figure 16:
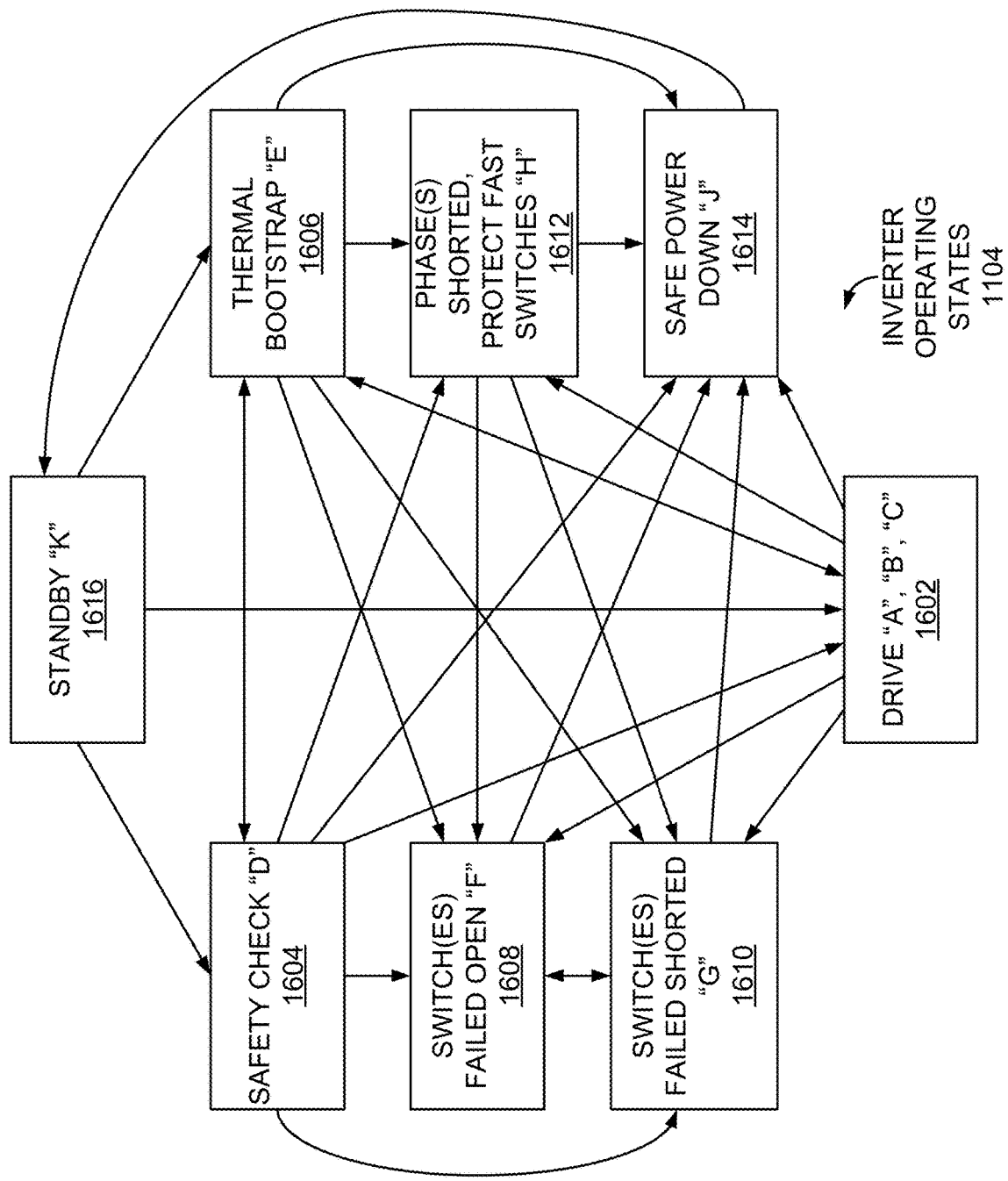
FIG. 16 is a state diagram of example inverter operating states of the control hierarchy of FIG. 11.

As depicted in FIG. 11, the vehicle operating states 1102 may correspond with a set of inverter operating states 1104. In this particular example, the inverter operating states 1104 may further incorporate a set of control drive operating states 1112 cooperating with a set of cooling states 1114. Each of the control drive operating states 1112 may specify a particular logic or voltage value or state, or sequence of logic or voltage values or states, by which the switches 211 and 212 of the switch groups 201 and 202 of each switch position 102 of an inverter 100 are driven. Each of the cooling states 1114 may correspond to one of the cooling states presented in FIGS. 9A through 9F, described more completely above. FIG. 16 provides a state diagram or machine of the various inverter operating states, while FIGS. 17A through 17R present a state table providing more specific information regarding each of the inverter operating states 1104, as well as various sub-states of those states 1104. FIGS. 19-28, 30, and 31 provide timing diagrams for various control drive operating states 1112 as they relate to particular inverter operating states 1104. FIG. 14 presents a state diagram of the cooling states 1114, and FIG. 15 provides a state table that more specifically describes each of the cooling states 1114.

In each of the embodiments discussed below, the operating states and associated operations of each level of the control hierarchy 1100, as described hereinafter, presume the use of two switch groups 201 and 202 of each switch position 102 of the inverter 100. In embodiments in which greater than two switch groups are employed, more operating states may be used as part of the inverter operating states 1104, the control drive operating states 1112, and/or the cooling states 1114. For example, presuming the cooling states 1114 include states for cooling a single switch group, a switch position 102 with two switch groups would have two such states, while a switch position 102 with three switch group would implement three such states. Similar situations are also possible for the inverter operating states 1104 and the control drive operating states 1112.

The implementation of the control hierarchy 1100, including, for example, the maintaining of the various operating states 1102, 1104, 1112, and 1114, the transitions between the states 1102, 1104, 1112, and 1114, and/or the operating of the inverter 100 and the cooling pathways 901 and 902 within each operating state 1102, 1104, 1112, and 1114, may be provided in at least some examples by one or more of the control logic circuit 420 of FIGS. 4A and 4B, the control processor 520 of FIGS. 5A and 5B, and the control drive logic circuit 530 of FIG. 5B.

FIG. 12 is a state diagram of the vehicle operating states 1102 of the control hierarchy 1100 of FIG. 11, in which each of the overall vehicle operating states 1102 is identified, along with allowed state transitions therebetween. However, in other examples, other particular states and/or state transitions are possible. In this specific embodiment, the vehicle operating states 1102 include a DRIVE_ECO "M" state 1202, a DRIVE_NORMAL "N" state 1204, a DRIVE_MAX_PERFORMANCE "P" state 1206, a DRIVE_TOW "Q" state 1208, a DRIVE_LIMP_HOME "R" state 1210, and a POWER_DOWN "S" state 1212.

FIG. 13 is an example vehicle operating state table 1300 for the vehicle operating states 1102 of FIG. 12. As described in the vehicle operating state table 1300, the DRIVE_ECO "M" state 1202 operates the inverter 100 to maximize vehicle efficiency while minimizing vehicle energy consumption. Oppositely, the DRIVE_MAX_PERFORMANCE "P" state 1206 operates the inventor 100 to maximize vehicle acceleration and performance. During times in which vehicle efficiency and performance are to be more balanced, the DRIVE_NORMAL "N" state 1204 may be utilized. During times when the vehicle is towing objects, such as boats, trailers, and the like, the DRIVE_TOW "Q" state 1208 may be utilized to maximize vehicle acceleration and towing capacity, such as by operating the inverter 100 to cause the traction motor to provide continuous low-speed torque. During situations in which a fault has been detected (e.g., within the inverter or at the inverter output phases) that may cause performance degradation, equipment damage (e.g., to the motor or inverter), or other maladies, the DRIVE_LIMP_HOME "R" state 1210 may be utilized to maintain partial or full output current and power during the fault condition to maintain some level of vehicle propulsion or vehicle steering system control. Further, to facilitate a shutdown of the inverter, and thus the traction motor, in response to a detected fault, a manual shutdown of the vehicle, or another event, the POWER_DOWN "S" state 1212 may be used.

FIG. 14 is a state diagram of the example cooling states 1114 of the control hierarchy 1100 of FIG. 11. In this particular example, the cooling states 1114 include the various cooling states described earlier with respect to FIGS. 9A through 9F above (e.g., the PARALLEL_FLOW "V" state 902, the SERIES_FLOW_GROUP_1_PREF "W" state 904, the SERIES_FLOW_GROUP_2_PREF "X" state 906, the GROUP_1_FLOW_ONLY "Y" state 908, GROUP_2_FLOW_ONLY "Z" state 910, and the NO_FLOW "U" state 912). As depicted in FIG. 14, each of the cooling states 1114 may transition to any other cooling state 1114, depending on the particular inverter operating state 1104 currently being used, for example. However, in other embodiments, some direct transitions from one cooling state 1114 to another may not be allowed.

FIG. 15 is an example cooling state table 1500 for the cooling states 1114 of FIG. 14, with each of the cooling states 1114 described therein corresponding to one of the cooling states 902 through 912, as illustrated in FIGS. 9A through 9F. More specifically, the PARALLEL_FLOW "V" state 902 ducts fluid coolant to both switch group 201 and switch group 202 in parallel, the SERIES_FLOW_GROUP_1_PREF "W" state 904 ducts fluid coolant entirely to switch group 201 (referred to as "Switch Group 1" in the state table 1500) and then to switch group 202 (referred to as "Switch Group 2" in the state table 1500) in series, the SERIES_FLOW_GROUP_2_PREF "X" state 906 ducts fluid coolant entirely to switch group 202 and then to switch group 201 in series, the GROUP_1_FLOW_ONLY "Y" state 908 ducts fluid coolant entirely to switch group 201 only, the GROUP_2_FLOW_ONLY "Z" state 910 ducts fluid coolant entirely to switch group 201 only, and the NO_FLOW "U" state 912 prevents the flow of fluid coolant to either switch group 201 or switch group 202.

FIG. 16 is a state diagram of example inverter operating states 1104 of the control hierarchy 1100 of FIG. 11. In this example, the inverter operating states 1104 include the DRIVE "A", "B", "C" state 1602, the SAFETY CHECK "D" state 1604, the THERMAL BOOTSTRAP "E" state 1606, the SWITCH(ES) FAILED OPEN "F" state 1608, the SWITCH(ES) FAILED SHORTED "G" state 1610, the PHASE(S) SHORTED, PROTECT FAST SWITCHES "H" state 1612, the SAFE POWER_DOWN "J" state 1614, and the STANDBY "K" state 1616. In some implementations, while the DRIVE "A", "B", "C" state 1602 may be viewed as three separate states ("A", "B", and "C"), this particular state 1602, as well as others of the inverter operating states 1104, are described herein as a single state that includes multiple sub-states.

FIGS. 17A through 17R collectively are an example inverter state table 1700 for the inverter operating states 1104 of FIG. 16, as well as various sub-states of at least some of the inverter operating states 1104. In the inverter state table 1700, each state and/or sub-state is described, and a list of triggers and associated "next states" for transitioning from that state or sub-state is provided. The inverter state table 1700 provides just one example of such a possible set of states and their potential transitions, and other versions of the inverter state table are possible in other embodiments. In this example, switch group 201 (or switch group 1, as sometimes referred to in FIGS. 17A through 17R) includes slower and/or larger switches 211 that may carry more current than faster and/or smaller switches 212 of switch group 202 (or switch group 2, as sometimes referred to in FIGS. 17A through 17R).

Various sub-states of the DRIVE "A", "B", "C" state 1602 are described in FIGS. 17 through 17E. Each of these sub-states facilitates a particular fault-free driving operating mode related to a particular driving load, which may be determined by way of the speed and torque output of the traction motor being driven by the inverter 100, as well as any commands regarding the desired speed of the vehicle, as requested by a user of the vehicle, an electronic controller of the vehicle, or the like. For example, shown in FIG. 17A, the DRIVE "A1" sub-state 1702 provides a normal driving scenario in which only switches of the faster-switching switch group (e.g., the switches 212 of switch group 202) are being operated to drive the traction motor. In one example, the switching frequency of the switches 212 in the DRIVE "A1" sub-state 1702 depends at least in part on the output load fundamental frequency. Moreover, the gate (control) signal for the switches 212 of the switch group 202 may employ reduced deadtime between commutation states.

In one embodiment, the DRIVE "A1" sub-state 1702 is coupled with one or more cooling states 1114 that enable effective operation of the switches 212 of the switch group 202, such as the SERIES_FLOW_GROUP_2_PREF "X" state 906 or the GROUP_2_FLOW_ONLY "Z" state 910.

As indicated in FIG. 17A, when in the DRIVE "A1" sub-state 1702, the inverter 100 may be transitioned to another sub-state of the DRIVE "A", "B", "C" state 1602, the SAFETY CHECK "D" state 1604, the THERMAL BOOTSTRAP "E" state 1606, or the SAFE POWER DOWN "J" state 1614 based on the current speed and/or torque of the motor output (possibly indicating a new vehicle operating state 1102), the receipt of a command indicating a new vehicle operating state 1102 (such as from a human driver of the vehicle or an autonomous controller of the vehicle), or a sensed temperature of one or more switches 211 and 212 of the switch groups 201 and 202 crossing some threshold value. If, instead, an open circuit fault of one or more switches 211 and 212 of the switch groups 201 and 202 is detected, a transition may be made to the SWITCH(ES) FAILED OPEN "F" state 1608, while the detection of a short circuit fault of one or more of the switches 211 and 212 of the switch groups 201 and 202 may cause a transition to the SWITCH(ES) FAILED SHORTED "G" state 1610. Further, a detection of one or more output phases of the inverter 100 being shorted may result in a transition to the PHASE(S) SHORTED, PROTECT FAST SWITCHES "H" state 1612. In some embodiments, each of the remaining sub-states of the DRIVE "A", "B", "C" state 1602 provide similar state transitions and associated triggers for each of the sub-states of the DRIVE "A", "B", "C" state 1602 indicated in FIGS. 17B through 17E.

In FIG. 17B, a DRIVE "B1" sub-state 1704 of the DRIVE "A", "B", "C" state 1602 may be viewed as a mid-load drive sub-state providing a relatively economical operation of the inverter 100 and the traction motor. In this sub-state 1704, for each switch cycle, the switches 212 of the second switch group 202 are activated, or turned on, first, followed by the switches 211 of the first switch group 201. Thereafter, the switches 211 of the first switch group 201 are turned off, followed by the switches 212 of the second switch group 202. During this switching, the switches 211 of the first switch group 201 may be switched using zero voltage switching (ZVS) to minimize power loss. As employed herein and below, ZVS may actually result in a small voltage across the switches 211 involved, but such voltage may be minute compared to the voltages involved in typical "hard" switching. Further, reduced deadtime between commutation states may increase voltage at the output of the inverter for more speed by the traction motor.

In some examples, the DRIVE "B1" sub-state 1704 is coupled with one or more cooling states 1114 that enable effective operation of the switches 211 and 212 of the switch groups 201 and 202, such as the PARALLEL_FLOW "V" state 902 or the SERIES_FLOW_GROUP_2_PREF "X" state 906.

FIG. 17C indicates that a DRIVE "B2" 1705 sub-state of the DRIVE "A", "B", "C" state 1602 may be viewed as a mid-load drive mode facilitating a more normal, balanced operation of the traction motor, providing some economical and performance benefits. For each switch cycle in this sub-state 1705, the switches 212 of the second switch group 202 are activated and then quickly deactivated, during which time the switches 211 of the first switch group 201 are turned on. Thereafter, the switches 212 of the second switch group 202 are activated and then quickly deactivated once again, during which time the switches 211 of the first switch group 201 are turned off. In some example, a reduced deadtime results compared to higher-power sub-states of the DRIVE "A", "B", "C" state 1602 to increase voltage on the output of the inverter 100.

As with the DRIVE "B1" sub-state 1704, the DRIVE "B2" 1705 sub-state, in at least some embodiments, may be coupled with one or more cooling states 1114 that enable effective operation of the switches 211 and 212 of the switch groups 201 and 202, such as the PARALLEL_FLOW "V" state 902 or the SERIES_FLOW_GROUP_2_PREF "X" state 906.

In FIGS. 17D and 17E, both a DRIVE "C1" sub-state 1706 and a DRIVE "C2" sub-state 1707 are employed as full-load drive sub-states to maximize the current being provided to the traction motor. In these sub-states 1706 and 1707, the switches 211 and 212 of both switch groups 201 and 202 are switched on and off substantially simultaneously during each switch cycle to maximize output current to the traction motor. With respect to the DRIVE "C1" sub-state 1706, off-state current is conducted through external flyback diodes coupled to, and packaged with, either or both of the switch groups 201 and 202 to reduce voltage spikes at the output of the switch groups 201 and 202. In the case of the DRIVE "C2" sub-state 1707, off-state current is conducted through body diodes that constitute a part of either or both of the switch groups 201 and 202. Coupled to both sub-states 1706 and 1707 may be one or more cooling states 1114 that enable maximum output operation of both switch groups 201 and 202, such as such as the PARALLEL_FLOW "V" state 902 or the SERIES_FLOW_GROUP_1_PREF "W" state 904.

FIG. 17F describes the SAFETY CHECK "D" state 1604, which employs the switches 211 of the first switch group 201 (e.g., the switch group with the higher current-carrying capacity switches) to detect whether a short circuit or stall condition at the output phases of the inverter 100 is present. To that end, the switches 211 of the first switch group 201 are turned on first. The higher current capacity and slower switching time of the switches 211 may allow detection of an overcurrent condition (such as by way of the desaturation detection circuit 800 of FIG. 8, for example) more safely than if the faster switches 212 of the second switch group 202 are employed for the same purpose. Coupled to the SAFETY CHECK "D" state 1604 may be one or more cooling states 1114 that enable maximum cooling of the switches 211 of the first switch group 201 to allow maximum avalanche current to be withstood by those switches 211 (e.g., the SERIES_FLOW_GROUP_1_PREF "W" state 904 or the GROUP_1_FLOW_ONLY "Y" state 908).

Similar to the sub-states 1702-1707 of the DRIVE "A", "B", "C" state 1602, when in the SAFETY CHECK "D" state 1604, the inverter 100 may be transitioned to another sub-state of the DRIVE "A", "B", "C" state 1602, the THERMAL BOOTSTRAP "E" state 1606, or the SAFE POWER DOWN "J" state 1614 based on the current speed and/or torque of the motor output, the receipt of a command indicating a new vehicle operating state 1102, or a sensed temperature of one or more switches 211 and 212 of the switch groups 201 and 202 crossing some threshold value. If, instead, an open circuit fault of one or more switches 211 and 212 of the switch groups 201 and 202 is detected, a transition may be made to the SWITCH(ES) FAILED OPEN "F" state 1608, while the detection of a short circuit fault of one or more of the switches 211 and 212 of the switch groups 201 and 202 may cause a transition to the SWITCH(ES) FAILED SHORTED "G" state 1610. Additionally, a detection of one or more output phases of the inverter 100 being shorted may result in a transition to the PHASE(S) SHORTED, PROTECT FAST SWITCHES "H" state 1612.

FIG. 17G provides a description of the THERMAL BOOTSTRAP "E" state 1606, which takes advantage of thermal coupling among switch groups 201 and 202 of a switch position 201 to conduct, convect, and/or radiate thermal energy from an operating switch group 201 or 202 to the other switch group 201 or 202 to enable the other switch group 201 or 202 to begin switching operations after reaching some thermal (temperature) set point. To promote the transmission of thermal energy from one switch group 201 or 202 to the other, the THERMAL BOOTSTRAP "E" state 1606 may be coupled to one or more cooling states that enable heat transfer between the switch groups 201 and 202 (e.g., the SERIES_FLOW_GROUP_1_PREF "W" state 904 or the SERIES_FLOW_GROUP_2_PREF "X" state 906). In addition, the possible state transitions from the THERMAL BOOTSTRAP "E" state 1606 and their associated triggers may be substantially the same as those specified above for the SAFETY CHECK "D" state 1604.

FIGS. 17H through 17K describe sub-states 1708, 1710, 1712, and 1714 of the SWITCH(ES) FAILED OPEN "F" state 1608. More specifically, FIG. 17H presents an OPEN CIRCUIT FAILURE DETECTION "F0" sub-state 1708, FIG. 17I describes a GROUP_1 SWITCH(ES) FAILED OPEN "F1" sub-state 1710, FIG. 17J discusses a GROUP_2 SWITCH(ES) FAILED OPEN "F2" sub-state 1712, and FIG. 17K presents an ALL-PHASE FREEWHEEL WITH OPEN-CIRCUIT FAILURE "F3" sub-state 1714.

Referring to FIG. 17H, the OPEN CIRCUIT FAILURE DETECTION "F0" sub-state 1708 represents the initial entry point of the SWITCH(ES) FAILED OPEN "F" state 1608 in response to, for example, a sensed open-circuit fault in one of the switch groups 201 and 202 while in one of the inverter operating states 1102 discussed above, or a sensed open-circuit fault in the output AC+ and AC− or AC PHASE U, V, or W, as shown above in FIGS. 1A and 1B. In one embodiment, an open-circuit fault may be detected by way of the group current feedback signals 612 of FIG. 6. Within this sub-state 1708, further diagnosis may be undertaken as to which switch group 201 or 202 the switch experiencing the open-circuit failure belongs. In some examples, such diagnosis tasks may include the selective opening and/or closing of the various switches 211 or 212 of the particular switch group 201 or 202 exhibiting the open-circuit failure while still maintaining the inverter 100 in an operative state.

Presuming the first switch group 201 has been confirmed as exhibiting the open-circuit failure, a transition to the GROUP 1 SWITCH(ES) FAILED OPEN "F1" sub-state 1710 may be made. If, instead, the second switch group 202 has been confirmed as exhibiting the failure, a transition may be made to the GROUP 2 SWITCH(ES) FAILED OPEN "F2" sub-state. If a command for a new vehicle operating state 1102 is received (e.g., based on the open-circuit fault being detected), or if a temperature of one or more devices of one of the switch groups 201 or 202 crosses some predetermined threshold, a transition to either the ALL-PHASE FREEWHEEL WITH OPEN-CIRCUIT FAILURE "F3" sub-state 1714 or the SAFE POWER DOWN "J" state 1614 may be made. Otherwise, if at least one switch 211 or 212 of at least one switch group 201 or 202 is sensed to have failed to a short circuit, a transition to the SWITCH(ES) FAILED SHORT "G" state 1610 may occur.

In some examples, the OPEN CIRCUIT FAILURE DETECTION "F0" sub-state 1708 may be coupled with one or more cooling states 1114 to the switch group 201 and 202 that remains active, as well as reduce or eliminate cooling from that switch group that is no longer active (e.g., the SERIES_FLOW_GROUP_1_PREF "W" state 904, the SERIES_FLOW_GROUP_2_PREF "X" state 906, the GROUP_1_FLOW_ONLY "Y" state 908, or the GROUP_2_FLOW_ONLY "Z" state 910). Similarly, each of the other sub-states 1710, 1712, and 1714 of the SWITCH (ES) FAILED OPEN "F" state 1608 may employ the same cooling states 1114 in some implementations.

In FIGS. 17I and 17J, the GROUP_1 SWITCH(ES) FAILED OPEN "F1" sub-state 1710 and the GROUP 2 SWITCH(ES) FAILED OPEN "F2" sub-state 1712, respectively, may cause the remaining operational switch group 201 or 202 to be used to drive the motor. If the other switch group 201 or 202 also exhibits an open-circuit failure, a transition to the opposing failure sub-state (e.g., the GROUP 1 SWITCH(ES) FAILED OPEN "F1" sub-state 1710 or the GROUP 2 SWITCH(ES) FAILED OPEN "F2" sub-state 1712) or to the SAFE POWER DOWN "J" state 1614 may be made. If, instead, at least one of the switches 211 or 212 of the switch groups 201 or 202 is detected as failing in a short-circuit mode, a transition may be made to the SWITCH(ES) FAILED SHORT "G" state 1610. Otherwise, if a command for a new vehicle operating state 1102 is received (e.g., based on the open-circuit fault being detected), or if a temperature of one or more devices of one of the switch groups 201 or 202 crosses some predetermined threshold, a transition to either the ALL-PHASE FREE-WHEEL WITH OPEN-CIRCUIT FAILURE "F3" sub-state 1714 or the SAFE POWER DOWN "J" state 1614 may be made.

FIG. 17K describes the ALL-PHASE FREEWHEEL WITH OPEN-CIRCUIT FAILURE "F3" sub-state 1714, in which the switches 211 or 212 of the non-failing switch group 201 or 202 of the switch positions 102 in the lower or upper half-bridges of all output phases of the inverter 100 are turned on to create a short circuit through the output phases of the inverter 100 via the motor. Use of this sub-state 1714 may reduce DC bus voltage overshoot by the DC inputs (e.g., DC+ and DC− of FIGS. 1A and 1B) when high inductance energy is present on the output phases of the inverter 100 (e.g., high back electromotive force (EMF) from high-speed operation of the motor). In some examples, this sub-state 1714 may be utilized when driving a permanent magnet AC (PMAC) or brushless DC (BLDC) motor load, but not when driving an AC induction motor (ACIM), wound rotor motor (WRM), synchronous reluctance motor (SyRM), or switched reluctance motor (SRM) load.

When in the ALL-PHASE FREEWHEEL WITH OPEN-CIRCUIT FAILURE "F3" sub-state 1714, a transition may be made to one of the switch-group-specific sub-states 1710 or 1712, or to the SAFE POWER DOWN "J" state 1614, in response to receiving a command for a new vehicle operating state 1102. A transition may be made to the OPEN CIRCUIT FAILURE DETECTION "F0" sub-state 1708 or to the SAFE POWER DOWN "J" state 1614 in response to sensing the other switch group 201 or 202 experiencing an open-circuit failure. If, instead, a switch 211 and 212 of at least one of the switch groups 201 and 202 is sensed to be exhibiting a short-circuit failure, a transition to the SWITCH (ES) FAILED SHORT "G" state 1610 may be made. Otherwise, a sensed temperature of one or more switches 211 and 212 of at least one of the switch groups 201 and 202 crossing a threshold value may result in a transition to the SAFE POWER_DOWN "J" state 1614.

FIGS. 17L through 17O describe sub-states 1716, 1718, 1720, and 1722 of the SWITCH(ES) FAILED SHORTED "G" state 1610. More specifically, FIG. 17L presents a SHORT CIRCUIT FAILURE DETECTION "G0" sub-state 1716, FIG. 17M describes an AUTOFUSE FAILED SWITCH(ES) "G1" sub-state 1718, FIG. 17N discusses an ALL-PHASE FREEWHEEL "G2" sub-state 1720, and FIG. 17O presents a TIMEOUT "G3" sub-state 1722.

Referring to FIG. 17L, the SHORT CIRCUIT FAILURE DETECTION "G0" sub-state 1716 represents the initial entry point of the SWITCH(ES) FAILED SHORTED "G" state 1610 in response to, for example, a sensed short-circuit fault in one of the switch groups 201 and 202 while in one of the inverter operating states 1102 discussed above. In one embodiment, a short-circuit fault may be detected by way of the desaturation detection circuit 800 of FIG. 8. Within this sub-state 1716, further diagnosis may be undertaken as to which switch group 201 or 202 the switch experiencing the short-circuit failure belongs. In some examples, such diagnosis tasks may include the selective opening and/or closing of the various switches 211 or 212 of the particular switch group 201 or 202 exhibiting the short-circuit failure while still maintaining the inverter 100 in an operative state.

The SHORT CIRCUIT FAILURE DETECTION "G0" sub-state 1716 may be coupled with one or more cooling states 1114 such that the switch group 201 or 202 with the higher thermal load due to the short-circuited condition is prioritized with respect to cooling (e.g., the SERIES_FLOW_GROUP_1_PREF "W" state 904, the SERIES_FLOW_GROUP_2_PREF "X" state 906, the GROUP_1_FLOW_ONLY "Y" state 908, or the GROUP_2_FLOW_ONLY "Z" state 910).

If a short circuit within one of the switch groups 201 or 202 is verified or confirmed, a transition may be made to either the AUTOFUSE FAILED SWITCH(ES) "G1" sub-state 1718 or the ALL-PHASE FREEWHEEL "G2" sub-state 1720 based on how the inverter 100 is programmed or designed to handle the fault. In one example, if the inverter 100 is employed to drive a traction motor with passive regeneration torque, such as a PMAC motor, the ALL-PHASE FREEWHEEL "G2" sub-state 1720 may be employed; otherwise, the AUTOFUSE FAILED SWITCH (ES) "G1" sub-state 1718 may be entered. If, instead, a new vehicle operating state 1102 is received, such as one based on a fault condition, a transition may be made to either the OPEN CIRCUIT FAILURE DETECTION "F0" sub-state 1708 (in the case of a sensed open-circuit failure), the ALL-PHASE FREEWHEEL "G2" sub-state 1720, or the SAFE POWER DOWN "J" state 1614. If a temperature for one or more switches 211 and 212 of the switch groups 201 and 202 is determined to have crossed a threshold value, a transition to the SAFE POWER DOWN "J" state 1614 may occur.

In the AUTOFUSE FAILED SWITCH(ES) "G1" sub-state 1718, described in FIG. 17M, at least one attempt is made to convert one or more short-circuited switches 211 or 212 into open-circuited switches. To accomplish that conversion, the switches 211 or 212 that have been determined to be short-circuited are operated such that they overheat to cause an open-circuit failure or other "tripped-fuse" type of outcome. In one example, the switch group 201 or 202 containing the one or more short-circuited switches may be operated while the cooling imparted to those switches 211 or 212 is reduced or eliminated. In another example, the switch control circuit 401, 402 turns on one or more switch groups 201, 202 at one or more switch positions 102 that can directly connect the switch group 201 or 202 containing the one or more short-circuited switches to the first (DC+) and second (DC−) input connections in a low resistance, or "shoot through," pathway, without a conduction path through the output (AC+, AC−, or AC PHASE U, V, or W), and at the same time the switch control circuit 401, 402 turns off any switches 211, 212 that have not short-circuited but that are within the switch group 201 or 202 with the short-circuited switches 211 or 212 and turns off any switch groups 201, 202 in parallel to the switch group 201 or 202 with the short-circuited switches 211 or 212, to impart maximum current into the short-circuited switches 211 or 212 to cause them to overheat Accordingly, the AUTOFUSE FAILED SWITCH(ES) "G1" sub-state 1718 may be coupled with one or more cooling states 1114 to supply sufficient cooling to the switch group 201 or 202 that does not contain a short-circuited switch 211 or 212, as well as to reduce or eliminate cooling from the switch group 201 or 202 that includes the one or more short-circuited switches 211 or 212 (e.g., the SERIES_FLOW_GROUP_1_PREF "W" state 904, the SERIES_FLOW_GROUP_2_PREF "X" state 906, the GROUP_1_FLOW_ONLY "Y" state 908, or the GROUP_2_FLOW_ONLY "Z" state 910).

If the attempt at generating an open circuit in the affected switch 211 or 212 is successful, a transition to the OPEN CIRCUIT FAILURE DETECTION "F0" sub-state 1708 to address the newly-open-circuited switch 211 or 212 may occur. If, instead, the attempt to generate the open circuit is unsuccessful, a transition may be made to either the ALL-PHASE FREEWHEEL "G2" sub-state 1720 or the TIMEOUT "G3" sub-state 1722, depending on whether addi-tional attempts at open-circuiting the failed switch 211 or 212 are allowed. Otherwise, if a new vehicle operating state 1102 is received, such as one based on a fault condition, a transition may be made to either the OPEN CIRCUIT FAILURE DETECTION "F0" sub-state 1708 (in the case of a sensed open-circuit failure) or the SAFE POWER DOWN "J" state 1614.

In the ALL-PHASE FREEWHEEL "G2" sub-state 1720 of FIG. 17N, the switches 211 or 212 of the switch group 201 or 202 of the switch positions 102 in the lower or upper half-bridges of all output phases of the inverter 100 may be turned on to create a short circuit through the output phases of the inverter 100 via the motor. The selected lower or upper half-bridges may include the short-circuited switches 211 or 212. Use of this sub-state 1720 may reduce DC bus voltage overshoot by the DC inputs (e.g., DC+ and DC− of FIGS. 1A and 1B) when high inductance energy is present on the output phases of the inverter 100 (e.g., high back electromotive force (EMF) from high-speed operation of the motor). As with the ALL-PHASE FREEWHEEL WITH OPEN-CIRCUIT FAILURE "F3" sub-state 1714, the ALL-PHASE FREEWHEEL "G2" sub-state 1720 may be utilized when driving a PMAC or BLDC motor load, but possibly not when driving an ACIM, WRM, SyRM, or SRM load in some embodiments.

The ALL-PHASE FREEWHEEL "G2" sub-state 1720 may be coupled with one or more cooling states 1114 to supply sufficient cooling to the switch group 201 or 202 that receives the highest thermal burden (e.g., the SERIES_FLOW_GROUP_1_PREF "W" state 904, the SERIES_FLOW_GROUP_2_PREF "X" state 906, the GROUP_1_FLOW_ONLY "Y" state 908, or the GROUP_2_FLOW_ONLY "Z" state 910).

When in the ALL-PHASE FREEWHEEL "G2" sub-state 1720, an indication that at least one switch 211 or 212 of the other switch group 201 or 202 has failed short-circuited may cause a transition to either the SHORT CIRCUIT FAILURE DETECTION "G0" sub-state 1716 or the SAFE POWER-_DOWN "J" state 1614. If an indication is received that at least one switch 211 or 212 of the other switch group 201 or 202 has instead failed open-circuited, a transition to the OPEN CIRCUIT FAILURE DETECTION "F0" sub-state 1708 may occur. If a command for a new vehicle operating state 1102 is received, such as one based on the closed-circuit fault condition, a transition to any of the AUTOFUSE FAILED SWITCH(ES) "G1" sub-state 1718, the TIMEOUT "G3" sub-state 1722, or the SAFE POWER DOWN "J" state 1614 may occur. Otherwise, a sensed temperature of one or more switches 211 and 212 of at least one of the switch groups 201 and 202 crossing a threshold value may result in a transition to the SAFE POWER DOWN "J" state 1614.

In the TIMEOUT "G3" sub-state 1722 of FIG. 17O, a pause in switch operation is provided for some predetermined period of time before entering another state or sub-state. In one example, after spending the predetermined period of time within the sub-state 1722 (determined by way of the expiration of a timer, for example), a transition to the AUTOFUSE FAILED SWITCH(ES) "G1" sub-state 1718 may occur to re-attempt an autofusing operation of the short-circuited switches 211 or 212. In other examples, the passing of the time period may result in a transition to either the ALL-PHASE FREEWHEEL "G2" sub-state 1720 (such as if it is determined that autofusing will not be successful) or the SAFE POWER DOWN "J" state 1614. If a command for a new vehicle operating state 1102 is received, such as one based on the closed-circuit fault condition, a transition to any of the AUTOFUSE FAILED SWITCH(ES) "G1"

sub-state 1718, ALL-PHASE FREEWHEEL "G2" sub-state 1720, or the SAFE POWER DOWN "J" state 1614 may be made. Otherwise, a sensed open-circuit fault of one or more switches 211 or 212 may result in a transition to the OPEN CIRCUIT FAILURE DETECTION "F0" sub-state 1708.

The TIMEOUT "G3" sub-state 1722 may be coupled with one or more cooling states 1114 to supply sufficient cooling to the switch group 201 or 202 that receives the highest thermal burden as a result of the previous sub-state (e.g., the SERIES_FLOW_GROUP_1_PREF "W" state 904, the SERIES_FLOW_GROUP_2_PREF "X" state 906, the GROUP_1_FLOW_ONLY "Y" state 908, or the GROUP_2_FLOW_ONLY "Z" state 910).

The PHASE(S) SHORTED, PROTECT FAST SWITCHES "H" state 1612, as described in FIG. 17P, may be entered as a result of an indication of a short-circuit condition at one or more output phases of the inverter 100, such as an indication by the desaturation detection signal 810 of FIG. 8 that a desaturation condition of one of the switches 211 or 212 exists. In response to such a condition, the slower switches 211 of the first switch group 201 associated with the problematic output phase may be turned on, and the faster switches 212 of the second switch group 202, if on, may be turned off. The slower rise time of the slower switches 211 may allow the control logic circuitry 420, control drive circuits 401 and 402, and/or the like to verify the validity of the sensed short-circuit failure using the more robust slower switches 211 while allowing the detection threshold for the faster switches 212 of the second switch group 202 to be sensitive, thus better protecting the faster switches 212 without sacrificing a robust detection of a shorted output phase. Coupled with the PHASE(S) SHORTED, PROTECT FAST SWITCHES "H" state 1612 may be any cooling state that thermally protects the currently operating switches sufficiently.

In the PHASE(S) SHORTED, PROTECT FAST SWITCHES "H" state 1612, if a short-circuited output phase is verified, a transition may be made to the SAFE POWER DOWN "J" state 1614 if the output phase is associated with passive regeneration torque, such as with a PMAC motor, or to the ALL-PHASE FREEWHEEL WITH OPEN-CIRCUIT FAILURE "F3" sub-state 1714 if the output phases do not provide torque during a freewheel operation, such as with an ACIM motor. If, however, a short-circuited output phase has not been verified, a transition to the SHORT CIRCUIT FAILURE DETECTION "G0" sub-state 1716 may occur in the event that the detected short-circuit is located at a switch 211 or 212 of one of the switch groups 201 or 202. Otherwise, a sensed temperature of one or more switches 211 and 212 of at least one of the switch groups 201 and 202 crossing a threshold value may result in a transition to the SAFE POWER DOWN "J" state 1614.

The SAFE POWER DOWN "J" state 1614 of FIG. 17Q facilitates a controlled shutdown of the inverter 100 output and output load (e.g., motor phase) excitation by way of depowering the switch groups 201 and 202 and control drive circuits 401 and 402 in sequence, possibly with a disconnection of DC input power voltage (e.g., the DC+ and DC− input of FIGS. 1A and 1B) via internal or external mechanical, electromechanical, semiconductor, and/or other switch devices. Also, other safety mechanisms, such as communication of the present state 1614 to other circuits and a discharge of high-voltage energy retained in capacitors, inductors, and/or other devices, may be employed. The SAFE POWER DOWN "J" state 1614 may be coupled with one or more cooling states to provide cooling to the switch groups 201 and 202 that receive the highest thermal burden during the shutdown sequence. Once the controlled shutdown in complete, a transition to the STANDBY "K" state 1616 may occur. Otherwise, if a command to enter a new vehicle operating state 1102 state is received, a transition to that state (e.g., the DRIVE "A", "B", "C" state 1602, the SAFETY CHECK "D" state 1604, or the THERMAL BOOTSTRAP "E" state 1606) may occur.

The STANDBY "K" state 1616 of FIG. 17R is a powered-down, quiescent state of the inverter 100 in which a command to enter a new vehicle operating state 1101 may be received, thus resulting in a transition to that state (e.g., the DRIVE "A", "B", "C" state 1602, the SAFETY CHECK "D" state 1604, or the THERMAL BOOTSTRAP "E" state 1606).

In conjunction with many of the figures discussed below, particular logic levels of control or gate signals for the switches 211 and 212 of the switch groups 201 and 202, including sequences of such logic levels, are described in relation to a particular inverter operating state 1102. The logic levels of the control or gates signals may constitute a particular control drive operating state 1112 indicated in FIG. 11.

Figure 18:
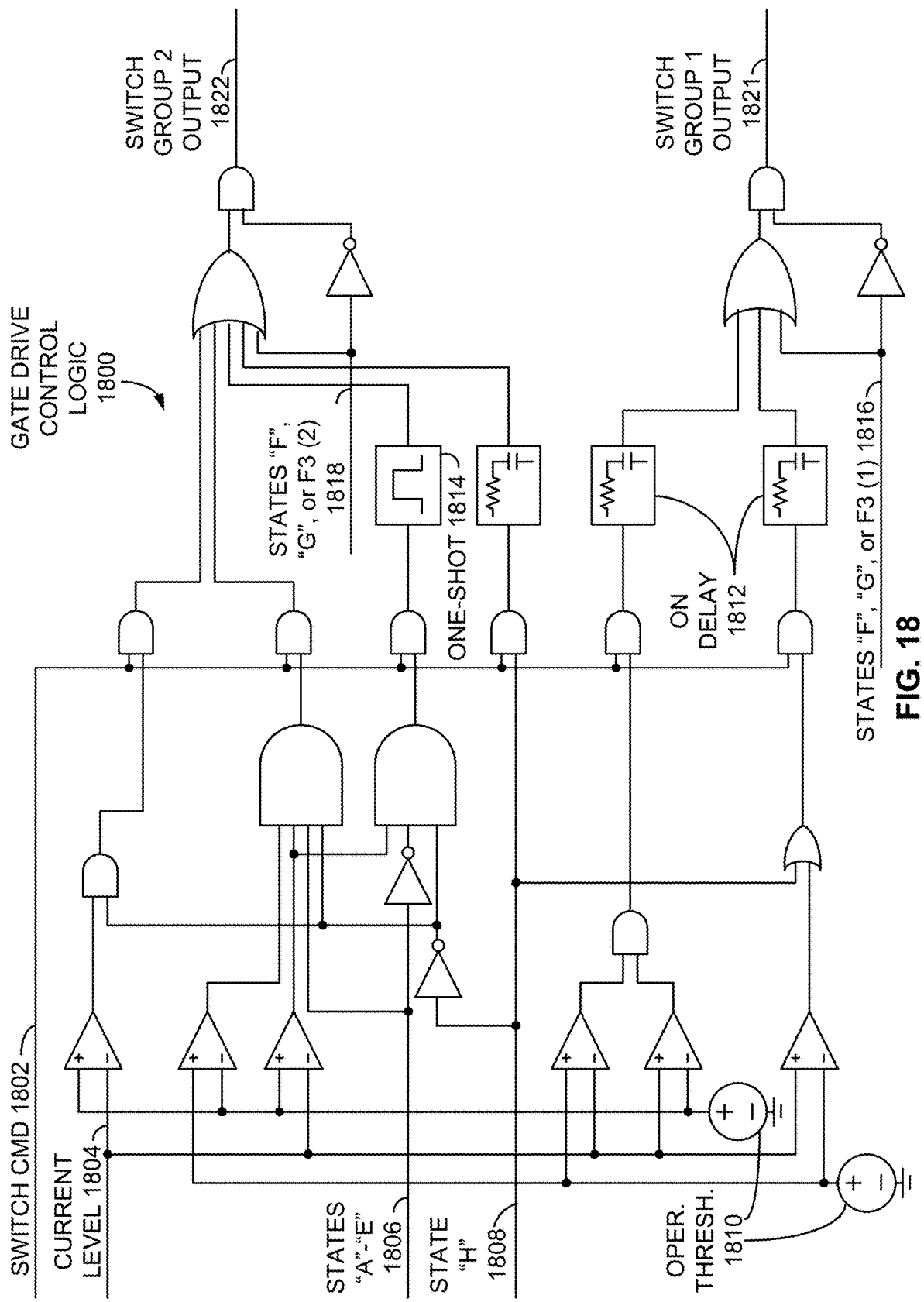
FIG. 18 is an example hardware control circuit for two switch groups of a switch position of an inverter.

FIG. 18 is an example simplified hardware control circuit (e.g., gate drive control logic 1800) for two switch groups 201 and 202 of a switch position 102 of an inverter 100. Generally, a first switch group output 1821 is the control input (e.g., gate input) for the switches 211 of the first switch group 201, while a second switch group output 1822 serves as the control input for the switches 212 of the second switch group 202. In one example, the gate drive control logic 1800 may be utilized as at least a portion of the control drive logic circuit 530 of FIG. 5B. Given the difference in switch types 211 and 212 employed in the two switch groups 201 and 202, the logic circuitry generating the second switch group output 1822 may be different from that generating the first switch group output 1821, as depicted in FIG. 18.

In an example, a switch command signal 1802 may be provided as an enabling signal for each of the inverter operating states 1104 "A" through "E" and "H" via a set of AND gates. In addition, a current level signal 1804 (or, alternatively, a power level signal) indicating by way of an analog voltage a level of current being provided via the output of the switch position 102, may be compared against lower and higher operational thresholds 1810 by way of comparators to enable operation of the switches 211 and 212 of the switch groups 201 and 202 according to the current inverter operating state 1104. In some embodiments, an inverter operating state 1104 of "A" through "E" may be conditioned using a one-shot circuit 1814 to drive at least the second switch group output 1822 for some limited period of time. Such period of time may be controllable and variable in some examples. Moreover, in the "H" inverter operating state 1104 (e.g., the PHASE(S) SHORTED, PROTECT FAST SWITCHES "H" state 1612), as well as possibly in response to a current fault condition, an on-delay circuit 1812 may be employed to delay the activation of either or both of the switch group outputs 1821 and 1822 to facilitate verification of a shorted phase condition prior to damage being inflicted upon the impacted switches 211 and/or 212. Further, use of the "F" or "G" inverter operating states 1104 (e.g., the SWITCH(ES) FAILED OPEN state "F" 1608 or the SWITCH(ES) FAILED SHORTED "G" state 1610) may cause quick deactivation of either or both of the switch group output signals 1821 and 1822 via AND gates responsible for producing the switch group output signals 1821 and 1822 via control signals 1816 and 1818. Further, each of the control signals 1816 and 1818 may activate the switches 211 and 212 of its corresponding switch group 201 and/or 202 in the ALL-PHASE FREEWHEEL WITH OPEN-CIRCUIT FAILURE "F3" sub-state 1714 of FIG. 16. While FIG. 18 provides a particular example of the gate drive control logic 1800, other embodiments of logic circuitry for providing similar operational capability are also possible.

Figure 19:
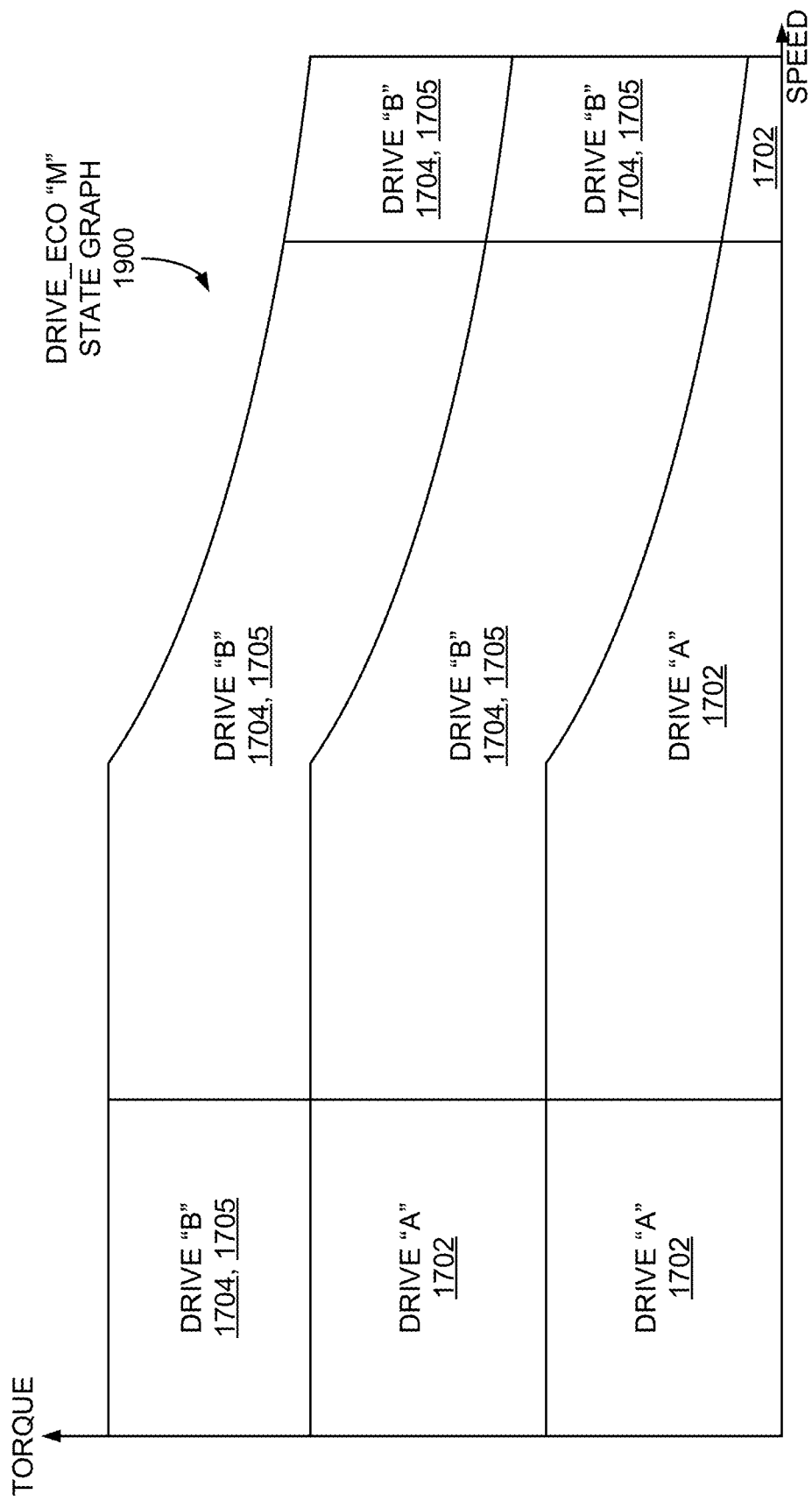
FIGS. 19 through 22 are vehicle operating state graphs for selected ones of the vehicle operating states of FIGS. 12 and 13.
Figure 20:
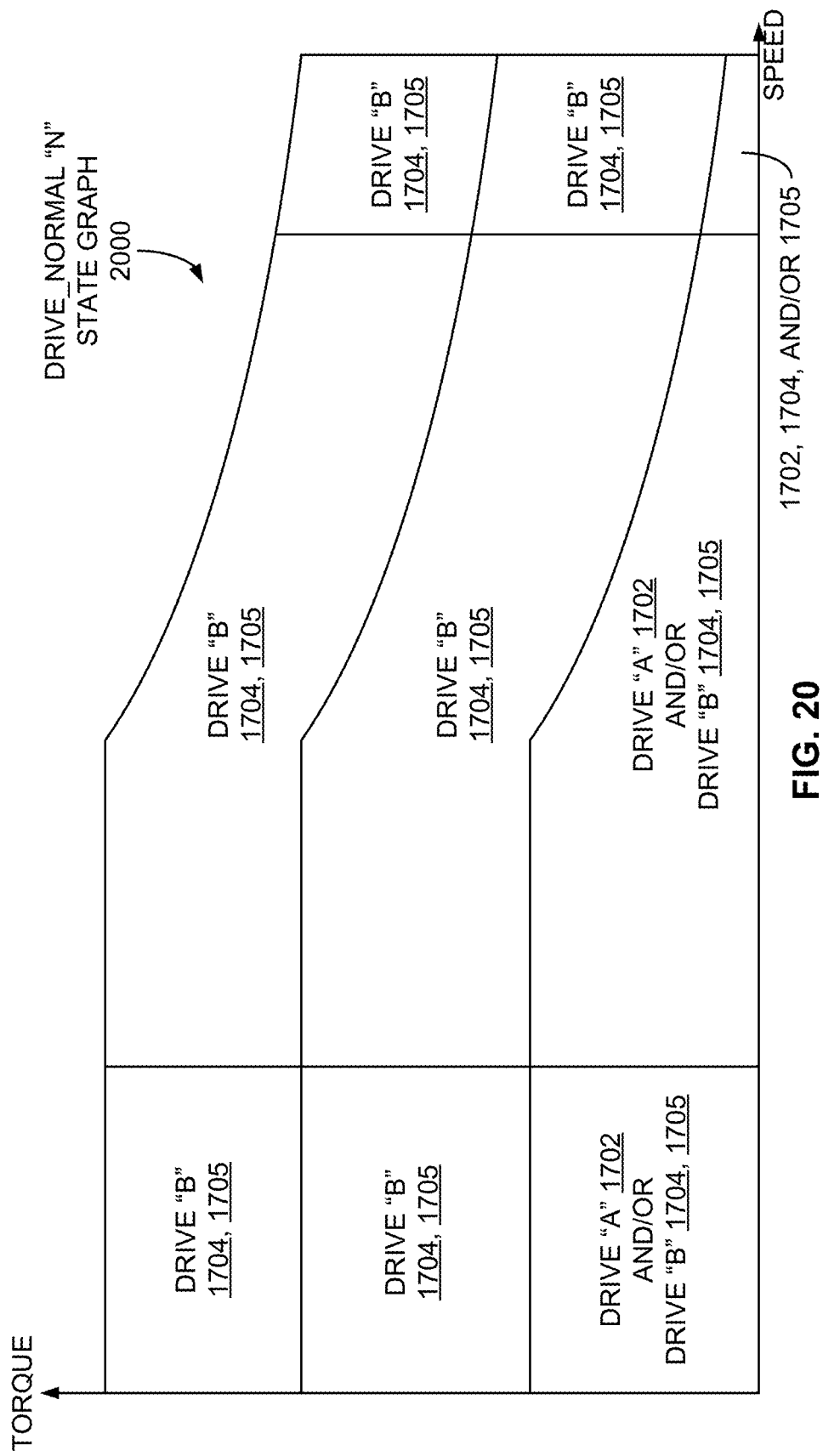
Figure 21:
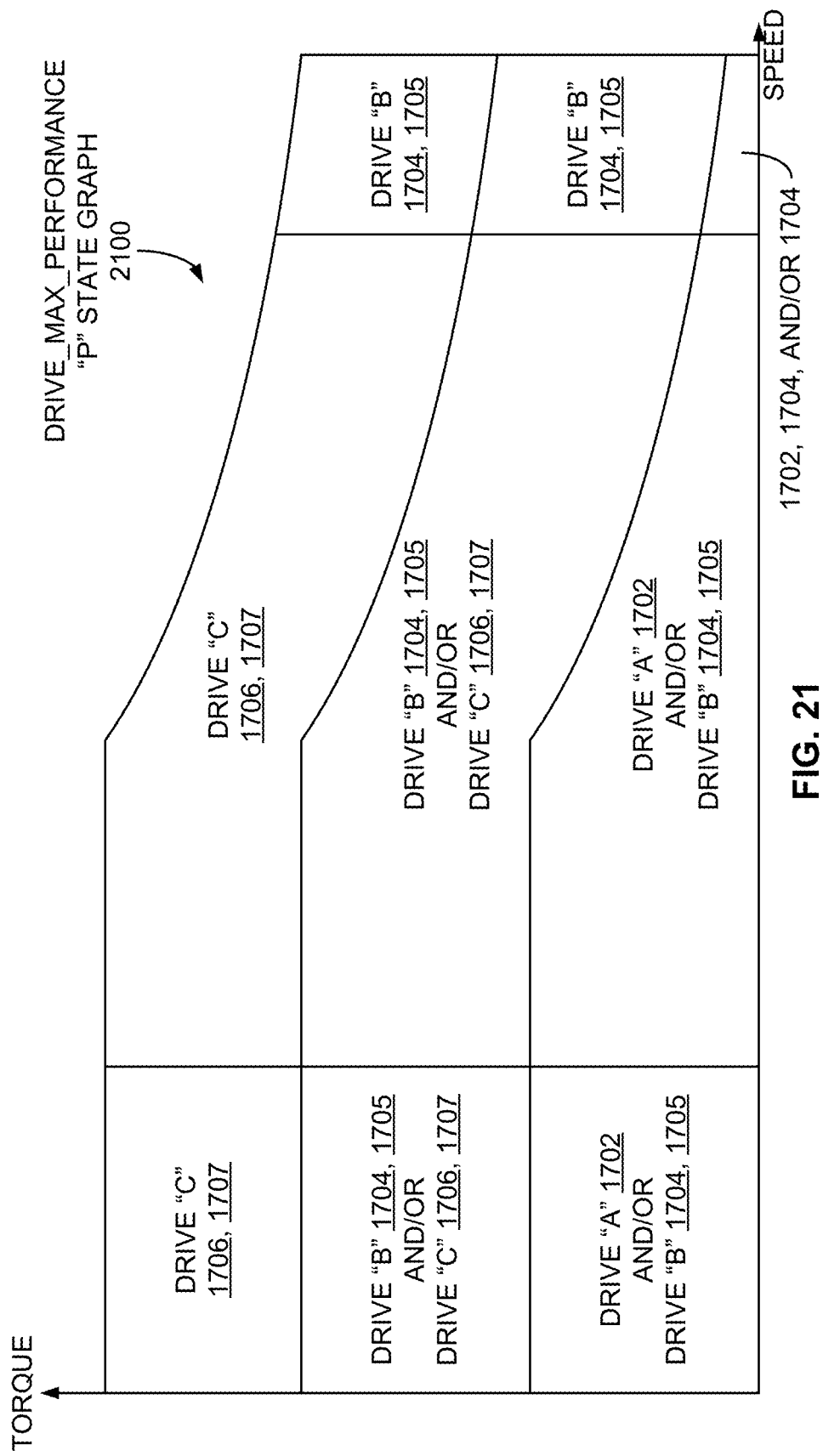
Figure 22:
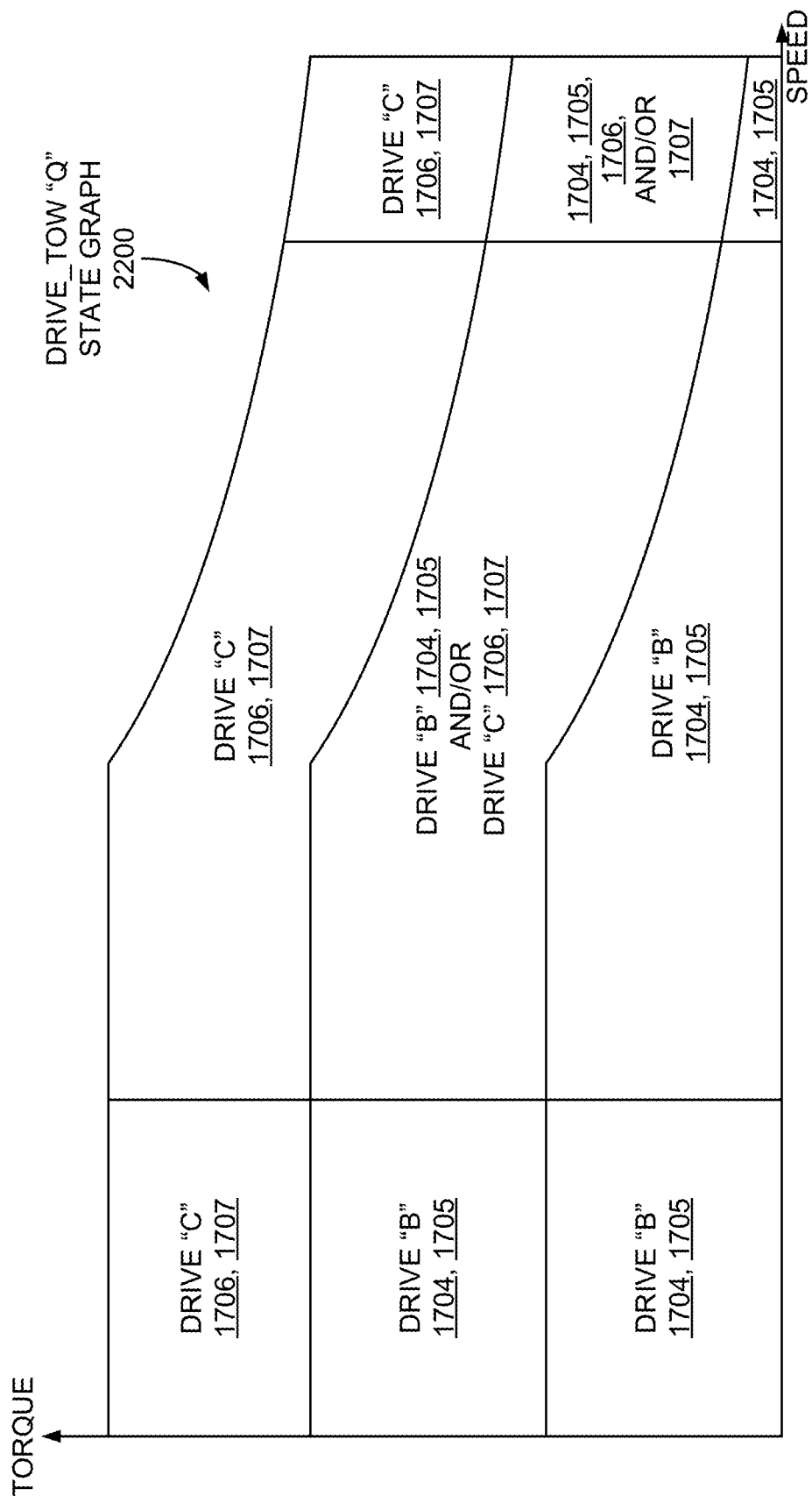

FIGS. 19 through 22 are vehicle operating state graphs 1900 through 2200 for selected ones of the vehicle operating states 1102 of FIGS. 12 and 13. More specifically, FIG. 19 is a state graph 1900 for the DRIVE_ECO "M" state 1202, FIG. 20 is a state graph 2000 for the DRIVE_NORMAL "N" state 1204, FIG. 21 is a state graph 2100 for the DRIVE_MAX_PERFORMANCE "P" state 1206, and FIG. 21 is a state graph 2100 for the DRIVE_TOW "Q" state 1208. In each of FIGS. 19-22, a graph of vehicle torque versus vehicle speed is depicted, with each graph divided into a number of regions, with each region specifying a range of torque and speed within which a particular inverter operating state 1104 is to be employed. For example, in FIG. 19, lower levels of torque, or moderate levels of torque in combination with low speeds, may be served via use of the DRIVE "A1" sub-state 1702, while higher levels of torque may be implemented using the DRIVE "B1" sub-state 1704 and/or the DRIVE "B2" sub-state 1705 described above. Similarly, in FIG. 20, various regions of the torque-versus-speed graph employ one of the same inverter sub-states 1702, 1704, and 1705 as in FIG. 19. However, in the DRIVE_NORMAL "N" state 1204, stronger inverter sub-states 1702, 1704, and/or 1704 may be used for the lower torque and/or lower speed regions to provide greater performance, albeit with the possible tradeoff of less fuel economy. Further, in FIG. 21, use of the DRIVE "C1" 1706 and/or DRIVE "C2" 1707 inverter sub-states supplement the use of the DRIVE "A1" sub-state 1702, the DRIVE "B1" sub-state 1704, and the DRIVE "B2" sub-state 1705, with stronger inverter sub-states being employed in the low-to-mid speed, mid-to-high torque ranges in the DRIVE_MAX_PERFORMANCE "P" state graph 2100 relative to the DRIVE_NORMAL "N" state graph 2000 of FIG. 20. In FIG. 22, the DRIVE_TOW "Q" state graph 220 generally employs stronger inverter sub-states in many torque-versus-speed ranges, with the lowest drive sub-state (e.g., the DRIVE "A1" sub-state 1702) not being used at all. In other examples, the torque-versus-speed ranges may be defined differently, the particular inverter operating sub-states associated with these ranges may be altered, and other aspects or characteristics relating particular vehicle operating states 1102 to inverter operating states 1104 may be utilized.

Figure 23:
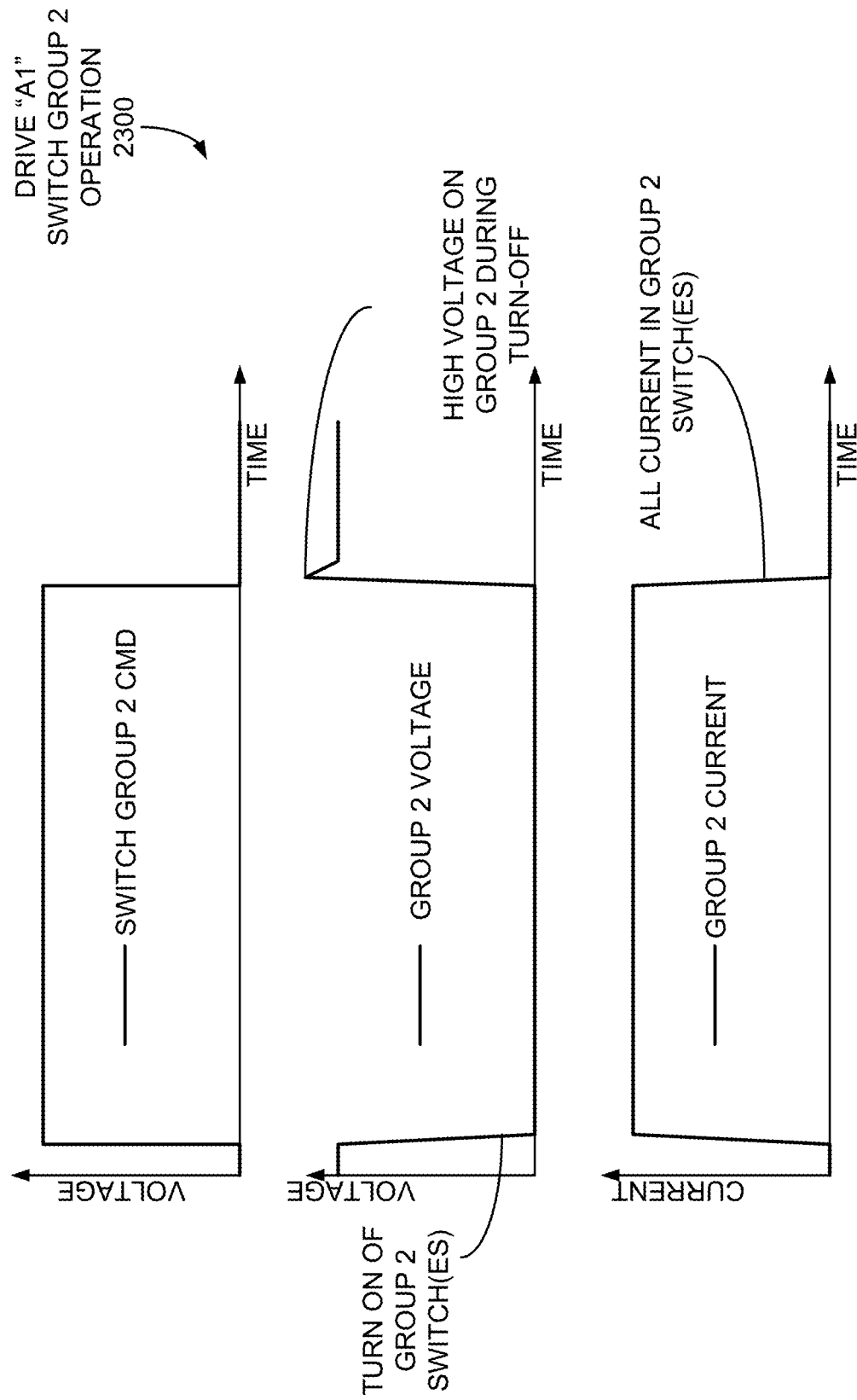
FIGS. 23 through 28 are example timing diagrams of switch group operations for selected ones of the inverter operating states of FIG. 16.
Figure 24:
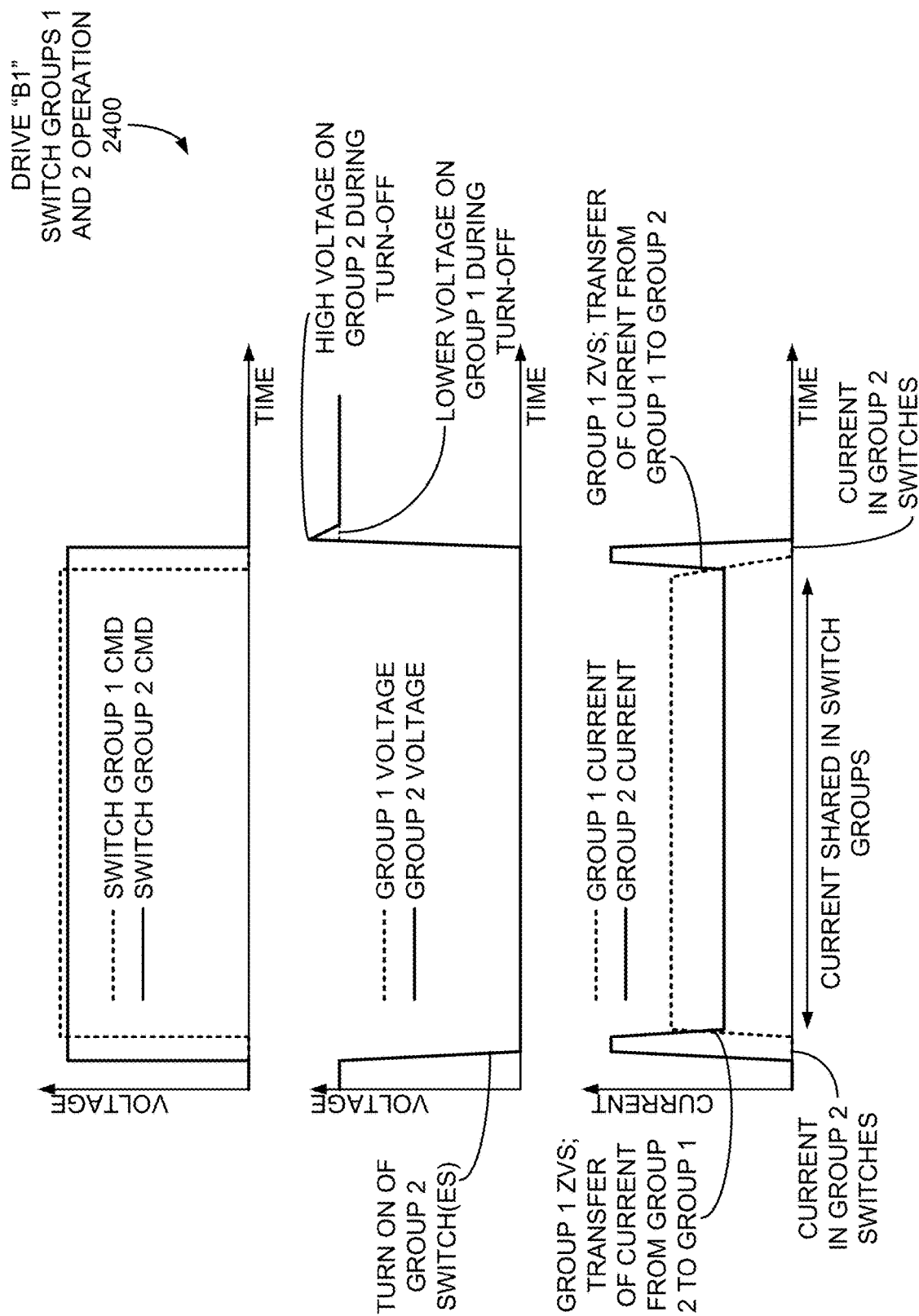
Figure 25:
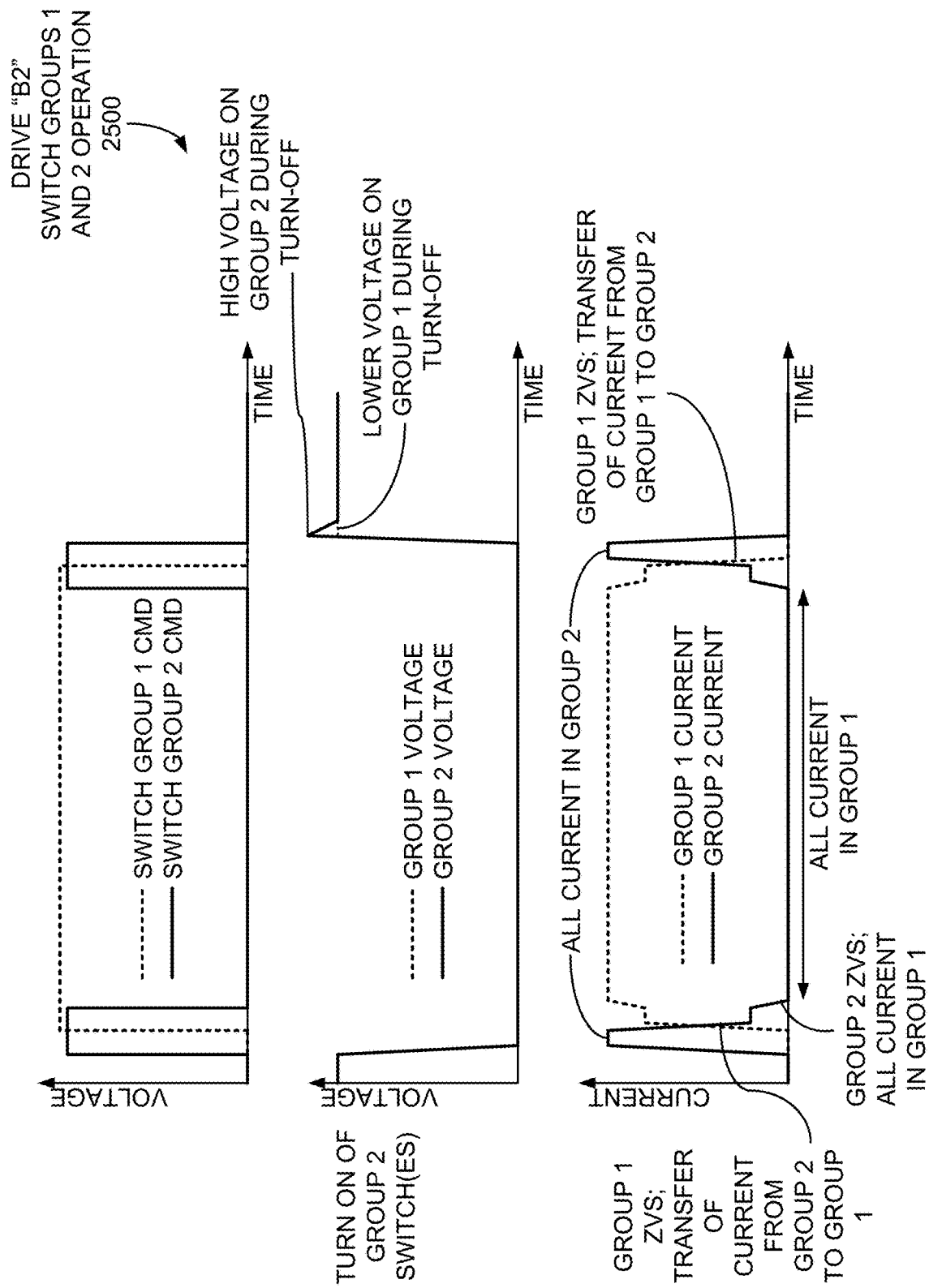
Figure 26:
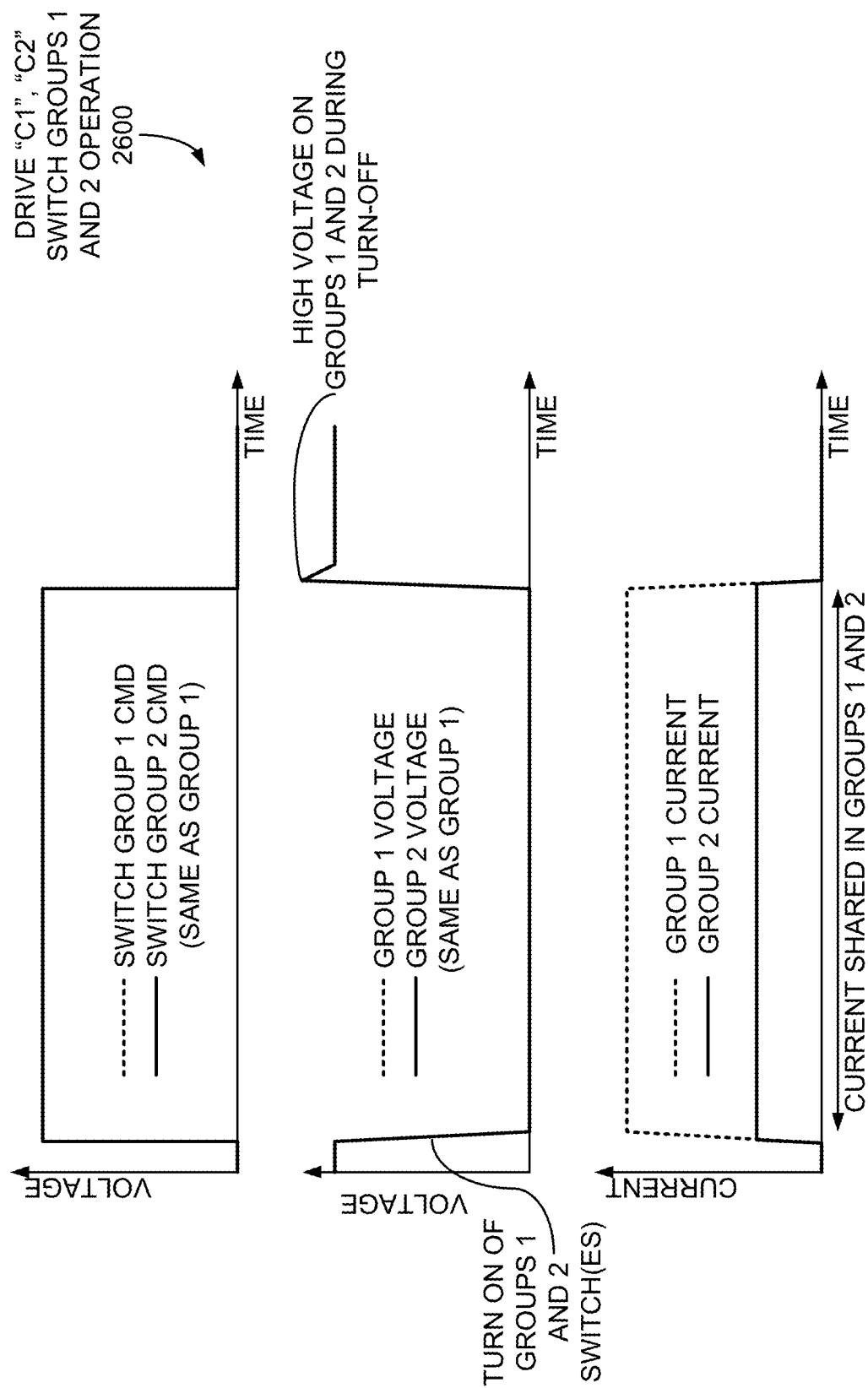
Figure 27:
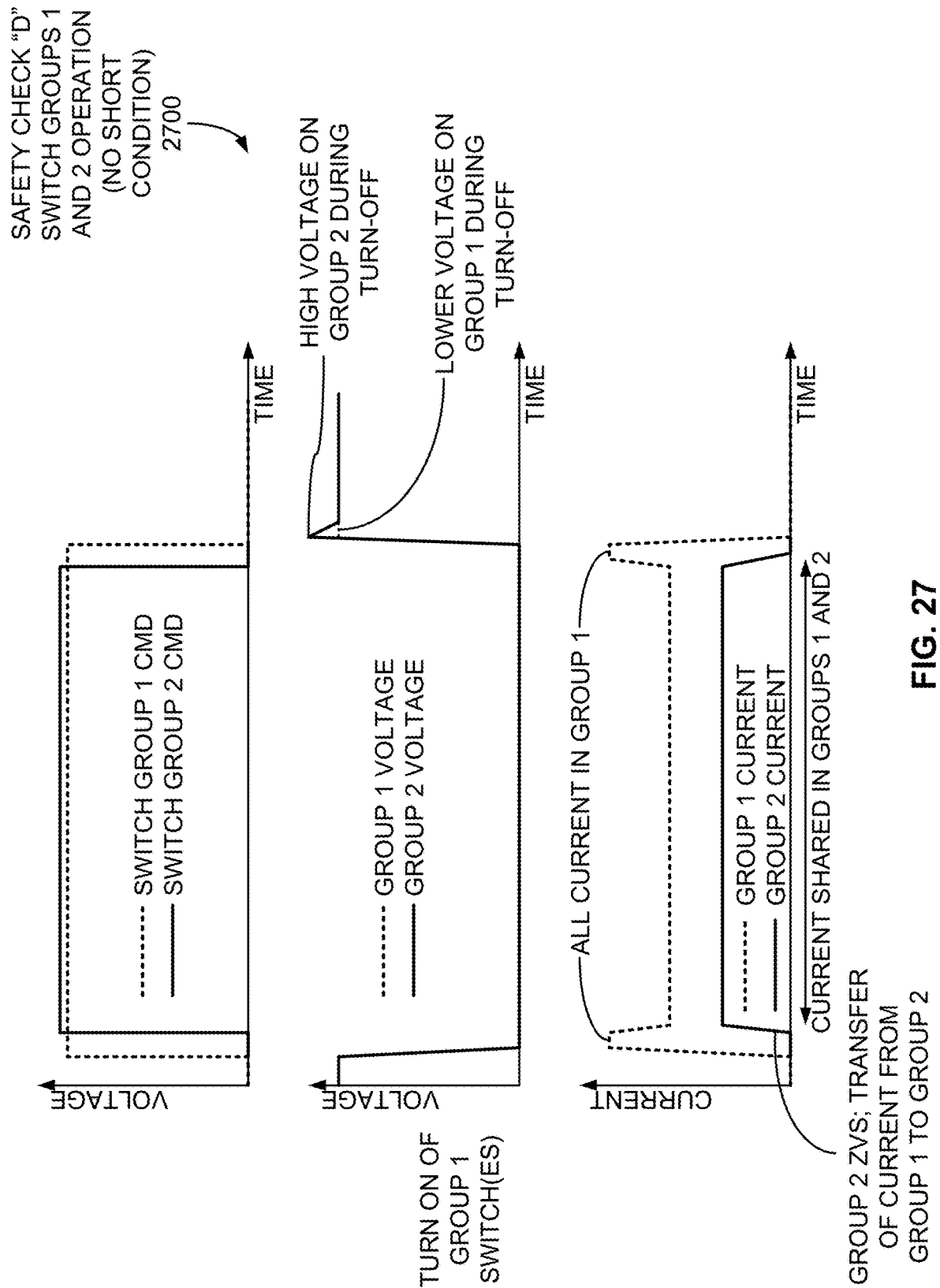
Figure 28:
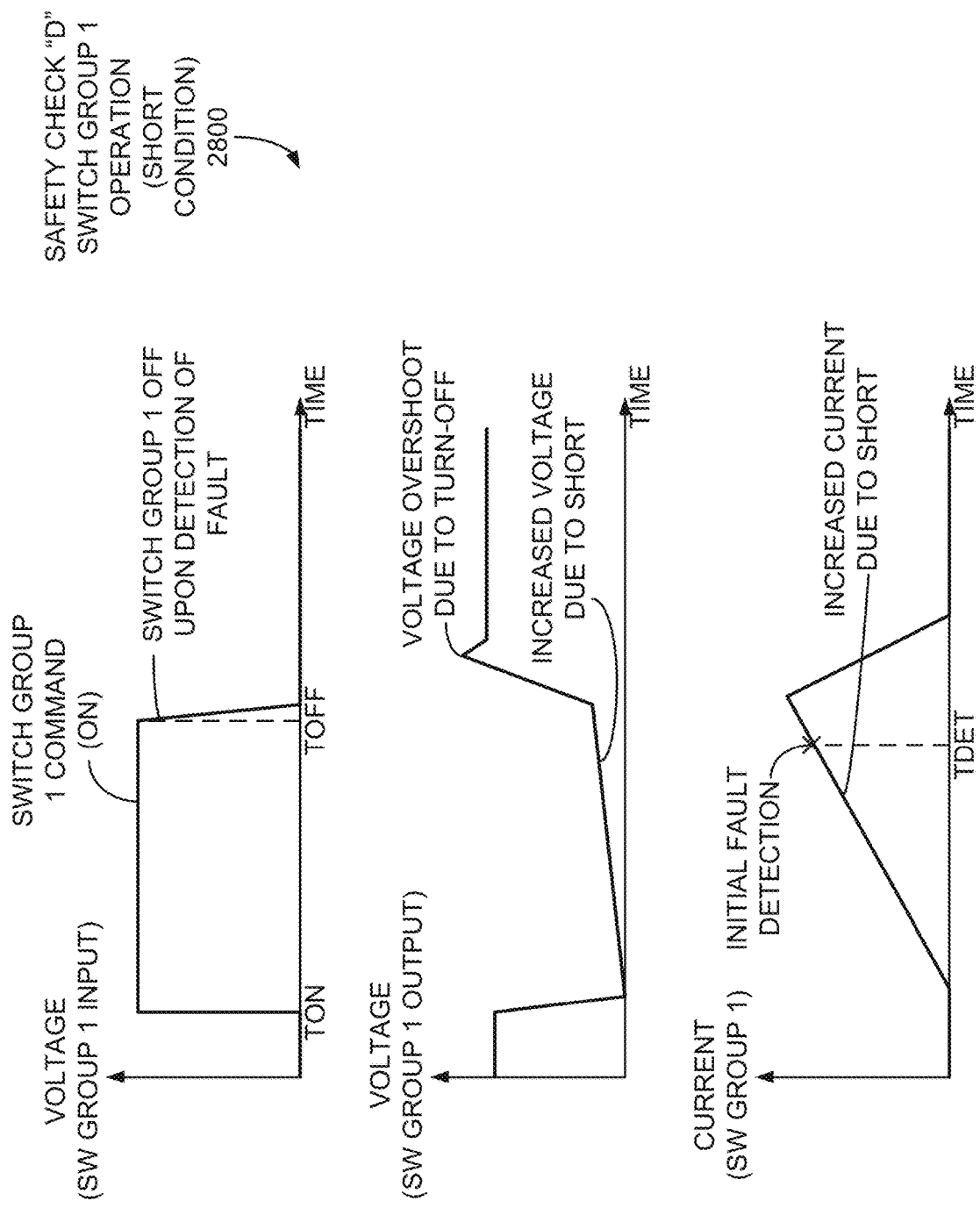

FIGS. 23 through 28 are example timing diagrams of switch group 201 and 202 operations for selected ones of the inverter operating states 1104 of FIG. 16. More specifically, FIG. 23 depicts DRIVE "A1" sub-state operation 2300, FIG. 24 illustrates DRIVE "B1" sub-state operation 2400, FIG. 25 describes DRIVE "B2" sub-state operation 2500, FIG. 26 depicts DRIVE "C1" and "C2" sub-state operation 2600, FIG. 27 illustrates SAFETY CHECK "D" operations 2700 when a short fault condition is not encountered, and FIG. 28 shows SAFETY CHECK "D" operations 2700 when a short fault condition is encountered. FIGS. 23-28 present just one set of examples regarding the operation or activation of switches 211 and 212 within the two switch groups 201 and 202 for various inverter operating states 1104, and many other examples are possible. In each of the FIGS. 23 through 28, while the timing for a single switch cycle is shown, multiple such switch cycles may be performed while in each corresponding inverter.

As shown in FIG. 23, during the DRIVE "A1" sub-state 1702, the larger switches 211 of the first switch group 201 are not activated. Instead, only the smaller switches 212 of the second switch group 202 are switched on and off via a control signal (e.g., a gate drive signal), as shown in the upper timing diagram of FIG. 23. The closing or turning on of the switches 212 of the second switch group 202 results in a voltage across the second switch group 202 dropping to substantially zero, and the current through the switches 212 of the switch group 202 increasing to drive the load at the output of the associated switch position 102 within which the second switch group 202 is located. Accordingly, when the gates of the switches 212 of the second switch group 202 are shut off, the current through the switches 212 drops to substantially zero while the voltage across the switched increases. In some examples, high back EMF resulting from shutting off current to an inductive load (e.g., a motor) at the output of the switch position 102 may resulting in a voltage spike across the second switch group 202 prior to returning to a normal voltage level.

In FIG. 24, during DRIVE "B1" sub-state operation 2400, the switches 211 and 212 of both switch groups 201 and 202 are switched on to increase the total amount of current to be delivered through the switch position 102. In this particular example, the switches 212 of the second switch group 202 may be activated or turned on just prior to the switches 211 of the first switch group 201 being turned on, and may be turned off just after the switches 211 of the first switch group 201 are turned off. Further, the turning on and off of the switches 211 of the first switch group 201 may be timed for ZVS to minimize power loss and to facilitate a smooth transition in a portion of the current being carried from the switches 212 of the second switch group 202 to the switches 211 of the first switch group 201. The turning off of the switch groups 201 and 202 in this order may also reduce or eliminate a back EMF voltage spike appearing across the switches 211 of the first switch group 201 in some examples.

The DRIVE "B2" sub-state operations 2500 of FIG. 25 also employ both the first switch group 201 and the second switch group 202 to provide additional current. In this example, however, the switches 212 of the second switch group 202 may be turned on and off to "surround" each of the on and off actions of the switches 211 of the first switch group 201. This timing strategy may also result in the switches 211 of the first switch group 201 being timed for ZVS to minimize power loss and to facilitate a smooth transition in substantially all of the current being carried from the switches 212 of the second switch group 202 to the switches 211 of the first switch group 201, and vice-versa. The turning off of the switch groups 201 and 202 in this manner may also reduce or eliminate a back EMF voltage spike appearing across the switches 211 of the first switch group 201 in some embodiments.

In FIG. 26, the DRIVE "C1" and DRIVE "C2" sub-state operation 2600 involves repeatedly turning on and off the switches 211 and 212 of the first switch group 201 and the second switch group 202 substantially simultaneously, resulting in a potentially large current being provided via the output phase associated with the switch position 201 in which the switch groups 201 and 202 are located to maximize drive capability of an attached motor. Further, the majority of such current may be carried by the larger switches 211 of the first switch group 201. In exchange for this specific switch timing, a high back EMF voltage may appear across the switches 211 and 212 of both switch groups 201 and 202 when the switches 211 and 212 are turned off.

As shown in FIG. 27, during the SAFETY CHECK "D" operations 2700, which are employed to determine if a short fault condition at the output of the switch position 102 exists, the switches 211 of the first switch group 201 are turned on just prior to the switches 212 of the second switch group 202. If a short fault condition at the output of the switch position 102 is not encountered, the switches 211 of the first switch group 201 are turned off just after the switches 212 of the second switch group to, which is the opposite order prescribed in the DRIVE "B1" switch group operations 2400 of FIG. 24. Such timing may protect the smaller switches 212 of the second switch group 202 in case a short is detected. Presuming a short fault is not detected in response to the switches 211 of the first switch group 201 being turned on, current through the switch position 102 is ultimately shared between the first switch group 201 and the second switch group 202 according to the relative size of the switches 211 and 212 therein when the switches 211 and 212 are on. Moreover, the switches 212 of the second switch group 201 may be operated under ZVS for minimal power loss. Also, the turning off of the switches 211 of the first switch group 201 may result in a high back EMF voltage overshoot not appearing across those switches 211, whereas the switches 212 of the second switch group 202, being the last to be turned off, may experience at least some high back EMF voltage.

If, instead, use of the SAFETY CHECK "D" state 1604 results in a short fault being detected at the output phase of the switch position 102, such as by way of the desaturation detection circuit 800 of FIG. 8, the fault condition may be detected shortly after the switches 211 of the first switch group 201 are turned on, and before the switches 212 of the second switch group 202 are turned on, thus protecting the smaller, faster switches 212. Turning to FIG. 28, the timing diagrams presented therein are expanded along the time axis relative to the diagrams of FIG. 27 to provide greater detail regarding signal timing. Shortly after the activating of the switches 211 of the first switch group 201 at TON, the voltage across the switches 211, as well as the current through the switches 211, may increase due to a short circuit at the output of the switch position 102. When the short fault is detected at TDET, the control circuitry (e.g., the desaturation detection circuit 800) may cause the control circuitry controlling the switches 211 and 212 to turn off the switches 211 of the first switch group 201 at TOFF prior to the point at which the switches 212 of the second switch group 202 were to be turned on, as depicted in FIG. 27. Presumably, the larger switches 211 of the first switch group 201 may be turned off prior to sustaining permanent damage as a result of the short fault condition.

Figure 29:
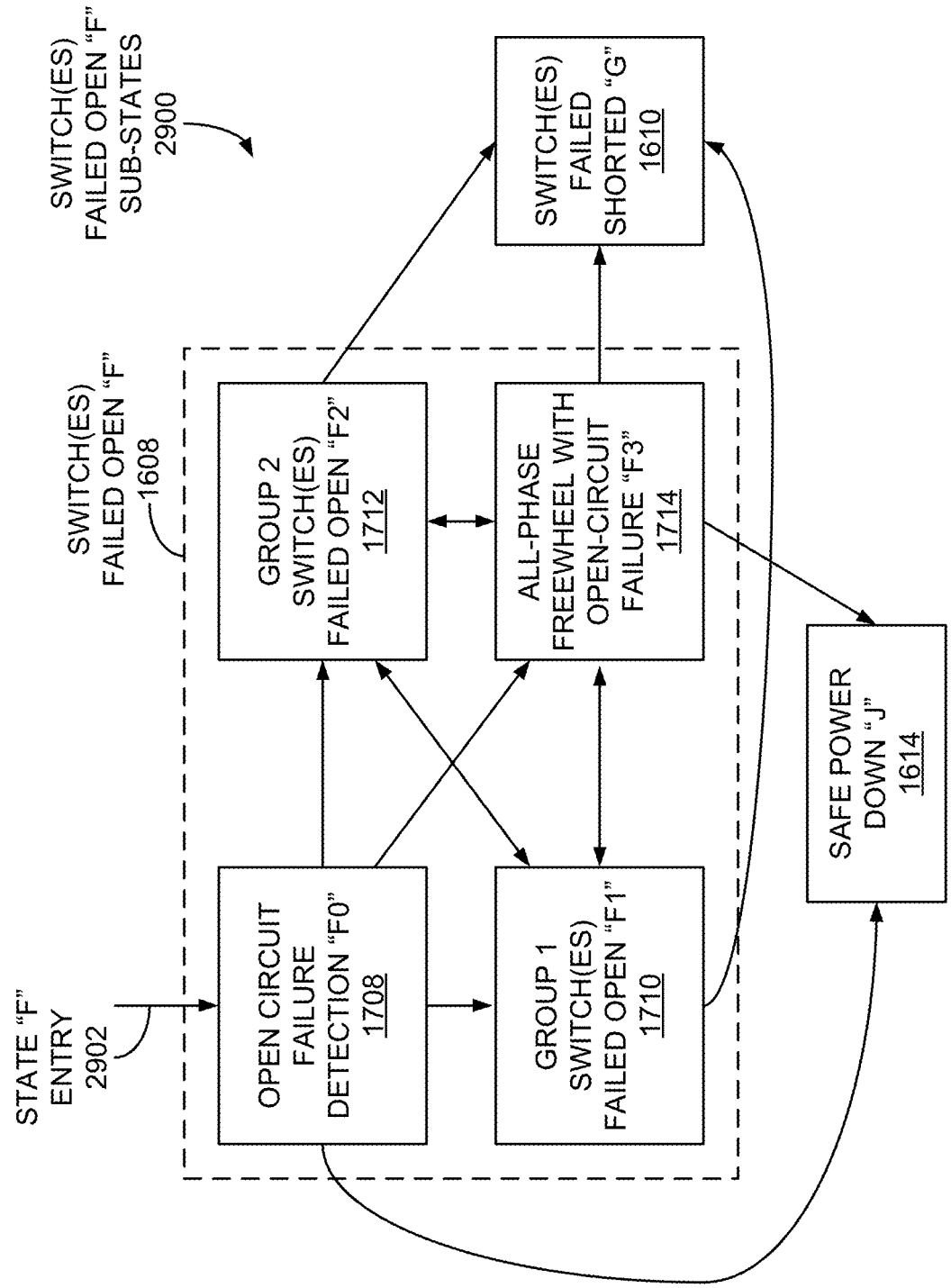
FIG. 29 is a state diagram of example sub-states of a "switches failed open" inverter operating state of FIG. 16.

FIG. 29 is a state diagram 2900 of the example sub-states 1708-1714 of the SWITCH(ES) FAILED OPEN "F" state 1608 of FIG. 16, as described above. In the state diagram 2900, the OPEN CIRCUIT FAILURE DETECTION "F0" sub-state 1708 serves as the SWITCH(ES) FAILED OPEN "F" state entry point 2902. After entry into the OPEN CIRCUIT FAILURE DETECTION "F0" sub-state 1708, a transition may be made to any of the remaining sub-states 1710, 1712, and 1714, or to the SAFE POWER DOWN "J" state 1614. Subsequent transitions may occur from each of the sub-states to another of the same sub-states 1710, 1712, and 1714, to the SAFE POWER DOWN "J" state 1614, or to the SWITCH(ES) FAILED SHORTED "G" 1610. Examples of such transitions are described above in conjunction with the inverter state table 1700. The state diagram 2900 may provide other sub-states and/or different transitions between sub-states in other embodiments.

Figure 30:
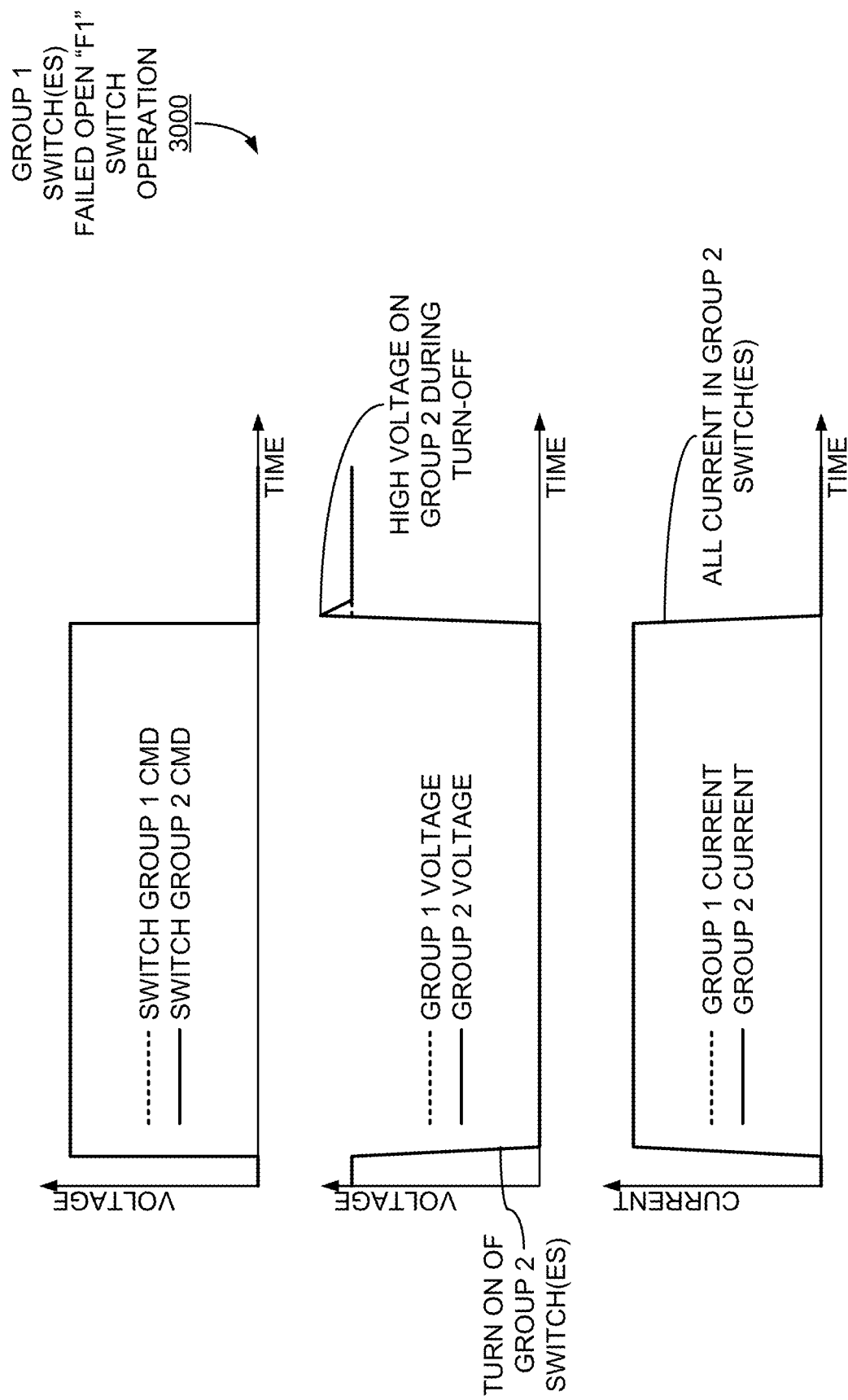
FIGS. 30 and 31 are each timing diagrams of example switch group operations of one sub-state of the "switches failed open" inverter operating state of FIG. 16.
Figure 31:
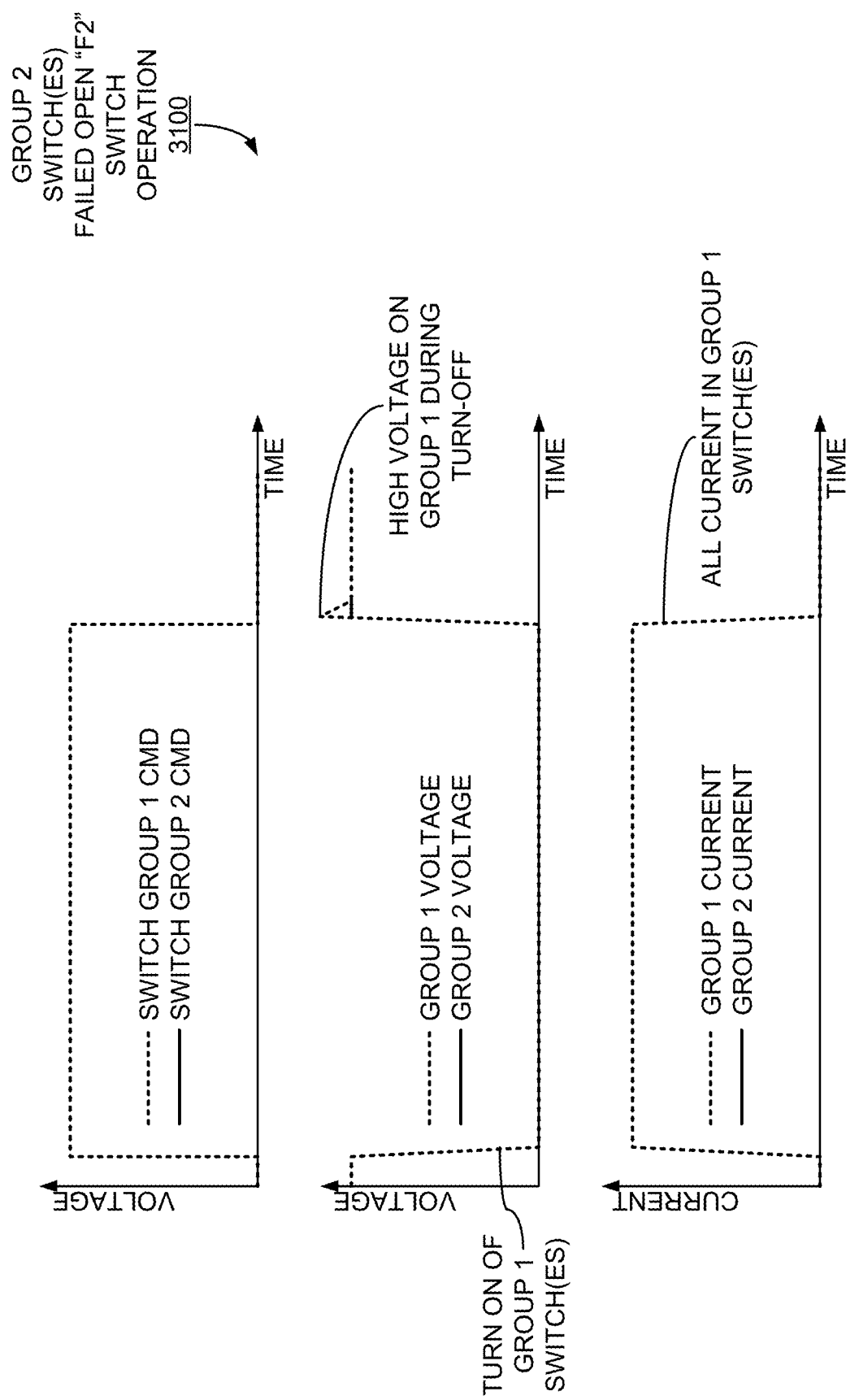

FIGS. 30 and 31 are each timing diagrams of example switch group operations of one sub-state of the SWITCH (ES) FAILED OPEN "F" state 1608 of FIG. 16. More specifically, FIG. 30 provides timing diagrams for operation 3000 during the GROUP 1 SWITCH(ES) FAILED OPEN "F1" sub-state 1710, while FIG. 31 presents timing diagrams for operation 3100 during the GROUP 2 SWITCH(ES) FAILED OPEN "F2" sub-state 1712, as discussed earlier. In each example, the switches 211 or 212 of the switch group 201 or 202 which has been determined to have failed in the open state are not commanded to be turned on or off. Instead, the switches 211 or 212 of the switch group 201 or 202 that are not defective are turned on and off to generate the necessary current at the output of the corresponding switch position 102. As discussed previously, the turning off of the switches 211 or 212 may result in a high back EMF overvoltage across the associated switch group 201 or 202 in some examples.

Figure 32:
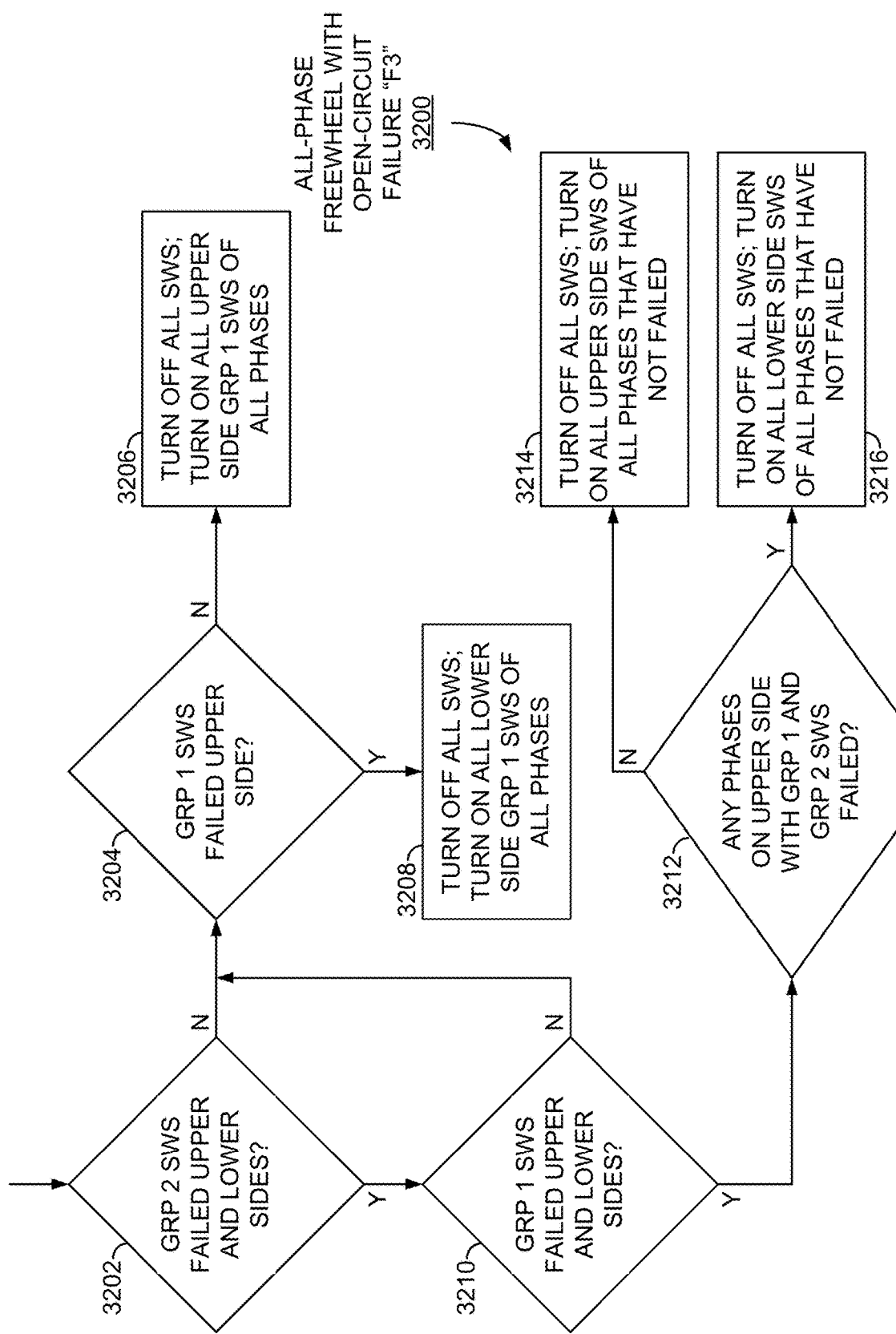
FIG. 32 is a flow diagram of example switch group operations of another sub-state of the "switches failed open" inverter operating state of FIG. 16.

FIG. 32 is a flow diagram of example switch group operations 3200 of the ALL-PHASE FREEWHEEL WITH OPEN-CIRCUIT FAILURE "F3" sub-state 1714 of FIG. 16. Generally, the operation 3200 determines the open fault condition of switches 211 and 212 of switch groups 201 and 202 relative to the "upper" or "lower" location of the switch position 102 corresponding to a phase output. For example, in the embodiment of FIG. 1A, switch position 102A is on the upper side, and switch position 102B is on the lower side, of the AC output connection AC+, while switch position 102C is on the upper side, and switch position 102D is on the lower side, of the AC output connection AC−. Similarly, in FIG. 1B, switch position 102A is on the upper side, and switch position 102B is on the lower side, of AC PHASE U; switch position 102C is on the upper side, and switch position 102D is on the lower side, of AC PHASE V; and switch position 102E is on the upper side, and switch position 102F is on the lower side, of AC PHASE W.

According to the operations 3200, if switches 212 of the second switch group 202 have not failed in switch positions 102 on both the upper and lower sides of a phase output (operation 3202), or if switches 211 of the first switch group 201 have not failed in switch positions 102 on both the upper and lower sides of a phase output (operation 3210), then if none of the switches 211 of the first switch group 201 of any upper-side switch position 102 have failed (operation 3204), then all switches 211 and 212 may be turned off, followed by turning on all switches 211 of the first switch group 201 of all upper-side switch positions 102 of all phases (operation 3206). If, instead, at least one of the switches 211 of the first switch group 201 of any upper-side switch position 102 has failed (operation 3204), then all switches 211 and 212 may be turned off, followed by turning on switches 211 of the first switch group 201 of all lower-side switch positions 201 of all phases (operation 3208)

If, instead, switches 212 of the second switch group 202 have failed in switch positions 102 on both the upper and lower sides of a phase output (operation 3202), and if switches 211 of the first switch group 201 have failed in switch positions 102 on both the upper and lower sides of a phase output (operation 3210), then if any upper-side switch position 102 of any phase includes failed switches 211 and 212 in both the first switch group 201 and the second switch group 202 (operation 3212), then all switches 211 and 212 may be turned off, followed by turning on all switches 211 and 212 of both switch groups 201 and 202 of lower-side switch positions 102 of all phases that do not correspond with a failed switch 211 or 212 (operation 3216). Otherwise, if no upper-side switch position 102 of any phase includes failed switches 211 and 212 in both the first switch group 201 and the second switch group 202 (operation 3212), then all switches 211 and 212 may be turned off, followed by turning on all switches 211 and 212 of both switch groups 201 and 202 of upper-side switch positions 102 of all phases that do not correspond with a failed switch 211 or 212 (operation 3214).

Figure 33:
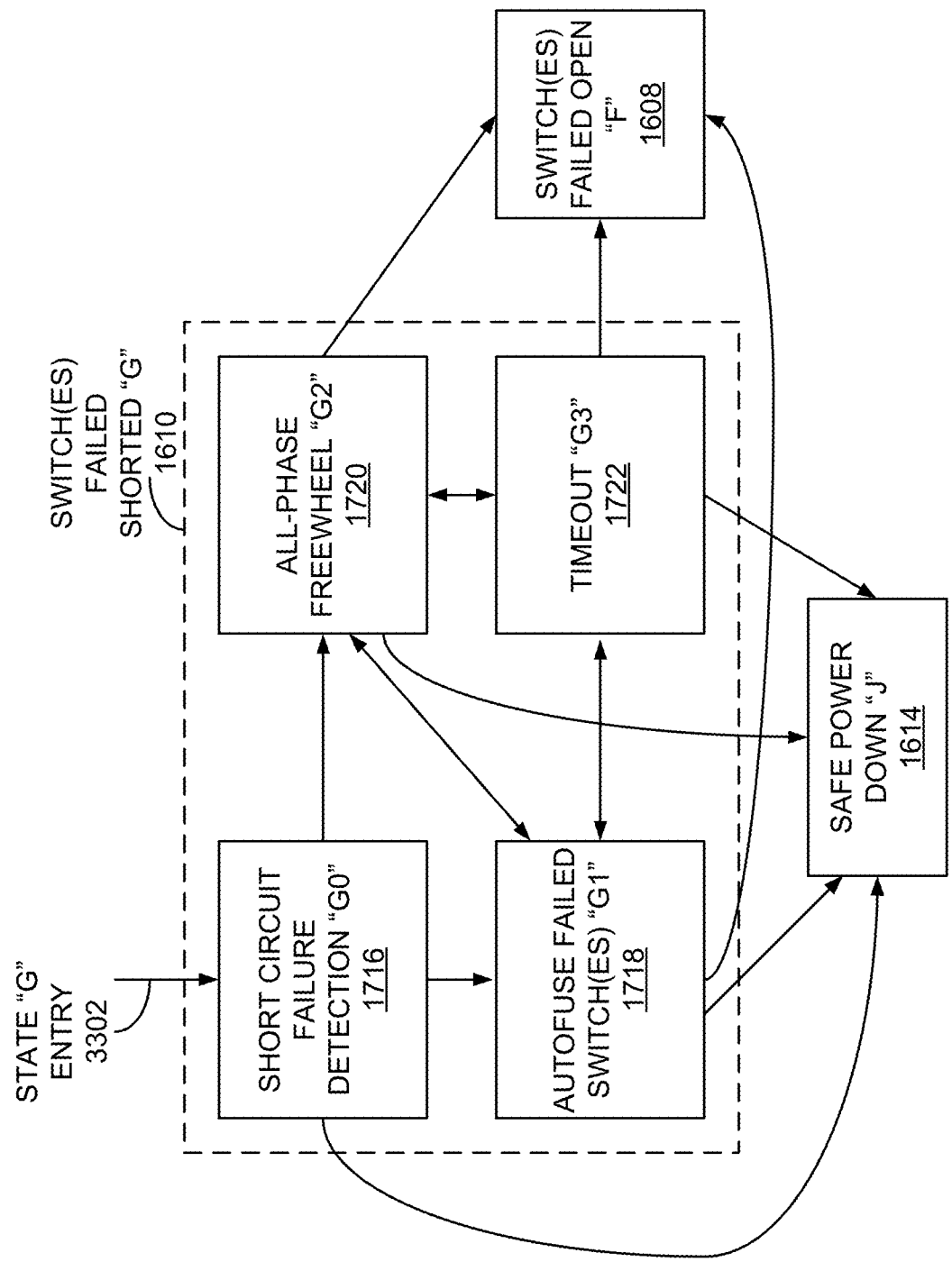
FIG. 33 is a state diagram of example sub-states of a "switches failed shorted" inverter operating state of FIG. 16.

FIG. 33 is a state diagram of example sub-states 1716, 1718, 1720, and 1722 of the SWITCH(ES) FAILED SHORTED "G" state 1610 of FIG. 16, as described above. In this example, the SHORT CIRCUIT FAILURE DETECTION "G0" sub-state 1716 represents the initial entry point 3302 of the SWITCH(ES) FAILED SHORTED "G" state 1610. After entry into the SHORT CIRCUIT FAILURE DETECTION "G0" sub-state 1716, a transition may be made to the AUTOFUSE FAILED SWITCH(ES) "G1" sub-state 1718, the ALL-PHASE FREEWHEEL "G2" sub-state 1720, or the SAFE POWER DOWN "J" state 1614. Subsequent transitions may occur from each of the sub-states 1718 and 1720 to another of the same sub-states 1718 and 1720, to the TIMEOUT "G3" sub-state 1722, to the SAFE POWER DOWN "J" state 1614, or to the SWITCH (ES) FAILED OPEN "F" 1608. Examples of such transitions are described above in conjunction with the inverter state table 1700. The state diagram 3300 may provide other sub-states and/or different transitions between sub-states in other embodiments.

Figure 34:
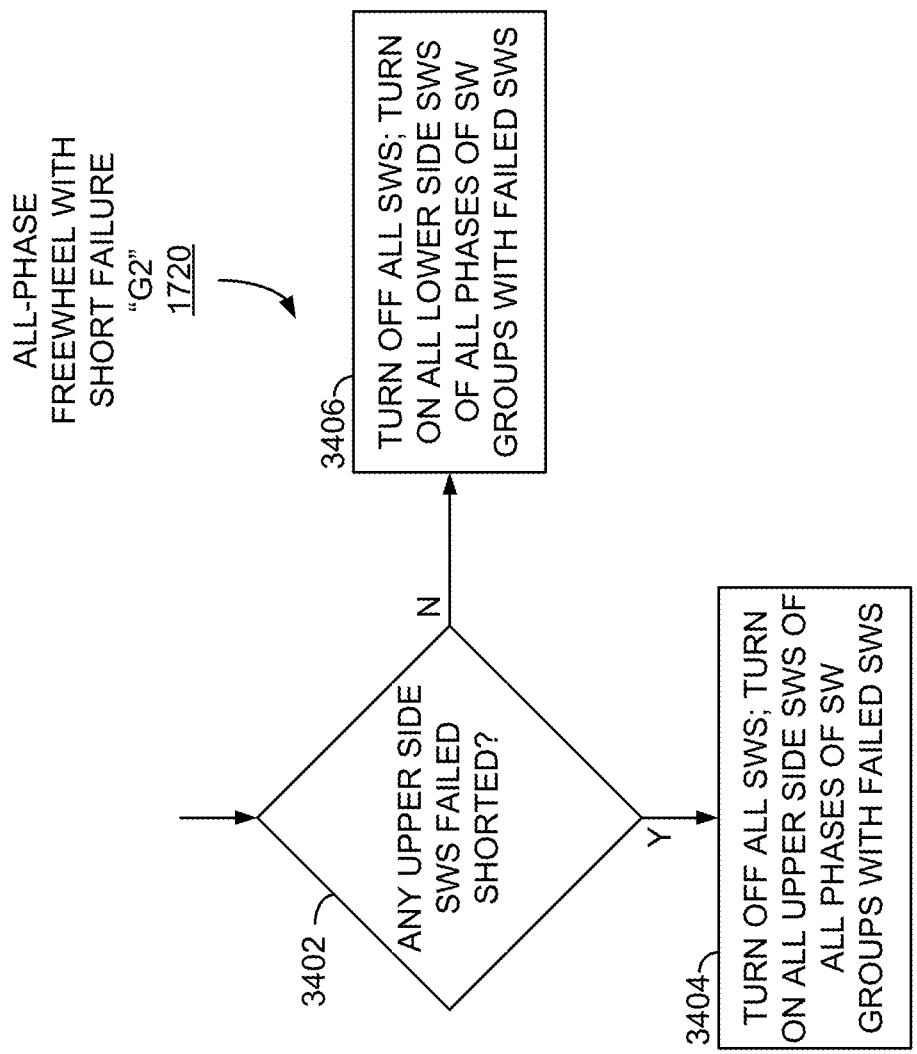
FIG. 34 is a flow diagram of example switch group operations of a sub-state of the "switches failed shorted" inverter operating state of FIG. 16.

FIG. 34 is a flow diagram of example switch group operations of the ALL-PHASE FREEWHEEL "G2" sub-state 1720 SWITCH(ES) FAILED SHORTED "G" state 1610 of FIG. 16. In this embodiment, if any switches 211 or 212 of any switch group 201 or 202 of any upper-side switch position 102 have failed shorted (operation 3402), then all switches 211 and 212 may be turned off, followed by turning on all switches 211 and 212 of all switch groups 201 and 202 of all upper-side switch positions 102 having switches 211 or 212 that failed shorted (operation 3404). Otherwise, if no switches 211 or 212 of any switch group 201 or 202 of any upper-side switch position 102 have failed shorted (operation 3402), then all switches 211 and 212 may be turned off, followed by turning on all switches 211 and 212 of all switch groups 201 and 202 of all lower-side switch positions 102 having switches 211 or 212 that failed shorted (operation 3406).

Figure 35:
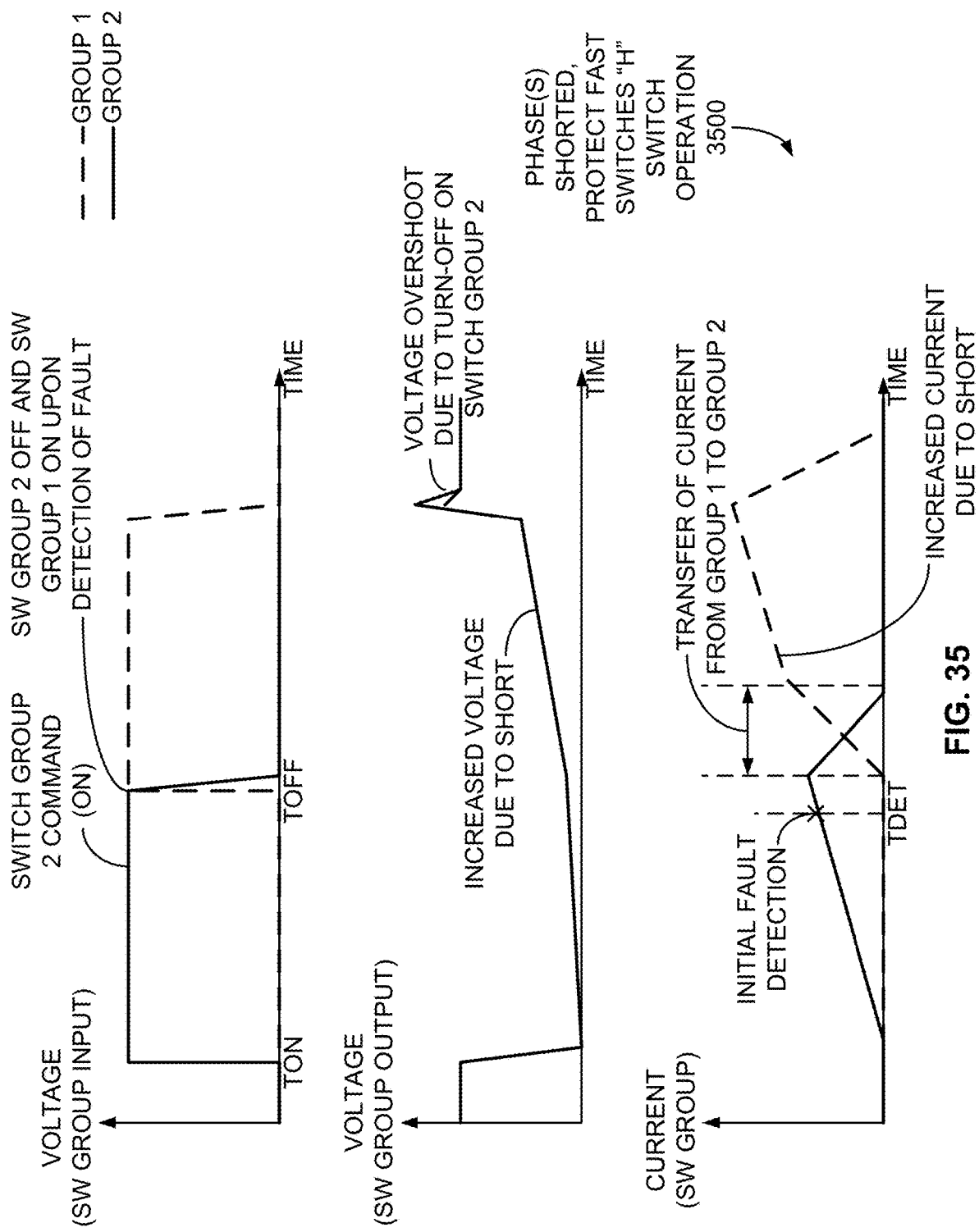
FIG. 35 is a timing diagram of switch group operations of a "protect fast switches" inverter operating state of FIG. 16.

FIG. 35 is a timing diagram of example switch group operations of the PHASE(S) SHORTED, PROTECT FAST SWITCHES "H" state 1612 of FIG. 16. As indicated above in FIG. 17P, the PHASE(S) SHORTED, PROTECT FAST SWITCHES "H" state 1612 may be used to respond to an indication of a short-circuit condition at one or more output phases of the inverter 100, such as an indication by the desaturation detection signal 810 of FIG. 8 that a desaturation condition exists. Presuming the faster switches 212 of the second switch group 202 were turned on at TON prior to the detection of a short-circuit condition at TDET, as indicated in FIG. 35, the slower switches 211 of the first switch group 201 associated with the problematic output phase may be commanded on, and the faster switches 212 of the second switch group 202 may be turned off, at TOFF, thus transferring the resulting current to the slower, more robust switches 211 of the first switch group 201. The slower rise time of the switches 211 may allow the control logic circuitry 420, control drive circuits 401 and 402, and/or the like to verify or confirm the validity of the sensed short-circuit failure using the switches 211 after TOFF while allowing the detection threshold for the faster switches 212 of the second switch group 202 to be sensitive, thus better protecting the faster switches 212 without sacrificing a robust detection of a shorted output phase.

Figure 36:
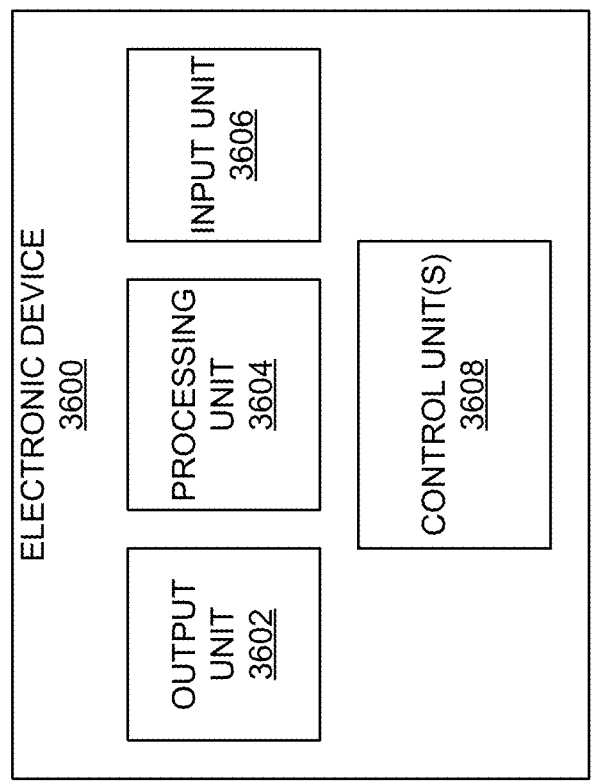
FIG. 36 is a functional block diagram of an electronic device including operational units arranged to perform various operations of the presently disclosed technology.

Turning to FIG. 36, an electronic device 3600 including operational units 3602-3608 arranged to perform various operations of the presently disclosed technology is shown. The operational units 3602-3608 of the device 3600 may be implemented by hardware or a combination of hardware and software to carry out the principles of the present disclosure. It will be understood by persons of skill in the art that the operational units 3602-3608 described in FIG. 36 may be combined or separated into sub-blocks to implement the principles of the present disclosure. Therefore, the description herein supports any possible combination or separation or further definition of the operational units 3602-3608. Moreover, multiple electronic devices 3600 may be employed in various embodiments.

In one implementation, the electronic device 3600 includes an output unit 3602 configured to provide information, including possibly display information, such as by way of a graphical user interface, and a processing unit 3604 in communication with the output unit 3602 and an input unit 3606 configured to receive data from one or more input devices or systems. Various operations described herein may be implemented by the processing unit 3604 using data received by the input unit 3606 to output information using the output unit 3602.

Additionally, in one implementation, the electronic device 3600 includes one or more control units 3608 implementing the operations 302-304 of FIG. 3, as well as other operations described herein. Accordingly, the control units 3608 may include or perform the operations associated with the control logic circuit 420 of FIG. 4, the control processor 520 of FIGS. 5A and 5B, and/or the control drive logic circuit 530 of FIG. 5B, as well as other control circuits, algorithms, of functions described herein.

Figure 37:
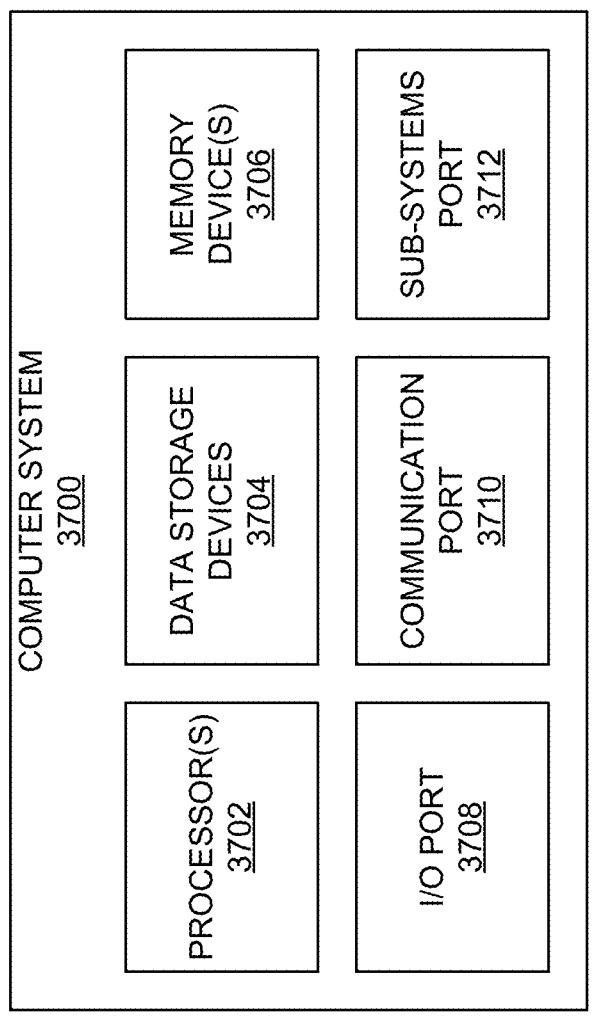
FIG. 37 is an example computing system that may implement various systems and methods of the presently disclosed technology.

Referring to FIG. 37, a detailed description of an example computing system 3700 having one or more computing units that may implement various systems and methods discussed herein is provided. The computing system 3700 may be applicable to, for example, the control processor 520 of FIGS. 5A and 5B, and/or similar systems described herein, as well as various control circuits, controllers, processors, and the like described in connection thereto. It will be appreciated that specific implementations of these devices may be of differing possible specific computing architectures, not all of which are specifically discussed herein but will be understood by those of ordinary skill in the art.

The computer system 3700 may be a computing system is capable of executing a computer program product to execute a computer process. Data and program files may be input to the computer system 3700, which reads the files and executes the programs therein. Some of the elements of the computer system 3700 are shown in FIG. 37, including one or more hardware processors 3702, one or more data storage devices 3704, one or more memory devices 3706, and/or one or more ports 3708-3712. Additionally, other elements that will be recognized by those skilled in the art may be included in the computing system 3700 but are not explicitly depicted in FIG. 37 or discussed further herein. Various elements of the computer system 3700 may communicate with one another by way of one or more communication buses, point-to-point communication paths, or other communication means not explicitly depicted in FIG. 37.

The processor 3702 may include, for example, a central processing unit (CPU), a microprocessor, a microcontroller, a digital signal processor (DSP), and/or one or more internal levels of cache. There may be one or more processors 3702, such that the processor 3702 comprises a single central-processing unit, or a plurality of processing units capable of executing instructions and performing operations in parallel with each other, commonly referred to as a parallel processing environment.

The computer system 3700 may be a conventional computer, a distributed computer, or any other type of computer, such as one or more external computers made available via a cloud computing architecture. The presently described technology is optionally implemented in software stored on the data stored device(s) 3704, stored on the memory device(s) 3706, and/or communicated via one or more of the ports 3708-3712, thereby transforming the computer system 3700 in FIG. 37 to a special purpose machine for implementing the operations described herein. Examples of the computer system 3700 include personal computers, terminals, workstations, mobile phones, tablets, laptops, personal computers, multimedia consoles, gaming consoles, set top boxes, embedded computing and processing systems, and the like.

The one or more data storage devices 3704 may include any non-volatile data storage device capable of storing data generated or employed within the computing system 3700, such as computer executable instructions for performing a computer process, which may include instructions of both application programs and an operating system (OS) that manages the various components of the computing system 3700. The data storage devices 3704 may include, without limitation, magnetic disk drives, optical disk drives, solid state drives (SSDs), flash drives, and the like. The data storage devices 3704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 3706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 3704 and/or the memory devices 3706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 3700 includes one or more ports, such as an input/output (I/O) port 3708, a communication port 3710, and a sub-systems port 3712, for communicating with other computing, network, or vehicle devices. It will be appreciated that the ports 3708-3712 may be combined or separate and that more or fewer ports may be included in the computer system 3700.

The I/O port 3708 may be connected to an I/O device, or other device, by which information is input to or output from the computing system 3700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 3700 via the I/O port 3708. Similarly, the output devices may convert electrical signals received from computing system 3700 via the I/O port 3708 into signals that may be sensed as output by a human, such as sound, light, and/or touch. The input device may be an alphanumeric input device, including alphanumeric and other keys for communicating information and/or command selections to the processor 3702 via the I/O port 3708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 3700 via the I/O port 3708. For example, an electrical signal generated within the computing system 3700 may be converted to another type of signal, and/or vice-versa. In one implementation, the environment transducer devices sense characteristics or aspects of an environment local to or remote from the computing device 3700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 3700, such as, physical movement of some object (e.g., a mechanical actuator), heating or cooling of a substance, adding a chemical substance, and/or the like.

In one implementation, a communication port 3710 is connected to a network by way of which the computer system 3700 may receive network data useful in executing the methods and systems set out herein as well as transmitting information and network configuration changes determined thereby. Stated differently, the communication port 3710 connects the computer system 3700 to one or more communication interface devices configured to transmit and/or receive information between the computing system 3700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 3710 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 3710 may communicate with an antenna for electromagnetic signal transmission and/or reception. In some examples, an antenna may be employed to receive Global Positioning System (GPS) data to facilitate determination of a location of a machine, vehicle, or another device.

The computer system 3700 may include a sub-systems port 3712 for communicating with one or more systems related to a vehicle to control an operation of the vehicle and/or exchange information between the computer system 3700 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, inverter and/or motor information and software and other modules and services may be embodied by instructions stored on the data storage devices 3704 and/or the memory devices 3706 and executed by the processor 3702. The computer system 3700 may be integrated with or otherwise form part of a vehicle. In some instances, the computer system 3700 is a portable device that may be in communication and working in conjunction with various systems or sub-systems of a vehicle.

The present disclosure recognizes that the use of such information may be used to the benefit of users. For example, inverter or motor power and/or fault information of a vehicle may be employed to provide acceleration and/or braking information. Accordingly, use of such information enables calculated control of an autonomous vehicle. Further, other uses for information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 37 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the disclosure is not so limited. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
  a voltage-source converter comprising a plurality of switch positions, at least one of the plurality of switch positions including a first switch of a first switch type and a second switch of a second switch type different from the first switch type, the first switch being coupled in parallel to the second switch, the plurality of switch positions collectively coupled to convert an input to an output;
  the voltage-source converter further comprising a switch control circuit to generate, for each of the at least one of the plurality of switch positions, a first control signal to operate the first switch of the switch position, and a second control signal to operate the second switch of the switch position, the second control signal being different from the first control signal,
  wherein the first control signal is driven to a first voltage level when the first switch is switched on and the second control voltage level is driven to a second level when the second switch is switched on and wherein the first voltage level is different from the second voltage level.

2. The apparatus of claim 1, the plurality of switch positions comprising: a first switch position coupling a first DC voltage of the input to a first AC connection of the output;
   a second switch position coupling a second DC voltage of the input to the first AC connection, the second DC voltage being different from the first DC voltage;
   a third switch position coupling the first DC voltage to a second AC connection of the output; and
   a fourth switch position coupling the second DC voltage to the second AC connection.

3. The apparatus of claim 2, the switch control circuit to operate the plurality of switch positions to generate a single-phase AC voltage across the first AC connection and the second AC connection.

4. The apparatus of claim 2, the plurality of switch positions further comprising:
   a fifth switch position coupling the first DC voltage to a third AC connection of the output; and
   a sixth switch position coupling the second DC voltage to the third AC connection.

5. The apparatus of claim 4, the switch control circuit to operate the plurality of switch positions to generate a three-phase AC voltage comprising a first AC phase at the first AC connection, a second AC phase at the second AC connection, and a third AC phase at the third AC connection.

6. The apparatus of claim 1, at least one of the at least one of the plurality of switch positions comprising a third switch of the first switch type coupled in parallel to the first switch, the third switch to be operated by the first control signal.

7. The apparatus of claim 1, at least one of the at least one of the plurality of switch positions comprising a third switch of the first switch type coupled in series with the first switch, the third switch to be operated by the first control signal.

8. The apparatus of claim 1, the switch control circuit comprising a first control drive circuit to generate the first control signal and a second control drive circuit to generate the second control signal, the apparatus further comprising a power supply to provide a supply voltage to the first control drive circuit and the second control drive circuit.

9. The apparatus of claim 1, the switch control circuit comprising a first control drive circuit to generate the first control signal and a second control drive circuit to generate the second control signal, the apparatus further comprising a first power supply to provide a first supply voltage to the first control drive circuit and a second power supply to provide a second supply voltage, different from the first supply voltage, to the second control drive circuit.

10. The apparatus of claim 1, the second switch type having at least one of a faster rated switching time or a lesser rated current carrying capacity than the first switch type.

11. The apparatus of claim 10, the switch control circuit to control timing of the first control signal and the second control signal based on a magnitude of a power delivered via the output.

12. The apparatus of claim 10, the switch control circuit to operate the second switch while maintaining the first switch in an open state to drive the output at a first magnitude of the power, and the switch control circuit to operate the first switch and the second switch substantially simultaneously to drive the output at a second magnitude of the power greater than the first magnitude.

13. The apparatus of claim 12, the switch control circuit to close the first switch after the second switch, and to open the first switch before the second switch, during each of a plurality of switch cycles to drive the output at a third magnitude of the power greater than the first magnitude and less than the second magnitude.

14. The apparatus of claim 13, the switch control circuit to operate the first switch via the first control signal using zero voltage switching while driving the output at the third magnitude of the power.

15. The apparatus of claim 12, the switch control circuit to close the second switch before closing the first switch, to open the second switch after closing the first switch, to close the second switch before opening the first switch, and to open the second switch after opening the first switch, during a plurality of switch cycles to drive the output at a third magnitude of the power greater than the first magnitude and less than the second magnitude.

16. The apparatus of claim 15, the switch control circuit to operate the first switch via the first control signal using zero voltage switching while driving the output at the third magnitude of the power.

17. An apparatus comprising:
   an electric motor; and
   an inverter comprising a plurality of switch positions, at least one of the plurality of switch positions including a first switch of a first switch type and a second switch of a second switch type different from the first switch type, the first switch being coupled in parallel to the second switch, the plurality of switch positions collectively coupled to convert a direct current (DC) input to an alternating current (AC) output to drive the electric motor;
   the inverter further comprising a switch control circuit to generate, for each of the at least one of the plurality of switch positions, a first control signal to operate the first switch of the switch position, and a second control signal to operate the second switch of the switch position, the second control signal being different from the first control signal,
   wherein the first control signal is driven to a first voltage level when the first switch is switched on and the second control voltage level is driven to a second level when the second switch is switched on and wherein the first voltage level is different from the second voltage level.

18. The apparatus of claim 17, the electric motor comprising a traction motor.

19. The apparatus of claim 17, the electric motor comprising a generator motor.

20. A method comprising:
   operating a first switch of each of at least one of a plurality of switch positions of a voltage-source converter according to a first timing, the first switch being of a first switch type; and
   operating a second switch of each of the at least one of the plurality of switch positions according to a second timing different from the first timing, the second switch of the switch position coupled parallel to the first switch of the switch position, the second switch being of a second switch type different from the first switch type;
   wherein the first control signal is driven to a first voltage level when the first switch is switched on and the second control voltage level is driven to a second level when the second switch is switched on and wherein the first voltage level is different from the second voltage level; and
   wherein the operating of the first switch and the operating of the second switch of each of the at least one of the plurality of switch positions, in conjunction with any remaining ones of the plurality of switch positions of the voltage-source converter, causing the plurality of switch positions to convert an input of the voltage-source converter to an output of the voltage-source converter.

* * * * *